US011340855B2

(12) United States Patent
Huang et al.

(10) Patent No.: US 11,340,855 B2
(45) Date of Patent: May 24, 2022

(54) FORMING A LARGER DISPLAY USING MULTIPLE SMALLER DISPLAYS

(71) Applicants: Rex Huang, Winchester, MA (US); Wei-Ru Chen, Winchester, MA (US); Eric Huang, Winchester, MA (US)

(72) Inventors: Rex Huang, Winchester, MA (US); Wei-Ru Chen, Winchester, MA (US); Eric Huang, Winchester, MA (US)

(*) Notice: Subject to any disclaimer, the term of this patent is extended or adjusted under 35 U.S.C. 154(b) by 0 days.

(21) Appl. No.: 16/565,141

(22) Filed: Sep. 9, 2019

(65) Prior Publication Data
US 2020/0073619 A1 Mar. 5, 2020

Related U.S. Application Data

(63) Continuation of application No. 15/398,693, filed on Jan. 4, 2017, now Pat. No. 10,409,542.

(60) Provisional application No. 62/274,764, filed on Jan. 4, 2016.

(51) Int. Cl.
H04N 7/18 (2006.01)
G06F 3/14 (2006.01)
G09B 5/02 (2006.01)
G06Q 30/02 (2012.01)

(52) U.S. Cl.
CPC .......... *G06F 3/1446* (2013.01); *G06F 3/1431* (2013.01); *G06F 3/1438* (2013.01); *G09B 5/02* (2013.01); *G06Q 30/0241* (2013.01); *G09G 2320/0233* (2013.01); *G09G 2320/0238* (2013.01); *G09G 2320/0242* (2013.01); *G09G 2320/0693* (2013.01); *G09G 2340/14* (2013.01); *G09G 2356/00* (2013.01); *G09G 2370/12* (2013.01)

(58) Field of Classification Search
CPC .... G06F 3/1431; G06F 3/1438; G06F 3/1446; G06Q 30/0241; G09B 5/02; G09G 2320/0233; G09G 2320/0238; G09G 2320/0242; G09G 2320/0693; G09G 2340/14; G09G 2356/00; G09G 2370/12; G06C 30/0241
USPC ........................................................ 348/148
See application file for complete search history.

(56) References Cited

U.S. PATENT DOCUMENTS

| 5,166,798 A | 11/1992 | Cho | |
|---|---|---|---|
| 5,796,376 A | 8/1998 | Banks | |
| 6,150,996 A * | 11/2000 | Nicholson | G09F 9/33 345/1.3 |
| 8,732,373 B2 * | 5/2014 | Sirpal | G06F 3/1454 710/303 |
| 9,615,062 B2 * | 4/2017 | Sablak | H04N 7/18 |
| 2005/0134525 A1 | 6/2005 | Tanghe | |
| 2006/0145942 A1 * | 7/2006 | Maatta | G02B 5/045 345/1.3 |
| 2007/0296816 A1 | 12/2007 | Rubio | |

(Continued)

*Primary Examiner* — Gims S Philippe

(57) ABSTRACT

A display system includes a first display device having an active display region having individually controllable pixels, a sensor to generate information that is useful for determining a position of the first display device relative to a second display device, and a display controller to determine the position of the first display device relative to the second display device based on the information generated by the sensor. The display controller determines an image to be shown on the first display device based on the position of the first display device relative to the second display device.

51 Claims, 19 Drawing Sheets

(56) References Cited

U.S. PATENT DOCUMENTS

| | | | |
|---|---|---|---|
| 2009/0303261 A1* | 12/2009 | Fard | H04N 1/603 |
| | | | 345/690 |
| 2011/0018857 A1 | 1/2011 | Lai | |
| 2012/0214552 A1* | 8/2012 | Sirpal | G06F 3/0481 |
| | | | 455/566 |
| 2013/0082912 A1 | 4/2013 | Smith | |
| 2014/0368512 A1* | 12/2014 | Kim | G06F 3/1446 |
| | | | 345/474 |
| 2015/0220299 A1* | 8/2015 | Kim | G06F 3/013 |
| | | | 345/1.3 |
| 2015/0235609 A1 | 8/2015 | Hall | |
| 2015/0339936 A1* | 11/2015 | Lee | G06F 3/04845 |
| | | | 348/565 |
| 2016/0014882 A1* | 1/2016 | Jongman | H05K 1/028 |
| | | | 361/749 |
| 2016/0224306 A1 | 8/2016 | Rycyna, III et al. | |
| 2017/0031643 A1* | 2/2017 | Jeong | G06F 1/1647 |
| 2017/0131584 A1 | 5/2017 | Liu | |

* cited by examiner

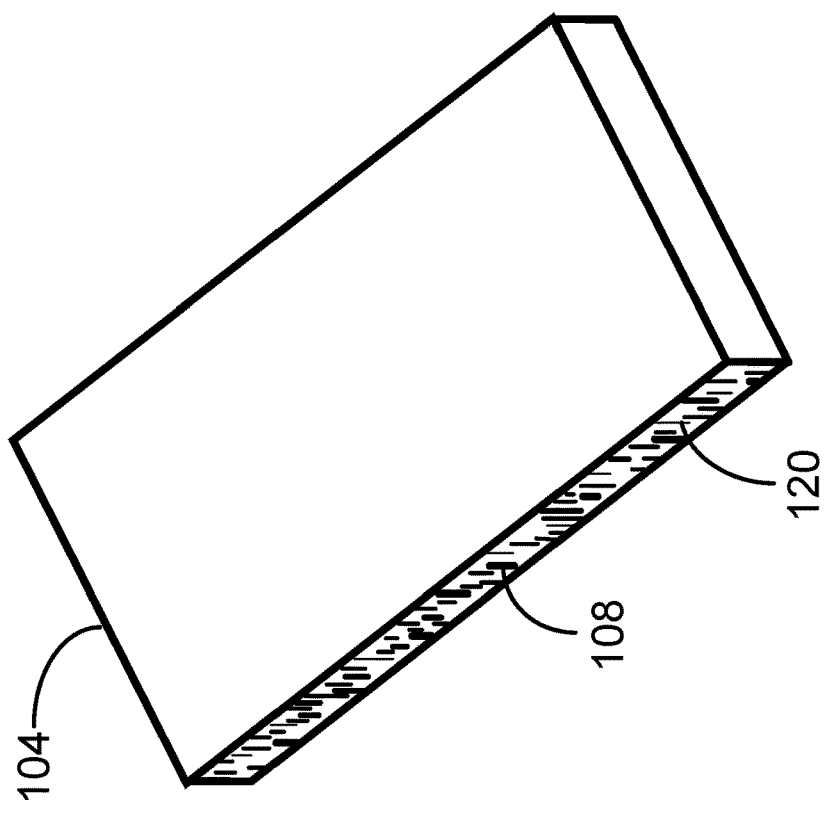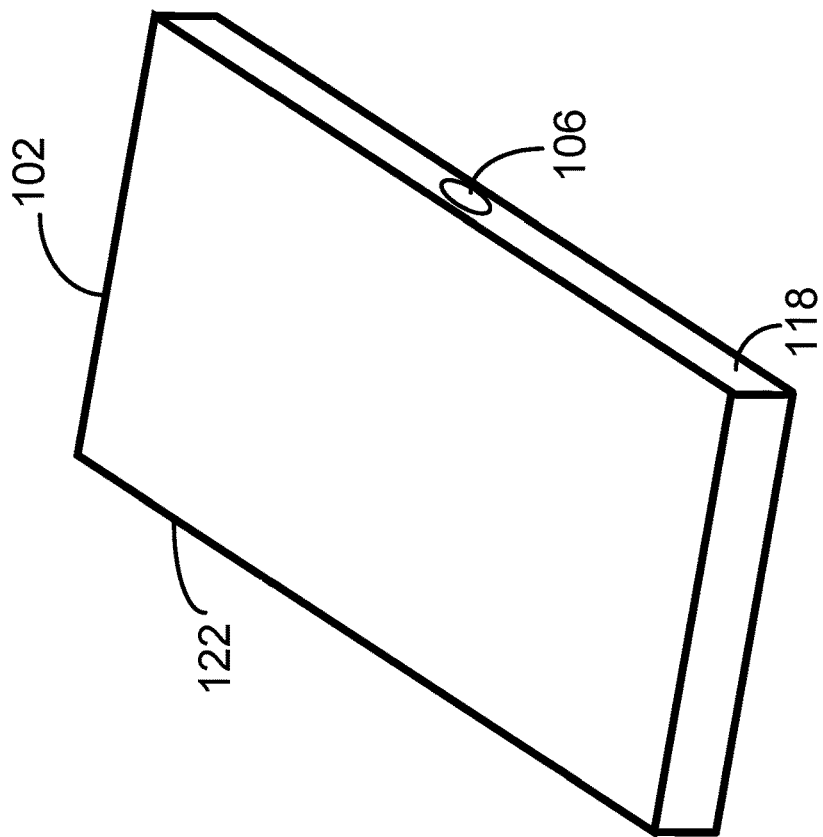
FIG. 2

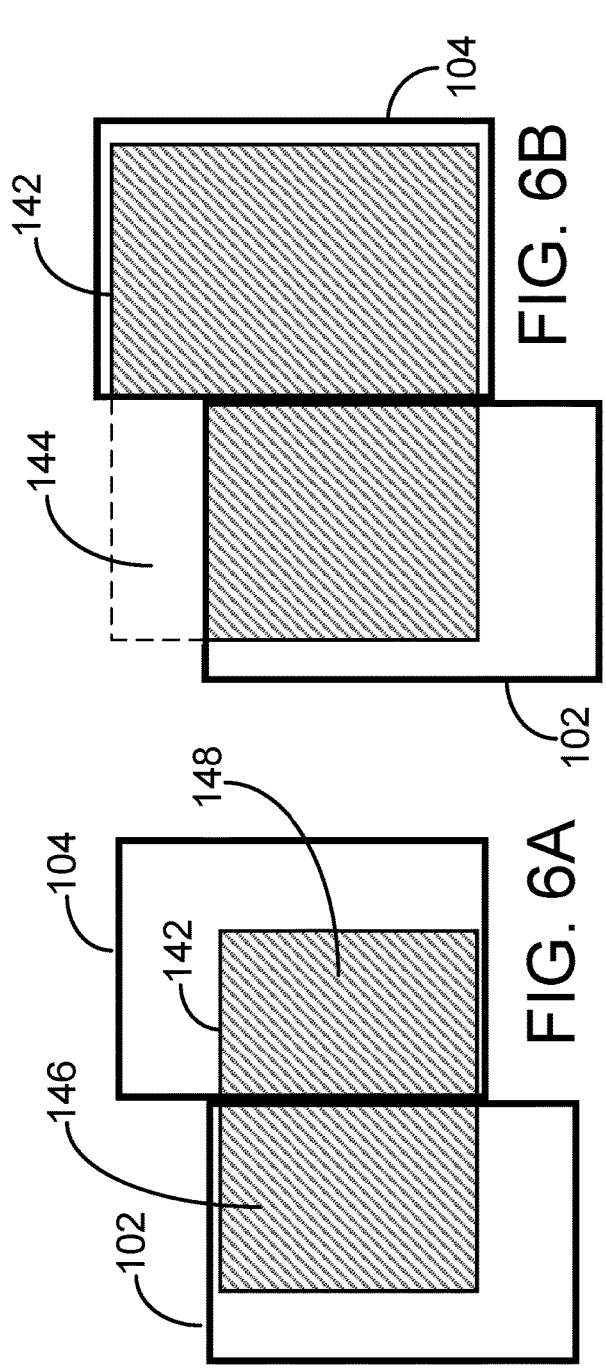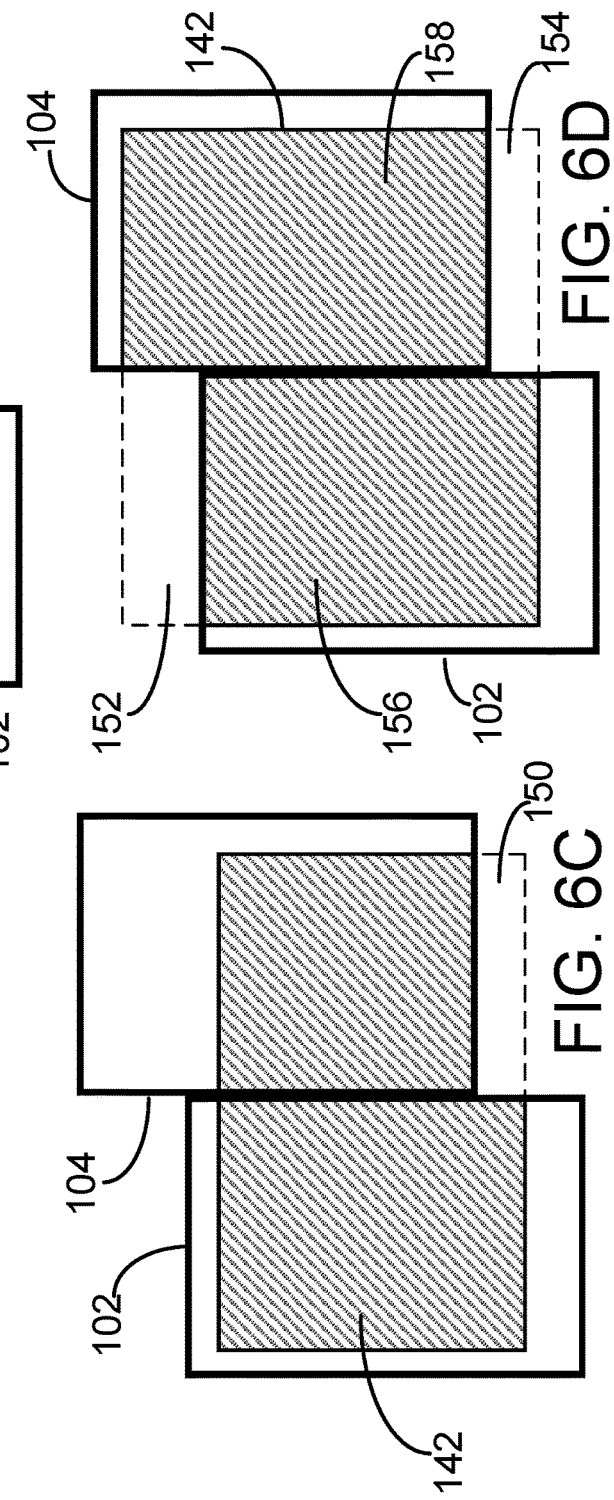

FORMING A LARGER DISPLAY USING MULTIPLE SMALLER DISPLAYS

CROSS-REFERENCE TO RELATED APPLICATIONS

This application is a continuation of and claims priority to U.S. patent application Ser. No. 15/398,693, filed on Jan. 4, 2017, which claims priority to U.S. provisional application 62,274,764, filed on Jan. 4, 2016. The entire contents of the above applications are incorporated by reference.

FIELD OF INVENTION

This description relates to forming a larger display using multiple smaller displays.

BACKGROUND

Flat panel displays can be used in, e.g., mobile phones, tablet computers, desktop monitors, and televisions. Computer monitors and television displays can have specific dimensions, such as having diagonal screen sizes of, e.g., 18, 24, 30, 46, 55, 65, or 70 inches. The displays can have specific native resolutions, such as, e.g., 640×480 (VGA display), 800×640 (SVGA display), 1024×768 (XGA display), 1280×1024 (SXGA display), 1600×1200 (UXGA display), 2560×1600 (WQXGA display), 3840×2160 (4K display), 5120×2880 (5K display), and 7680×24320 (8K Ultra High Definition Display). Each flat panel display has an active display area having an array of pixels. The active display area is surrounded by a display frame that provides support and protection for the active display area. The display frame may include a backplane that extends across the entire back side of the active display region, and side bezels that surround the sides of the active display region. Various types of flat panel displays are available on the market, including, e.g., plasma displays, electroluminescent displays (ELDs), liquid crystal displays (LCDs), organic light emitting diodes (OLED) displays, quantum dot displays, interferometric modulator displays, carbon nanotube-based displays, digital micro shutter displays, and E-ink displays.

A computer can have a display controller that controls two or more flat panel displays so that images can be shown on the displays. For example, when two displays are used with a computer, the two displays can be connected to the computer directly using two video cables (e.g., VGA, DisplayPort, or HDMI cables), or the two displays can be connected to the computer in a daisy-chain manner using, e.g., multi-stream technology. The computer may provide a user interface to allow a user to designate which of the two displays is placed on the left side and which of the two displays is placed on the right side so that images can be correctly shown on the two displays. When three displays are used, the three displays may be connected to the computer directly using three video cables, or the three displays can be connected to the computer in a daisy-chain manner using, e.g., multi-stream technology. The computer may provide a user interface to allow the user to designate which of the three displays is placed on the left side, which of the three displays is placed at the center, and which of the three displays is placed on the right side so that images can be correctly shown on the three displays.

SUMMARY

This document describes a display system for showing images having high resolutions by forming a larger display using a group of smaller displays. The image contents shown on the smaller displays are determined based on relative positions of the smaller displays. The overall size and resolution of the larger display can be dynamically adjusted by adding displays to or removing displays from the group of displays. The size and resolution of the larger display can be increased indefinitely by adding more smaller displays to the group of displays. A large display having dimensions comparable to a physical window installed in a house or office can be produced cost effectively. The large display can show life-size images, producing a visual effect comparable to the physical window and offering the user a "virtual window" for viewing scenes in other places. The display areas of portable devices can be conveniently increased by positioning additional displays adjacent to the displays of the portable devices.

This document describes a computer server that can generate images suitable for the larger displays each formed by multiple smaller displays. The computer server can communicate with the display controllers of the larger displays to obtain information about the characteristics of the larger displays, such as the dimensions, aspect ratios, and resolutions, and generate large images having characteristics that are compatible with those of the larger displays. The computer server can generate the large images based on a combination of multiple smaller images that are captured by cameras, or based on computer-generated imagery (CGI) techniques. The computer server may have databases of physical models of objects, and render high resolution images of scenes that include the objects based on simulation.

This document describes a computer server that can select images based on characteristics of multiple displays that are placed in the vicinity of one another. For example, the computer server can be used to recommend images to be shown on displays that function as digital posters. The computer server may communicate with the display controller that controls the images shown on the displays, such as the number of displays and the relative positions of the displays. The computer server may select, from among a collection of images, images that have similar color palette, similar subject matter, or form interesting visual effects when shown on the multiple displays. Let's assume a user has a group of four displays mounted side by side horizontally on a wall. The computer server may select four images that have similar color palette, similar subject matter, or form interesting visual effects when shown on the four displays, and send the four images to the four displays. The four images can be, e.g., four photos of sunset (or beach or forest) scenery, four photos of flowers that have similar colors, four photos of various types of dogs, four photos of babies, four photos of athletes (e.g., baseball, soccer, or football players), or four images of drawings or paintings from the same artist (e.g., Monet, Picasso, or M. C. Escher). For example, the computer server may select four photos of a person taken at various ages (e.g., at ages 1, 3, 7, and 13) and send those photos to the four displays such that the photos taken from younger to older ages are shown from left to right sequentially.

This document describes a system for showing primary and auxiliary contents on multiple displays. For example, a user may watch television programs on a television display. If the user is interested in knowing about the bios of actors or actresses, the user can place a second display near the television, and the bios of actors of actresses can be shown on the second display without taking up screen area of the television display. If the user wants to see more information, such as a map of the location where the story of the TV program takes place, the user can place a third display near the television or near the second display, and the map can be shown on the third display. For example, the user may view web pages on a computer display. The user may subscribe to a magazine, and the producer of the magazine may provide a second display to the user. When the user visits the web site of the magazine, the user can place the second display near the computer display, and primary contents (e.g., articles) of the magazine will be shown on the computer display while secondary contents (e.g., sponsored contents) will be shown on the second display. This way, the secondary contents do not have to compete with the primary contents for screen space, allowing the user to have a good experience when viewing the primary contents, while also having the opportunity to gain useful information from the secondary contents.

This document describes a system having dynamically adjustable displays for helping students learn various subjects and complete homework assignments. For example, an assignment may require a student to review articles on multiple web sites, analyze the contents of multiple articles, and write a report based on the results of the analyses. The student may use a small laptop computer that is convenient for carrying to and from school. The small display screen may only be sufficiently large to show one article at a time with a font size that is easy for viewing. The system enables the student to position one or more additional displays adjacent to the laptop display to form a larger display. The student can view multiple articles or multiple web pages side by side to compare and analyze the contents of the articles or web pages, and write a report that is shown side by side with the articles. Showing more learning material simultaneously on the larger display may be helpful to learning because there is less interruption due to frequent switching among articles and reports that may be required if only the small laptop screen were used. When performing comparative analyses of the articles and writing a report based on the analyses on the small laptop screen, the student may have to navigate and switch among the articles and the report multiple times (which takes some cognitive effort), so that it may take a longer time for the student to understand and remember a subject, as compared to using the larger display.

For example, the student can read articles related to a geographical region while also viewing a map of the geographical region and additional statistics of the geographical region, in which the articles, the map, and the statistics are shown side by side on the larger display. The student can work on math drills shown on a portion of the larger display (e.g., by typing in the answers or entering the answers using a stylus if the laptop display or one of the additional displays is a touch screen), and also look up additional information related to the math subject on another portion of the larger display. The student can learn to write computer programs in which a first portion of the larger display shows the code written by the student, a second portion of the larger display shows the results from executing the code, and a third portion of the larger display shows a tutorial on computer programming.

This document describes displays having transparent borders that partially overlap other displays to form a larger display without dark lines between the displays. A second display panel having a transparent border can overlap a first display panel to form a larger display such that an image can be shown across the first and second display panels. By using a transparent border for the second display panel, the pixels of the first display panel that are covered by the transparent border can be seen by a user, so the pixels of the first display panel covered by the transparent border appear to be adjacent to the pixels of the second display panel without any gap or dark line between the pixels of the first and second display panels.

The transparent border may not be completely transparent to visible light emitted from pixels of the first display panel and may be semi-transparent such that the brightness of the pixels of the first display covered by the semi-transparent border is reduced. The brightness of the pixels of the first display covered by the semi-transparent border can be enhanced to compensate for the reduction in brightness caused by the semi-transparent border. If the semi-transparent border changes the color of the light passing through the semi-transparent border, the color of the pixels of the first display covered by the semi-transparent border can be adjusted to compensate for the color-changing effects caused by the semi-transparent border.

In some implementations, the second display panel can have light sensors on a back side of the display panel to detect light emitted from pixels of the first display panel when the second display panel overlaps the first display panel. For example, the second display panel can include a substrate, and organic light emitting diode (OLED) pixels are formed on a front side of the substrate. Each OLED pixel includes an OLED and a thin film transistor (TFT) for driving the OLED. The light sensors can be formed on a back side of the substrate. A control module, which may include a timing controller, a column driver, and/or a row driver, may also be formed on the back side of the substrate. The OLED pixels can be electrically coupled to the controller by column lines and row lines in which the ends of the column and row lines are electrically coupled to signal lines on the back side of the substrate through through-holes in the substrate, and the signal lines on the back side of the substrate are electrically coupled to the control module.

In another example, the OLED pixels are formed on a first side of a first substrate, the light sensors are formed on a first side of a second substrate, and a second side of the first substrate is bonded to a second side of the second substrate.

The active display region can include transparent pixels. For example, the transparent pixels may be located adjacent to the transparent or semi-transparent border region. When two display panels overlap, some pixels in the upper display panel are active to show content, some pixels in the upper display panel are transparent to allow the active pixels in the lower display panel to be visible. For example, juxtaposing the active pixels in the upper and lower display panels can provide a jagged boundary for the upper display panel so that the user does not see a straight line between the two display panels. The transparent display portion can be, e.g., 50, 100, or 200 pixels wide. Which pixels of the upper display panel are active may depend on the content. The boundary between the active pixels and the transparent pixels in the upper display panel may follow the contour of displayed images so that the boundary is less visible and blends with the images. For example, if leaves are shown in the transparent display portion, the boundary between active and transparent pixels may follow the contour of the leaves.

In a general aspect, a display system comprises: a first display device comprising an active display region comprising individually controllable pixels; a sensor to generate information that is useful for determining a position of the first display device relative to a second display device; and a display controller to determine the position of the first display device relative to the second display device based on the information generated by the sensor, and determine an image to be shown on the first display device based on the position of the first display device relative to the second display device.

Implementations can include one or more of the following features. The first display device can comprise a transparent or semi-transparent border region having a transmissivity of at least 10% for visible light.

The display controller can control the pixels of the active display region of the first display device to show a first image that is an extension of a second image shown on the second display when the first display overlaps the second display at the semi-transparent border region.

The sensor can comprise one or more light sensors on a backside of the display device for detecting light from the second display device, and the display controller uses outputs from the one or more light sensors to determine the position of the first display device relative to the second display device.

The sensor can comprise a camera for capturing images shown on the first and second display devices, and the display controller uses images captured by the camera to determine the position of the first display device relative to the second display device.

The sensor can generate information that is useful for determining the position of the first display device relative to the second display device display from time to time, and the controller dynamically updates the image shown on the first display device based on the information generated by the sensor.

The display system can include a motion sensor that is configured to detect movements of the first display device, in which in response to the motion sensor detecting a movement of the first display device, the display controller is configured to determine an updated position of the first display device relative to the second display device, and determine an image to be shown on the first display device based on the updated position of the first display device relative to the second display device.

In another general aspect, a ship comprises: a first display device comprising an active display region comprising individually controllable pixels; a sensor to generate information that is useful for determining a position of the first display device relative to a second display device; a display controller to determine the position of the first display device relative to the second display device based on the information generated by the sensor, and determine an image to be shown on the first display device based on the position of the first display device relative to the second display device; and a first camera to capture images of an environment of the ship, in which the display controller causes at least portions of the images of the environment of the ship to be shown on the first display device.

Implementations can include one or more of the following features. The first display device can include a transparent or semi-transparent border region having a transmissivity of at least 10% for visible light.

The display controller can control the pixels of the active display region of the first display device to show a first image that is an extension of a second image shown on the second display when the first display overlaps the second display at the semi-transparent border region.

The sensor can include one or more light sensors on a backside of the display device for detecting light from the second display device, and the display controller uses outputs from the one or more light sensors to determine the position of the first display device relative to the second display device.

The sensor can include a second camera for capturing images shown on the first and second display devices, and the display controller uses images captured by the second camera to determine the position of the first display device relative to the second display device.

The sensor can generate information that is useful for determining the position of the first display device relative to the second display device display from time to time, and the controller can dynamically update the image shown on the first display device based on the information generated by the sensor.

The ship can include multiple smaller displays that collaboratively form a larger display, in which the display controller can be configured to determine the position of each of the display device relative to at least one other display device, and determine an image to be shown across the multiple smaller displays based on the relative positions of the smaller displays.

The larger display can be configured to show images that represent scenes outside of the ship.

In another general aspect, an apparatus comprises a first display device comprising a first active display region comprising individually controllable pixels; and a transparent or semi-transparent border region having a transmissivity of at least 10% for visible light. The apparatus comprises a second display device comprising a second active display region comprising individually controllable pixels, in which the first display device overlaps the second display device such that the transparent or semi-transparent border region of the first display device covers at least a portion of the second active display region. The apparatus comprises a display controller to control the first and second display devices to show an image that spans the first and second display devices.

Implementations can include one or more of the following features. The display controller can be configured to control the second display device to modify a property of pixels in the second active display region that is covered by the semi-transparent border region of the first display device to compensate a visual effect caused by the semi-transparent border region.

The display controller can be configured to control the second display device to increase a brightness of pixels in the second active display region that is covered by the semi-transparent border region of the first display device to compensate a reduction in brightness of the pixels due to being covered by the semi-transparent border region.

The apparatus can include a sensor to detect a position of the first device relative to the second display device, in which the display controller is configured to control the first and second display devices based on information about the relative positions of the first and second devices.

The sensor can include a camera that captures an image of at least a portion of the pixels of the second display device adjacent to the semi-transparent border region and not covered by the semi-transparent border region, and a portion of the pixels of the first display device adjacent to the semi-transparent border region.

In another general aspect, a system for assisting in learning is provided. The system includes a larger display formed by two or more smaller displays, each of the smaller displays includes an active display region having individually controllable pixels. The system includes at least one sensor to generate sensing signals having information useful in determining relative positions of the smaller displays; and a display controller configured to determine relative positions of the smaller displays based on the sensing signals generated by the at least one sensor, determine a larger image for the larger display, and control each of the smaller displays to show a portion of the larger image such that the larger image spans across the smaller displays. A first portion of the image represents a first learning material, and a second portion of the image represents a second learning material related to the first learning material.

Implementations can include one or more of the following features. A first smaller display can be oriented at an angle relative to a second smaller display such that an x-axis of the first smaller display is not parallel to an x-axis of the second smaller display. The display controller can be configured to determine the relative angle between the x-axis of the first smaller display relative to the x-axis of a second smaller display, the angle being greater than 0 and less than 90 degrees, and determine the portion of the larger image to show on at least one of the first or second smaller display taking into account of the relative angle between the first and second smaller displays.

When a first smaller display moves relative to a second smaller display, the display controller can automatically determine the relative positions of the first and second smaller displays based on the sensing signals generated by the at least one sensor, and control each of the first and second smaller displays to show a portion of the larger image such that the larger image spans correctly across the first and second smaller displays.

Each of the smaller displays can include a transparent or semi-transparent border region having a transmissivity of at least 10% for visible light, in which the transparent or semi-transparent border region of a first smaller display device can overlap a second smaller display such that the transparent or semi-transparent border region of the first smaller display covers at least a portion of the active display region of the second smaller display.

The display controller can be configured to control the second smaller display to modify a property of pixels of the second smaller display that is covered by the transparent or semi-transparent border region of the first smaller display to compensate a visual effect caused by the transparent or semi-transparent border region.

The display controller can be configured to control the second smaller display to increase a brightness of pixels of the second smaller display that is covered by the transparent or semi-transparent border region of the first smaller display to compensate a reduction in brightness of the pixels due to being covered by the transparent or semi-transparent border region.

The at least one sensor can include one or more light sensors on a backside of a first smaller display for detecting light from a second smaller display, and the display controller can use outputs from the one or more light sensors to determine the position of the first smaller display relative to the second smaller display.

The at least one sensor can include a camera that captures an image of pixels of the smaller displays, and the display controller can use outputs from the camera to determine the relative positions of the smaller displays.

The first learning material can include mathematical exercises, and the second learning material can include at least one article related to the mathematical exercises.

The first learning material can include a timeline of events, and the second learning material can include at least one article related to the events.

The first learning material can include at least one mathematical formula, and the second learning material can include at least one graph related to the at least one mathematical formula.

The first learning material can include at least one of a foreign language article or a foreign language exercise, and the second learning material can include at least one of a foreign language dictionary, a foreign language thesaurus, or a foreign language grammar guide.

The first learning material can include at least one map of a geographical region, and the second learning material can include at least one article related to the geographical region.

In another general aspect, an apparatus comprises: a first display panel having a first active display region; a second display panel having a second active display region and a transparent or semi-transparent border region; a first connector to connect the first display panel to a base; and a second connector to connect the second display panel to the base, in which the second connector is adjustable to move the second display panel to one of a first position and a second position, and when the second display panel is at the second position, at least a portion of the transparent or semi-transparent border region overlaps a portion of the first active display region; wherein when the second display panel is at the second position, the first and second active display regions are configured to show an image that spans a portion of the first active display region under the transparent or semi-transparent border region and a portion of the second active display region adjacent to the transparent or semi-transparent border region.

Implementations can include one or more of the following features. The second connector can include a motorized arm that is configured to move the second display panel between the first position and the second position.

When the second display panel is at the first position, the overlap between the first and second display panels can be greater than the overlap between the first and second display panels when the second display panel is at the second position.

When the second display panel is at the first position, the second display panel can be behind the first display panel, and when the second display panel is at the second position, the second display panel can be in front of the first display panel.

The second connector can include a swivel arm that enables the second display panel to be moved from the first position behind the first display panel to the second position in front of the first display panel.

The second display panel can have a non-transparent border region, and the transparent or semi-transparent border region is thinner than the non-transparent border region.

The first display panel can include at least one of a liquid crystal display, an organic light emitting diode display, an electronic ink display, a plasma display, an electroluminescent display, a surface-conduction electron-emitter display, a field emission display, an interferometric modulator display, or a quantum dot display.

The second display panel can include at least one of a liquid crystal display, an organic light emitting diode display, an electronic ink display, a plasma display, an electroluminescent display, a surface-conduction electron-emitter display, a field emission display, an interferometric modulator display, or a quantum dot display.

The second display panel can include: a sensor disposed at a backside of the display panel to sense a parameter of the first display panel and generate a sensor output signal, and a control module to determine a position of the second display panel relative to the first display panel based on the sensor output signal.

The sensor can include a light sensor to sense light emanating from the first display panel.

When the second display panel is at the second position, the light sensor can face a portion of the first active display region.

The control module can control the first display panel to activate different pixels at different times, each time activating one or more pixels, and the light sensor is configured to sense light from the one or more of the activated pixels.

The control module can determine the relative positions of the first and second display panels based on the position or positions of one or more pixels that are activated when the light sensor senses light or senses a change in color or brightness.

A left side of the second display panel can overlap a right side of the first display panel, the control module can control the first display panel to sequentially activate a vertical line of pixels starting from the right border, and scan the vertical line toward the left side until the light sensor detects light from the activated line of pixels.

The control module can determine the relative positions of the first and second display panels based on the position of the activated line of pixels when the light sensor detects light from the activated line of pixels.

The sensor can include a plurality of light sensors at various positions to sense light emanating from the first display panel.

The control module can control the first display panel to sequentially activate different pixels, each time activating one or more pixels, and the light sensors are configured to detect light from the one or more activated pixels.

The control module can determine the relative positions of the first and second display panels based on the position or positions of the activated one or more pixels when the light sensors detect light from the one or more activated pixels.

The control module can control the first display panel to activate different pixels at different times, each time activating one or more pixels, and determine the relative positions of the first and second display panels based on the sensor output signals from the light sensor.

The apparatus can include a camera to take images of the first and second display panels, and a control module to determine a position of the second display panel relative to the first display panel based on the images taken by the camera.

The second connector can include a swivel arm to move the second display panel between the first and second positions, and a stop mechanism to stop the swivel arm at the second position, in which the second position is a predetermined position, and the relative positions between the first and second displays are known when the second display panel is at the second position.

The apparatus can include a control module to control the first and second display panels to display an image that spans the first and second active display areas, in which the portion of the image shown on the second active display area is based on the relative positions between the first and second displays.

The apparatus can include a control module configured to control the first and second display panels to display an image that spans the first and second active display areas, in which the portion of the image shown on the second active display area is based on the relative positions between the first and second displays.

The control module can be configured to control the first and second display panels to display a line that spans the first and second active display areas, in which a first portion of the line is shown by pixels in the first active display area not covered by the transparent or semi-transparent border region of the second display panel, a second portion of the line is shown by pixels in the first active display area covered by the transparent or semi-transparent border region, and a third portion of the line is shown by pixels in the second active display area.

The control module can be configured to control the first and second display panels to display the first portion of the line, the second portion of the line, and the third portion of the line to form a continuous line that spans the first and second active display regions.

The line can include at least one of a border of a window shown across the first and second active display regions, a feature of a face shown across the first and second active display regions, a feature of an object shown across the first and second active display regions, or a border of a geometric shape shown across the first and second active display regions.

The first and second display panels can show at least one of a two-dimensional or three-dimensional image that spans the first and second active display regions.

The first and second display panels can each include a two-dimensional display configured to display two-dimensional images.

The first and second display panels can each include a three-dimensional display configured to display three-dimensional images.

When the second display panel is at the first position, the second display panel can be in front of the first display panel and cover a first portion of the first active display region, when the second display panel is at the second position, the second display panel can also be in front of the first display panel and cover a second portion of the first active display region, and the first portion is larger than the second portion.

Which when the second display panel is at the first position, the second display panel can completely cover the first active display region.

When the second display panel is at the second position, the second active display region can be at the right side of the first active display region.

When the second display panel is at the second position, the second active display region can be at the left side of the first active display region.

When the second display panel is at the second position, the second active display region can be below the first active display region.

When the second display panel is at the second position, the second active display region can be above the first active display region.

At least one of the first or second active display region can have a rectangular shape.

At least one of the first or second active display region can have a non-rectangular shape.

At least one of the first or second active display region can have a shape in the form of a circle, an oval, a triangle, a rhombus, a parallelogram, a trapezium, a convex polygon, a concave polygon, or an irregular shape.

Each of the first and second active display regions can have a plurality of pixels.

In another general aspect, an apparatus comprises: a first display panel having a first active display region; a second display panel having a second active display region and a transparent or semi-transparent border region; a sensor to sense a parameter that is indicative of a position of the second display panel relative to the position of the first display panel and generate a sensor output signal; and a control module to control the first and second active display regions such that when the control module detects that the second display panel overlaps the first display panel such that the transparent or semi-transparent border region covers a portion of the first active display region, the first and second active display regions show an image that spans a portion of the first active display region behind the transparent or semi-transparent border region and a portion of the second active display region adjacent to the transparent or semi-transparent border region.

Implementations can include one or more of the following features. The second display panel can have a non-transparent border region, and the transparent or semi-transparent border region has a thickness that is less than a thickness of the non-transparent border region, the thickness being measured in a direction orthogonal to the surface of the second active display region.

The second display panel can have a center region that has a thickness that is greater than the thickness of the transparent or semi-transparent border region, the thickness being measured in a direction orthogonal to the surface of the second active display region.

The second display panel can have a cross-sectional thickness profile that is thinner at the transparent or semi-transparent border region and gradually becomes thicker toward the center of the display panel.

The second display panel can include a concave surface region and a convex surface region.

The concave surface region can be closer to the transparent or semi-transparent border region than the convex surface region.

The center region of the second display panel can include electronic circuitry for driving pixels of the second active display region.

The electronic circuitry can include at least one of a column driver, a row driver, a timing controller, dynamic random access memory, static random access memory, flash memory, magnetoresistive random-access memory, phase-change memory, resistive random-access memory, programmable metallization cell, conductive-bridging random access memory, a memristor, a solid state drive, an electromechanical magnetic disk, power supply circuitry, communication circuitry, circuitry for driving the sensor, circuitry for processing the sensor output signal, the control module, or a data processor.

The first display panel can include at least one of a liquid crystal display, an organic light emitting diode display, an electronic ink display, a plasma display, an electroluminescent display, a surface-conduction electron-emitter display, a field emission display, an interferometric modulator display, or a quantum dot display.

The second display panel can include at least one of a liquid crystal display, an organic light emitting diode display, an electronic ink display, a plasma display, an electroluminescent display, a surface-conduction electron-emitter display, a field emission display, an interferometric modulator display, or a quantum dot display.

The sensor can include a light sensor disposed at a backside of the second display panel to sense light emanating from the first active display region.

The control module can be configured to control the first display panel to activate different pixels at different times, each time activating one or more pixels, and the light sensor is configured to sense light from the one or more of the activated pixels.

The control module can be configured to determine the relative positions of the first and second display panels based on the position or positions of one or more pixels that are activated when the light sensor senses light from the activated one or more pixels or senses a change in color or brightness due to light from the activated one or more pixels.

The control module can be configured to control the first and second display panels to display an image that spans continuously across the first and second active display areas, in which the portion of the image shown on the second active display area is based on the relative positions between the first and second displays.

A left side of the second display panel can overlap a right side of the first display panel, the control module can control the first display panel to sequentially activate a vertical line of pixels starting from the right border, and scan the vertical line toward the left side until the light sensor detects light from the activated line of pixels.

The control module can be configured to determine the relative positions of the first and second display panels based on the position of the activated line of pixels when the light sensor detects light from the activated line of pixels.

The control module can be configured to control the first and second display panels to display an image that spans continuously across the first and second active display areas, in which the portion of the image shown on the second active display area is based on the relative positions between the first and second displays.

The sensor can include a plurality of light sensors at various positions to sense light emanating from the first display panel.

The control module can be configured to control the first display panel to activate different pixels, each time activating one or more pixels, and the light sensors are configured to detect light from the one or more activated pixels.

The control module can be configured to determine the relative positions of the first and second display panels based on the position or positions of the activated one or more pixels when the light sensors detect light from the one or more activated pixels.

The control module can be configured to control the first and second display panels to display an image that spans continuously across the first and second active display areas, in which the portion of the image shown on the second active display area is based on the relative positions between the first and second displays.

The control module can be configured to control the portion of the first active display region that is behind the transparent or semi-transparent border region to adjust at least one of a brightness, contrast, hue, or color to compensate effects of the border region, such that the image appears more uniform across the portion of the first active display region that is not covered by the transparent or semi-transparent border region and the portion of the first active display region that is behind the transparent or semi-transparent border region.

The control module can be configured to control the portion of the first active display region that is behind the transparent or semi-transparent border region to increase the brightness to compensate the reduction of brightness of light that pass the border region, such that the brightness of the image appears more uniform across the portion of the first active display region that is not covered by the transparent or semi-transparent border region and the portion of the first active display region that is behind the transparent or semi-transparent border region, than if the control module had not increased the brightness the portion of the first active display region that is behind the transparent or semi-transparent border region.

The control module can be configured to control the first and second active display regions such that for a portion of the image that is intended to have a uniform brightness, when the portion of the image is shown spanning across the first and second active display regions, the portion of the image has a uniform brightness across the first and second active display regions.

The sensor can include a camera configured to take images of the first and second display panels, and the control module is configured to determine a position of the second active display region relative to the first active display region based on the images taken by the camera.

The control module can be configured to control the first and second active display regions to display an image that spans the first and second active display areas, in which the portion of the image shown on the second active display area is based on the relative positions between the first and second displays.

The control module can be configured to control the first and second active display regions such that the portion of the image shown on the second active display area is based on the relative positions between the first and second displays.

The control module can be configured to control the first and second active display regions to display a line that spans the first and second active display areas, in which a first portion of the line is shown by pixels in the first active display area not covered by the transparent or semi-transparent border region of the second display panel, a second portion of the line is shown by pixels in the first active display area covered by the transparent or semi-transparent border region, and a third portion of the line is shown by pixels in the second active display area.

The control module can be configured to control the first and second active display regions to display the first portion of the line, the second portion of the line, and the third portion of the line to form a continuous line that spans the first and second active display regions.

The line can include at least one of a border of a window shown across the first and second active display regions, a feature of a face shown across the first and second active display regions, a feature of an object shown across the first and second active display regions, or a border of a geometric shape shown across the first and second active display regions.

The first and second display panels can show at least one of a two-dimensional or three-dimensional image that spans the first and second active display regions.

The first and second display panels can each include a two-dimensional display configured to display two-dimensional images.

The first and second display panels can each include a three-dimensional display configured to display three-dimensional images.

The three-dimensional display can include at least one of a stereoscopic display or an autostereoscopic display.

The three-dimensional display can include a spatially multiplexed display.

The spatially multiplexed display can include at least one of a parallax barrier display, a lenticular display, or a random hole display.

The three-dimensional display can include a stack of display modules.

When the second display panel is at a left side or a right side of the first display panel, the control module can control the first and second active display regions to show an image that spans horizontally across the first and second active display regions.

When the second display panel is at an upper side or a lower side of the first display panel, the control module can control the first and second active display regions to show an image that spans vertically across the first and second active display regions.

At least one of the first or second active display region can have a rectangular shape.

At least one of the first or second active display region can have a non-rectangular shape.

At least one of the first or second active display region can have a shape in the form of a circle, an oval, a triangle, a rhombus, a parallelogram, a trapezium, a convex polygon, a concave polygon, or an irregular shape.

Each of the first and second active display regions can have a plurality of pixels.

Each of some of the pixels can include a liquid crystal cell and a thin film transistor.

Each of some of the pixels can include an organic light emitting diode and a thin film transistor.

The apparatus can include a power supply that powers the second display panel wirelessly.

The wireless power transfer from the power supply to the second display panel can be based on at least one of magnetic induction, magnetic resonance, resonant magnetic coupling, capacitive coupling, microwaves, ultrasound, or lasers.

The second display panel can include one or more coils to receive power wirelessly from the power supply.

The apparatus can include solar cells or photovoltaic cells that are configured to provide power to the second display panel.

The second display panel can have a left side, a right side, a top side, and a bottom side, in which borders at two of the left, right, top, and bottom sides are transparent or semi-transparent.

The second display panel can have a left side, a right side, a top side, and a bottom side, in which borders at three of the left, right, top, and bottom sides are transparent or semi-transparent.

The second display panel can have a left side, a right side, a top side, and a bottom side, in which borders the left, right, top, and bottom sides are all transparent or semi-transparent.

The transparent border region can have a transmissivity of at least 90% with respect to visible light.

The semi-transparent border region can have a transmissivity of at least 30% with respect to visible light.

The first display can include pixels that emit infrared light, and the sensor can be configured to detect the infrared light.

The transparent or semi-transparent region can have a transmissivity of less than 10% with respect to infrared light.

The second display panel can include a substrate, pixels disposed on a front side of the substrate, and circuitry to drive the pixels, in which the circuitry can be disposed on a back side of the substrate.

The pixels can be electrically coupled to the circuitry using connectors that pass through through-holes formed in the substrate.

The transparent or semi-transparent border region can include transparent or semi-transparent conductive lines.

The transparent or semi-transparent conductive lines can electrically couple pixel circuits to circuitry for driving the pixel circuits.

The sensor can include a plurality of light sensors positioned at various locations on a backside of the second display panel.

Each light sensor can be associated with known position coordinates.

The light sensors can be positioned along a line.

The light sensors can be positioned along a first line and a second line, the first line extends along a first direction, and the second line extends along a second direction.

The first direction can be parallel to the second direction.

The first line and the second line can be spaced apart along a third direction orthogonal to the first direction.

The second display panel can include a motion sensor.

The control module can determine a position of the second display relative to the first display panel in response to the motion sensor detecting a movement of the second display panel.

Each time the motion sensor detects a movement of the second display panel, the control module can re-determine the position of the second display panel relative to the first display panel and update the image shown on the second active display in response to the newly determined position of the second display panel relative to the first display panel.

The second display panel can include an adhesive or friction pad at a backside of the second display panel.

The adhesive or friction pad can be configured to reduce movement between the first and second display panels after the second display panel is positioned to overlap the first display panel.

The adhesive can include a synthetic gecko adhesive.

The adhesive can provide a temporary adhesive force to cause the second display panel to temporarily adhere to the first display panel, in which the second display panel can be removed from the first display panel by pulling the second display panel away from the first display panel.

The second display panel can include an electro-adhesive pad on a backside of the second display panel.

The electro-adhesive pads can include a conductive electrode deposited on a surface of a polymer.

The control module can be configured to apply a first signal to the electro-adhesive pad to cause the electro-adhesive pad to adhere to the first display panel in response to a first user instruction.

The control module can be configured to apply a second signal to the electro-adhesive pad to cause the electro-adhesive pad to be released from the first display panel in response to a second user instruction.

The control module can be configured to apply a first control signal to the electro-adhesive pad to cause the electro-adhesive pad to adhere to the first display panel, and in response to a motion sensor detecting a movement indicating an edge of the second display panel being pulled away from the first display panel, the control module can be configured to apply a second control signal to the electro-adhesive pad to cause the electro-adhesive pad to be released from the first display panel.

The control module can be configured to apply a first control signal to the electro-adhesive pad to generate an adhesion force to cause the electro-adhesive pad to adhere to the first display panel, and in response to a motion sensor detecting a movement indicating an edge of the second display panel being pulled away from the first display panel, the control module can be configured to apply a second control signal to the electro-adhesive pad to cause the electro-adhesive pad to reduce a adhesion force between the electro-adhesive pad and the first display panel.

After the electro-adhesive pad reduces the adhesion force between the electro-adhesive pad and the first display panel, when the control module determines that the second display panel is moved to a second position and the electro-adhesive pad still overlaps the first display panel, the control module can be configured to apply a third control signal to the electro-adhesive pad to cause the electro-adhesive pad to increase the adhesion force between the electro-adhesive pad and the first display panel.

The control module can be configured to control the electro-adhesive pad to generate a first adhesive force such that when the electro-adhesive pad adheres to the first display panel, the second display panel can be pulled away from the first display panel using a force having a first predetermined magnitude, and the control module can be configured to control the electro-adhesive pad to generate a second adhesive force such that when the electro-adhesive pad adheres to the first display panel, the second display panel cannot be pulled away from the first display panel using a force having the first predetermined magnitude.

The second display panel can have an anti-reflective coating on a back side of the transparent or semi-transparent border region to reduce reflection of light emitted from pixels of the first display panel covered by the transparent or semi-transparent border region.

The sensor can include a series of photoreceptors and a series of lenses to focus light onto the photoreceptors.

In another general aspect, an apparatus comprises: a first display panel having a first active display region; a second display panel having a second active display region and a transparent or semi-transparent border region; wherein the second display panel overlaps the first display panel such that the transparent or semi-transparent border region covers a portion of the first active display region, and the first and second active display regions show an image that spans a portion of the first active display region behind the transparent or semi-transparent border region and a portion of the second active display region adjacent to the transparent or semi-transparent border region.

Implementations can include one or more of the following features. The apparatus can include a support device that supports the first and second display panels at predetermined positions relative to each other.

The first display panel can include a display panel of at least one of a mobile phone, a tablet computer, a notebook computer, a desktop computer monitor, a television, a game controller, or an electronic book.

In another general aspect, a method comprises: positioning a first display panel and a second display panel in which a portion of a second active display area of the second display panel overlaps a portion of first active display area of the first display panel, the first active display area comprising a plurality of pixels, and the second active display area comprising a plurality of pixels; showing a first portion of an image of an object on the first active display area; and showing a second portion of the image of the object on the second active display area, in which the image of the object spans continuously across the first active display area and the second active display area.

Implementations can include one or more of the following features. The method can include determining the second portion of the image of the object based on a position of the second active display area relative to the first active display area.

The method can include determining the position of the second active display area relative to the first active display area using a sensor.

Determining the position of the second active display area relative to the first active display area can include using one or more photo sensors disposed on a back side of the second display panel to detect light emitted from one or more pixels of the first active display area.

The method can include activating different pixels of the first active region at different times, each time activating one or more pixels, and using the one or more photo sensors to sense light from the one or more activated pixels.

The method can include determining the relative positions of the first and second active display areas based on the position or positions of one or more pixels that are activated when the light sensor senses light from the activated one or more pixels or senses a change in color or brightness due to light from the activated one or more pixels.

Positioning a first display panel and a second display panel can include overlapping a left side of the second display panel on a right side of the first display panel, and the method can include sequentially activating a vertical line of pixels in the first active display area starting from the right border, and scan the vertical line toward the left side until the one or more photo detectors detect light from the activated line of pixels.

The method can include determining the relative positions of the first and second active display areas based on the position of the activated line of pixels when the one or more photo detectors detect light from the activated line of pixels.

Determining the position of the second active display area relative to the first active display area can include using a camera facing the first and second active display areas to capture images of the pixels on the first and second active display areas.

The method can include calibrating a brightness of the second active display area to correspond to the brightness of the first active display area, including taking an image that includes a first set of pixels in the first active display area and a second set of pixels in the second active display area, comparing the brightness of the first set of pixels with the brightness of the second set of pixels, and adjust the brightness of the second set of pixels to match the brightness of the first set of pixels.

The method can include calibrating a color of the second active display area to correspond to the color of the first active display area, including taking an image that includes a first set of pixels in the first active display area and a second set of pixels in the second active display area, comparing the color of the first set of pixels with the color of the second set of pixels, and adjust the color of the second set of pixels to match the color of the first set of pixels.

The method can include mapping coordinates of a pixel in the second active display area to coordinates in a coordinate system of the first display panel, determining characteristics of a pixel of the image that correspond to the coordinates in the first display coordinate system, and assigning the characteristics of the pixel of the image to the pixel in the second active display area.

The characteristics of a pixel can include at least one of a color or brightness of the pixel.

Showing a second portion of the image of the object on the second active display area can include showing the second portion of the image of the object on at least one of liquid crystal cells, organic light emitting diodes, electronic ink pixels, plasma display pixels, electroluminescent display pixels, surface-conduction electron-emitter display pixels, field emission display pixels, interferometric modulators, or quantum dot display pixels.

The method can include overlapping a transparent or semi-transparent border of the second display panel over the first active display area.

The method can include controlling the portion of the first active display region that is behind the transparent or semi-transparent border region to adjust at least one of a brightness, contrast, hue, or color to compensate effects of the border region, such that the image appears more uniform across the portion of the first active display region that is not covered by the transparent or semi-transparent border region and the portion of the first active display region that is behind the transparent or semi-transparent border region.

The method can include controlling the portion of the first active display region that is behind the transparent or semi-transparent border region to increase the brightness to compensate the reduction of brightness of light that pass the border region, such that the brightness of the image appears more uniform across the portion of the first active display region that is not covered by the transparent or semi-transparent border region and the portion of the first active display region that is behind the transparent or semi-transparent border region, than if the control module had not increased the brightness the portion of the first active display region that is behind the transparent or semi-transparent border region.

The method can include controlling the first and second active display areas to display a line that spans the first and second active display areas, in which a first portion of the line is shown by pixels in the first active display area not covered by the transparent or semi-transparent border region of the second display panel, a second portion of the line is shown by pixels in the first active display area covered by the transparent or semi-transparent border region, and a third portion of the line is shown by pixels in the second active display area.

The control module can be configured to control the first and second active display regions to display the first portion of the line, the second portion of the line, and the third portion of the line to form a continuous line that spans the first and second active display regions.

The line can include at least one of a border of a window shown across the first and second active display area, a feature of a face shown across the first and second active display areas, a feature of an object shown across the first and second active display areas, or a border of a geometric shape shown across the first and second active display areas.

The method can include controlling the first and second active display regions such that for a portion of the image that is intended to have a uniform brightness, when the portion of the image is shown spanning across the first and second active display regions, the portion of the image has a uniform brightness across the first and second active display regions.

The method can include controlling the first and second active display areas to display a line that spans the first and second active display areas, in which a first portion of the line is shown by pixels in the first active display area and a second portion of the line is shown by pixels in the second active display area.

The method can include controlling the first and second active display areas to display the first and second portions of the line to form a continuous line that spans the first and second active display regions.

Showing the image on the first and second active display areas can include showing a three dimensional image on the first and second active display areas.

Positioning a first display panel and a second display panel can include positioning the second display on a left side of the first display, and showing the image can include showing an image that spans horizontally across the first and second active display areas.

Positioning a first display panel and a second display panel can include positioning the second display on an upper side of the first display, and showing the image can include showing an image that spans vertically across the first and second active display areas.

The method can include powering the second display panel wirelessly.

Powering the second display panel wirelessly can include wirelessly transferring power from a power supply to the second display panel based on at least one of magnetic induction, magnetic resonance, resonant magnetic coupling, capacitive coupling, microwaves, ultrasound, or lasers.

The method can include receiving power wirelessly at the second display panel using coils in the second display panel.

The method can include powering the second display panel using solar cells or photovoltaic cells.

Positioning the first and second display panels can include positioning a portion of the second active display area above the first active display area.

Positioning the first and second display panels can include positioning a portion of the first active display area above the second active display area.

The method can include positioning a third display panel in which a portion of a third active display area of the third display panel overlaps a portion of first active display area of the first display panel, the third active display area comprising a plurality of pixels, showing a first portion of a second image of a second object on the first active display area, and showing a second portion of the second image of the second object on the third active display area, in which the second image of the second object spans continuously across the first active display area and the third active display area.

The method can include positioning a third display panel in which a portion of a third active display area of the third display panel overlaps a portion of the second active display area of the second display panel, the third active display area comprising a plurality of pixels, showing a first portion of a second image of a second object on the second active display area, and showing a second portion of the second image of the second object on the third active display area, in which the second image of the second object spans continuously across the second active display area and the third active display area.

The method can include positioning a third display panel in which a portion of a third active display area of the third display panel overlaps a portion of first active display area of the first display panel, the third active display area comprising a plurality of pixels, and showing a third portion of the image of the object on the third active display area, in which the image of the object spans continuously across the third active display area, the first active display area, and the second active display area.

The method can include positioning a third display panel in which a portion of a third active display area of the third display panel overlaps a portion of the second active display area of the second display panel, the third active display area comprising a plurality of pixels, and showing a third portion of the image of the object on the third active display area, in which the image of the object spans continuously across the first active display area, the second active display area, and the third active display area.

The method can include positioning a third display panel in which a portion of a third active display area of the third display panel overlaps a portion of first active display area of the first display panel, the third active display area comprising a plurality of pixels, in which a portion of the third active display area is above a portion of the first active display area, and a portion of the second active display area is above another portion of the first active display area.

The method can include positioning a third display panel in which a portion of a third active display area of the third display panel overlaps a portion of first active display area of the first display panel, the third active display area comprising a plurality of pixels, in which a portion of the third active display area is below a portion of the first active display area, and a portion of the second active display area is above another portion of the first active display area.

The method can include positioning a third display panel in which a portion of a third active display area of the third display panel overlaps a portion of second active display area of the second display panel, the third active display area comprising a plurality of pixels, in which a portion of the third active display area is above a portion of the second active display area, and another portion of the second active display area is above a portion of the first active display area.

The method can include positioning a third display panel in which a portion of a third active display area of the third display panel overlaps a portion of second active display area of the second display panel, the third active display area comprising a plurality of pixels, in which a portion of the third active display area is below a portion of the second active display area, and another portion of the second active display area is above a portion of the first active display area.

In another general aspect, a method comprises: determining whether a second display is in proximity to a first display; upon determining that no second display is in proximity to the first display, showing a content item and an advertisement on the first display; and upon detecting that the second display is in proximity to the first display, showing at least a portion of the content item on the first display and showing the advertisement on the second display.

Implementations can include one or more of the following features. Determining whether a second display is in proximity to a first display can include determining whether a second display overlaps a first display.

Showing at least a portion of the content item on the first display can include showing the content item across the first and second displays.

The method can include detecting a resolution of the second display, and sending information about the resolution of the second display to an ad server to enable the ad server to provide the advertisement based on the resolution of the second display.

Showing the content item on the first display can include showing the content item in a first web browser shown on the first display.

Showing the advertisement on the second display can include showing the advertisement in a second web browser shown on the second display.

The content item can include a video.

Showing at least a portion of the content item on the first display can include showing the content item across the first and second displays.

The method can include continuing to show the advertisement on the second display as the content item is being scrolled down to show other pages.

In another general aspect, a computer-implemented method comprises: receiving a plurality of bids for advertising positions that are associated with a keyword, the advertising positions comprising a first advertising position that is located on a first display and a second advertising position that is located on a second display in proximity to the first display; receiving a query and one or more keywords associated with the query; performing an auction based at least in part on the query, the one or more keywords that are associated with the query, and the plurality of bids; and based on the bid from the plurality of bids and on the auction, assigning, by the one or more processors, the first advertising position to a first bidder and the second advertising position to a second bidder.

Implementations can include one or more of the following features. The second advertising position can be located on a second display that overlaps the first display.

The advertising positions can include a third advertising position that is located on a third display that is in proximity to the second display.

The third display can overlap the second display.

The advertising positions can include a third advertising position that is located on a third display that is in proximity to the first display, the second display is on a first side of the first display and the third display is on a second side of the first display.

The second display can be on a right side of the first display and the third display can be on a left side of the first display.

The second display can be on a right side of the first display and the third display can be on a top side of the first display.

The third display can overlap the first display.

In another general aspect, a computer-implemented method comprises: receiving a stored key value from a second display that is in proximity to a first display; determining whether the stored key value is a valid key value; and upon determining that the stored key value is a valid key value, showing a protected content item on at least one of the first display or the second display.

Implementations can include one or more of the following features. The method can include upon detecting that the second display is in proximity to the first display, querying the second display for the stored key value.

The method can include upon detecting that the second display is in proximity to the first display, showing at least a portion of the protected content item on the first display and showing an advertisement on the second display. Showing a protected content item can include showing at least one of a news article, a magazine article, an e-book article, a journal article, a photograph, a drawing, a video, or a blog.

Other aspects include other combinations of the features recited above and other features, expressed as methods, apparatus, systems, program products, and in other ways. Other features and advantages of the description will become apparent from the following description, and from the claims.

BRIEF DESCRIPTION OF DRAWINGS

FIGS. 1-7 are diagrams of extendable display systems.

Like reference symbols in the various drawings indicate like elements.

DETAILED DESCRIPTION

Figure 1:
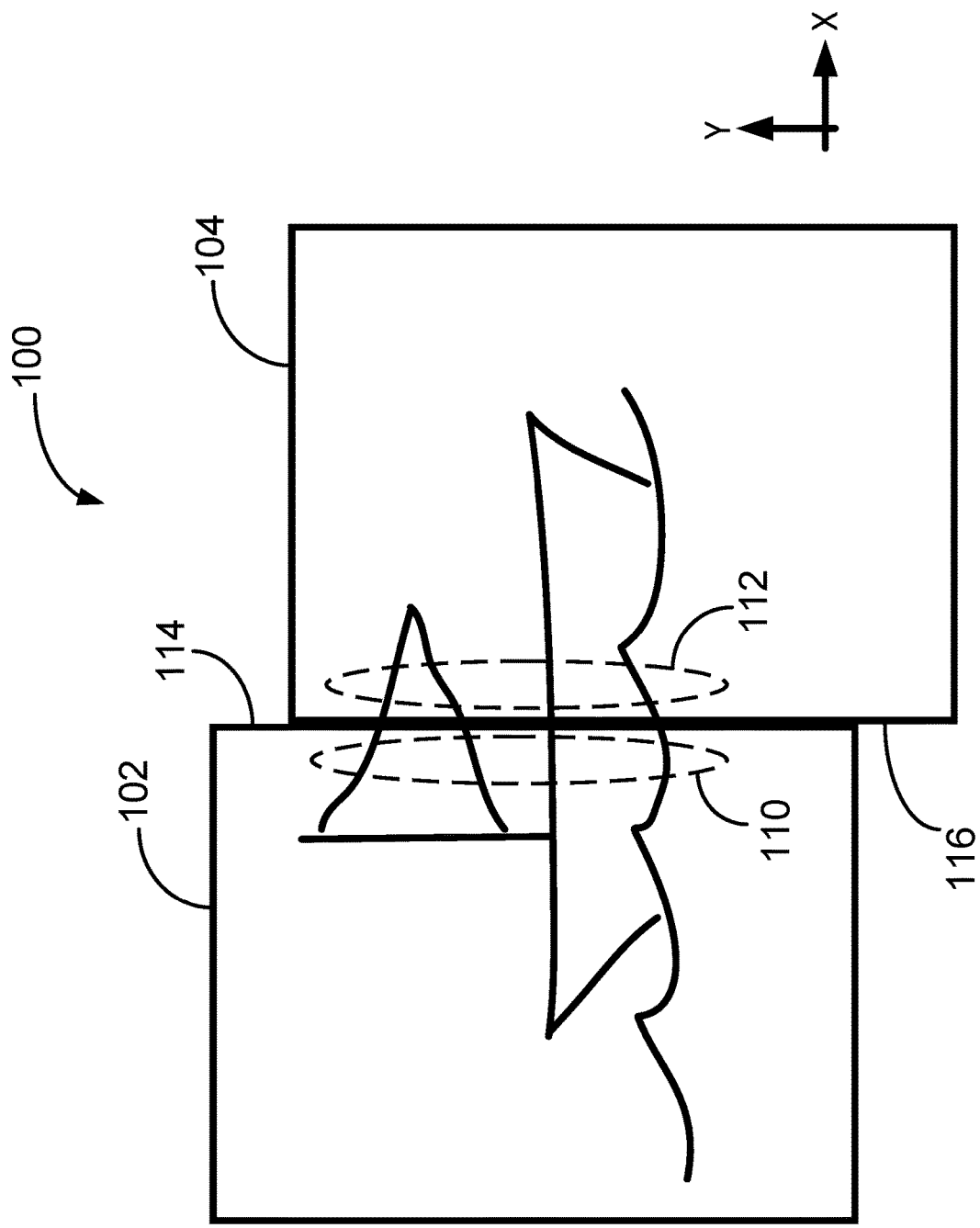

This description describes an extendable display system that includes two or more display modules that can be arbitrarily positioned adjacent to each other, a sensor to detect the relative positions of the display modules, and a display controller to determine image signals to be sent to each display module such that the two or more display modules function cooperatively as a large unified display.

One of the features of the invention is that a user can conveniently form a larger display using multiple smaller displays when there is a need to show larger images, and then conveniently convert back to the smaller displays for ease of transport or storage when it is no longer necessary to show the larger images. Sensors and display controllers can automatically determine the relative positions of the display devices (or the relative positions of the active display regions of the display devices). When pixel arrangements (e.g., pixel geometric configurations and pixel pitches) of each individual smaller display and the relative positions and orientations of the smaller displays are known, the display controller(s) (or graphics controller(s), video controller(s)) can determine which portions of a larger image should be displayed on each of the smaller displays, resulting in the larger image spanning across the smaller displays and having an effect that is comparable to showing the larger image on a single unit large display. The large image can represent, e.g., a computer desktop, a display screen window, a graphics user interface, a graphics design, a text document, a still image, a video, or a combination or two or more of the above.

Another one of the features of the invention is that servers that provide image contents can communicate with the display controller(s) to provide image contents according to the dimensions and resolution of the overall larger display. If the multiple smaller displays form a larger display that is, e.g., 10 feet wide and 2 feet high, the server computer selects an image that has an aspect ratio closer to 10:2 and sends the selected image to the display controller of the smaller displays. If the larger display is, e.g., 2 feet wide and 10 feet high, the server computer selects an image that has an aspect ratio closer to 2:10 and sends the selected image to the display controller of the smaller displays. If the larger display has an overall resolution of about, e.g., 100,000× 80,000 pixels, the server selects an image having a resolution approximately 100,000×80,000 pixels or scale an original image to produce a modified image that has a resolution approximately 100,000×80,000 pixels. If the larger display has an overall resolution of about, e.g., 800,000×1,600,000 pixels, the server selects an image having a resolution approximately 800,000×1,600,000 pixels or scale an original image to produce a modified image that has a resolution approximately 800,000×1,600,000 pixels.

Another one of the features of the invention is that server computers that provide image contents can combine images captured from multiple cameras to produce images having high resolutions that can be displayed on the larger displays. For example, an array of cameras can be used to capture images of scenery that is viewed by a person at a location (e.g., New York Times Square, Washington Monument, or Paris Eiffel Tower). The computer server can selectively combine images from two or more of the cameras to generate a larger image having a resolution compatible with the resolution of the larger display formed by the smaller displays. For example, suppose an image of the Paris Eiffel Tower and its surroundings is taken using full frame camera sensors that each has a resolution of 5760×3840 pixels. An array of 10 by 10 full frame camera sensors can produce a combined image having a resolution of about 57,600×38,400 pixels. If the user forms a larger display having a resolution of 30,000×20,000, the computer server can select images from an array of 6 by 6 cameras to form images having a resolution of 34,560×23,040, and either crop or re-scale the images to have the resolution of 30,000×20,000. If all of the images from the 100 sensors in the array of 10 by 10 full frame camera sensors are used, the combined image will have a resolution of 57,600×38,400 pixels. If we assume that the smaller displays each has a pixel density of 192 dots per inch (dpi), the 57,600×38,400 image can be shown on a larger display having dimensions of 300×200 inches or 25×16.67 feet. Such a large display can be placed on, e.g., the wall of a large room or hall.

In some implementations, the computer server can enhance the resolution of an image by identifying the objects shown in the image, and render high resolution images of the objects based on previously stored images of the objects or physical models of the objects. Suppose a single full frame camera sensor having a resolution of 5760×3840 is used to capture images of the Paris Eiffel Tower and its surroundings. A user forms a larger display having dimensions of 3×4 feet using smaller displays to simulate a life-size window. Assuming that the smaller displays each has a pixel density of 192 dots per inch (dpi), the larger display will have a resolution of 6912×9216. The 5760×3840 resolution image can be up-scaled to 16588×9216 pixels then cropped to 6912×9216 pixels. In some implementations, the server computer has images of the Eiffel Tower taken from many users from various distances and viewing directions. The computer server can generate a 3D model of the Eiffel Tower using techniques similar to those used in the Photosynth software from Microsoft, which analyzes images using pattern recognition to generate 3D models of objects in the images. By analyzing the 5760×3840 resolution image of the Eiffel Tower, the computer server can determine the position of the camera sensor relative to the Eiffel Tower. The computer server then generates a high resolution 2D image of the Eiffel Tower based on the 3D model of the Eiffel Tower, taking into account the position of the camera sensor, the lighting effects (e.g., sunlight direction and cloud shadows) on the Eiffel Tower, and effects generated by other objects, such as people, birds, trees, or buildings blocking portions of the Eiffel Tower from view. The higher resolution 2D image of the Eiffel Tower is inserted into the 6912×9216 image and blended in with the other portions of the image, and the modified image is sent to the user.

Example 1

Referring to FIG. 1, in some implementations, an extendable display system 100 includes a first display module 102 and a second display module 104. When the first and second display modules 102, 104 are placed side-by-side along the x-direction, they can be moved relative to each other along the y-direction, and the system 100 automatically adjusts the image content shown on the display modules 102, 104 based on the relative positions of the display modules 102, 104 so that the image content extends correctly across the display modules 102, 104.

In the example shown in FIG. 1, the display module 104 is lower than the display module 102 (in the y-direction), but the content (an image of a ship) extends correctly across the display modules 102, 104, meaning that a portion 110 of the image content shown on the display module 102 at an edge 114 aligns properly with a portion 112 of the image content shown on the display module 104 at an edge 116, in which the edges 114 and 116 are positioned adjacent to each other. This way, the image content is shown on the display modules 102 and 104 as if the image content is shown on a large unified display.

Referring to FIG. 2, in some implementations, the display module 102 includes a sensor 106 positioned at a side 118 of the display module 102. The display module 104 includes markings 108 positioned along a side 120 of the display module 104. The side 118 faces the side 120 when the display modules 102 and 104 are placed adjacent to each other, such that the sensor 106 can detect the markings 108. The markings 108 can be, e.g., one-dimensional bar codes, two-dimensional bar codes, scale marks, or other markings. In some implementations, the sensor 106 can be an image sensor that captures images of the markings 108. A data processor processes the image data to determine the position of the display module 104 relative to the display module 102.

Figure 3:
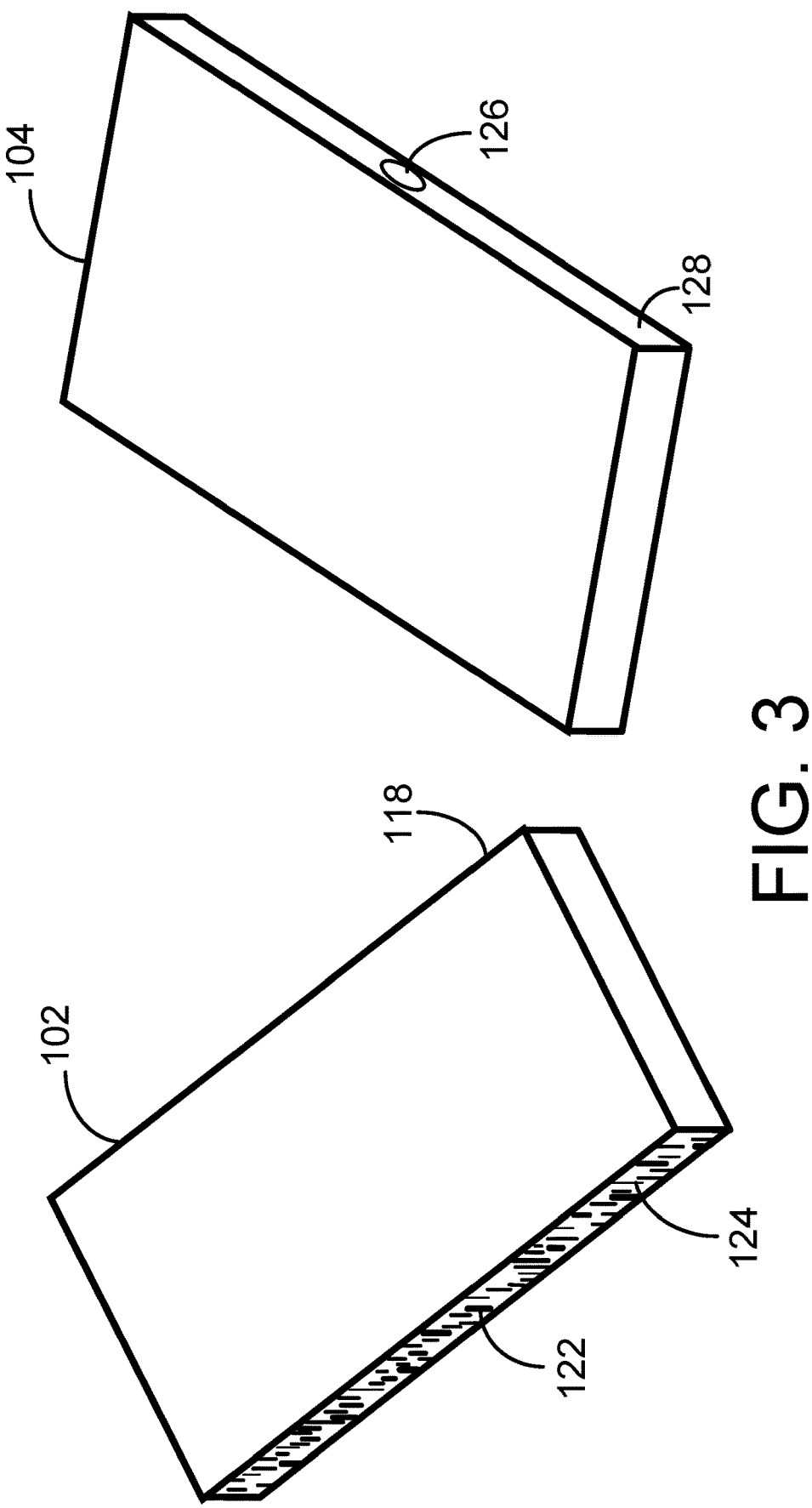
Figure 4:
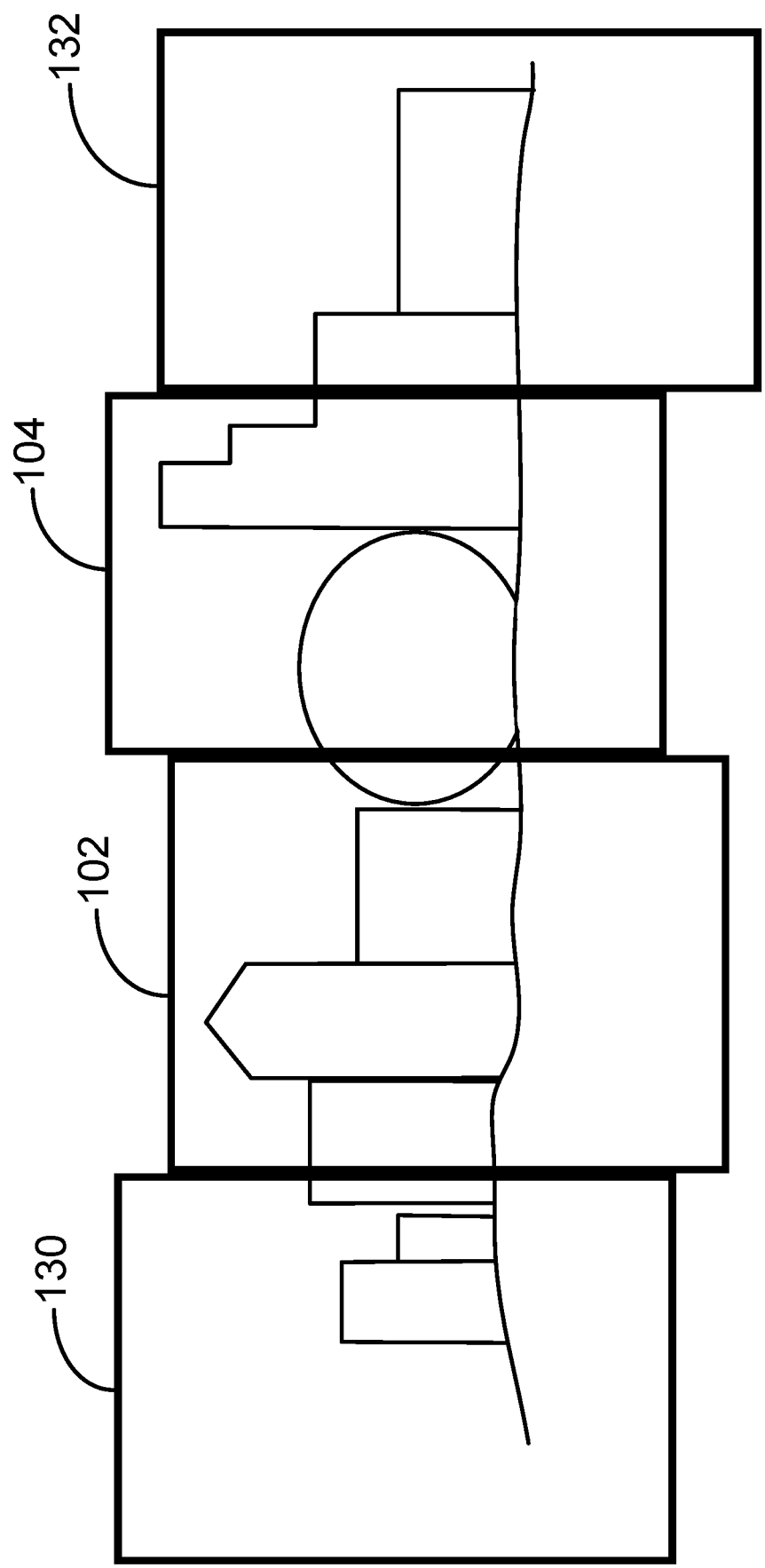

Referring to FIG. 3, in some implementations, the display module 102 has markings 122 on a side 124 opposite the side 118, and the display module 104 has a sensor 126 on a side 128 opposite the side 120. This allows additional modules (e.g., 130, 132) to be positioned adjacent to the display modules 102 and 104, as shown in FIG. 4.

Figure 5:
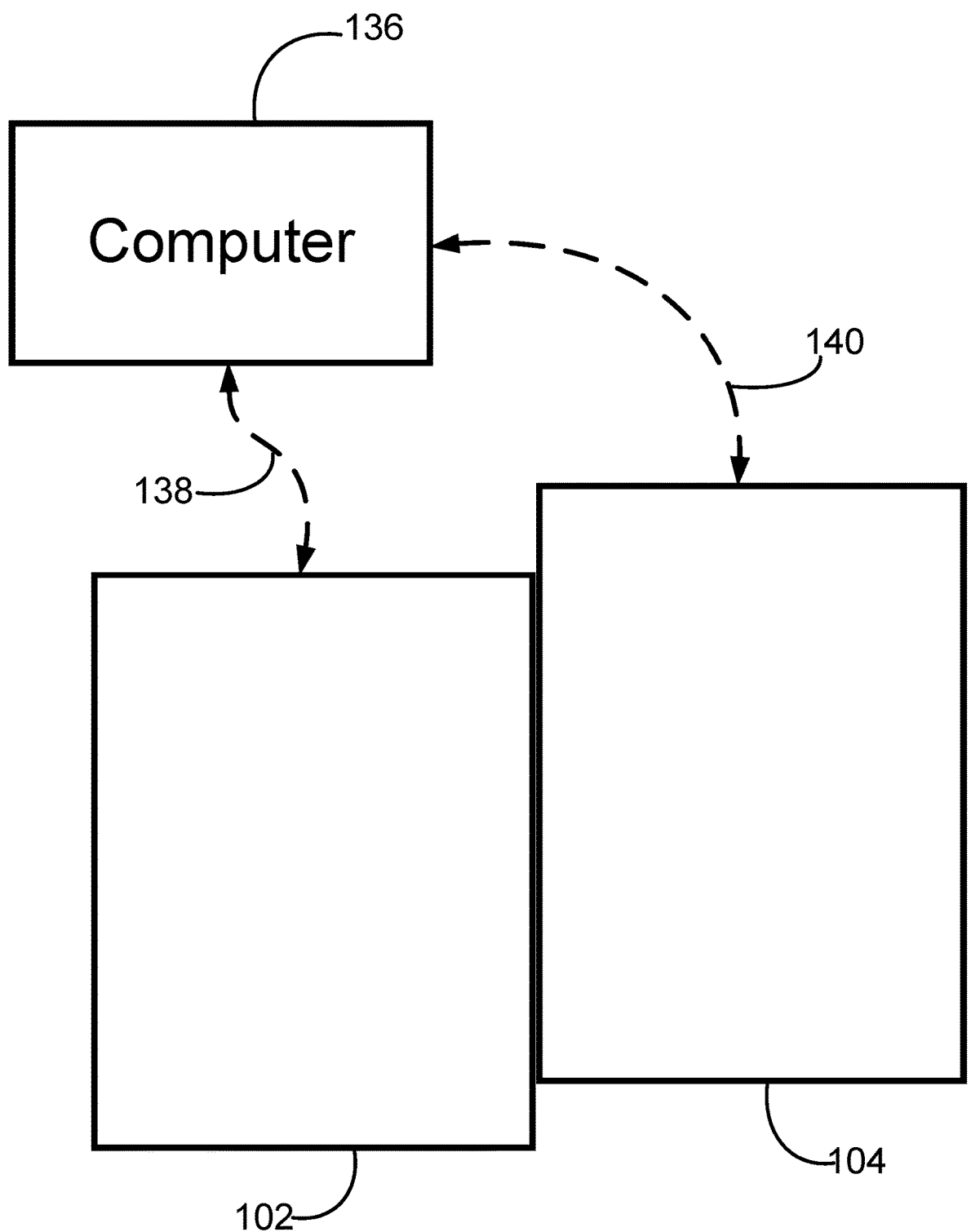

Referring to FIG. 5, a computer 136 may include a data processor, a memory device, a non-volatile memory device (e.g., hard drive or solid state drive), a display controller, and input devices (e.g., keyboard, mouse, touch input interfaces, voice command interfaces, and/or gesture command interfaces). The computer 136 may generate image data and transmit the image data to the display modules 102, 104 wirelessly through wireless links 138, 140, respectively. The display module 102 transmits the sensor data from the sensor 106 to the computer 136 to enable the computer 136 to determine the position of the display module 104 relative to the display module 102.

Referring to FIG. 6A, in some implementations, when the computer 136 intends to display an image 142 that spans both of the display modules 102 and 104, the computer 136 can scale the image 142 to have a size that is entirely contained within the display regions of the display modules 102, 104. The computer 136 splits the image 142 into two portions 146 and 148, sends the first portion 146 to the first display module 102, and sends the second portion 148 to the second display module 104.

Referring to FIG. 6B, when the user moves the image 142 upwards, a portion 144 of the image 142 moves outside of the display area of the first display module 102 and becomes not visible. Referring to FIG. 6C, when the user moves the image 142 downwards, a portion 150 of the image 142 moves outside of the display area of the second display module 104 and becomes not visible.

Referring to FIG. 6D, in some implementations, when the computer 136 intends to display an image 142 that spans both of the display modules 102 and 104, the computer 136 can scale the image 142 to have a size that utilizes the entirety of the display regions of the display modules 102, 104. The computer 136 splits the image 142 into two portions 156 and 158, sends the first portion 156 to the first display module 102, and sends the second portion 158 to the second display module 104.

In the example of FIG. 6D, a portion 152 of the image 142 is outside the display region of the first display module 102, and a portion 154 of the image 142 is outside the display region of the second display module 104. The computer 136 determines a first portion of the image 142 that can be shown in the display region of the first display module 102 and sends graphic data to the first display module 102 to cause the first display module to show the first portion of the image 142. The computer 136 determines a second portion of the image 142 that can be shown in the display region of the second display module 104 and sends graphic data to the second display module 104 to cause the second display module 104 to show the second portion of the image 142.

Example 2

Figure 7:
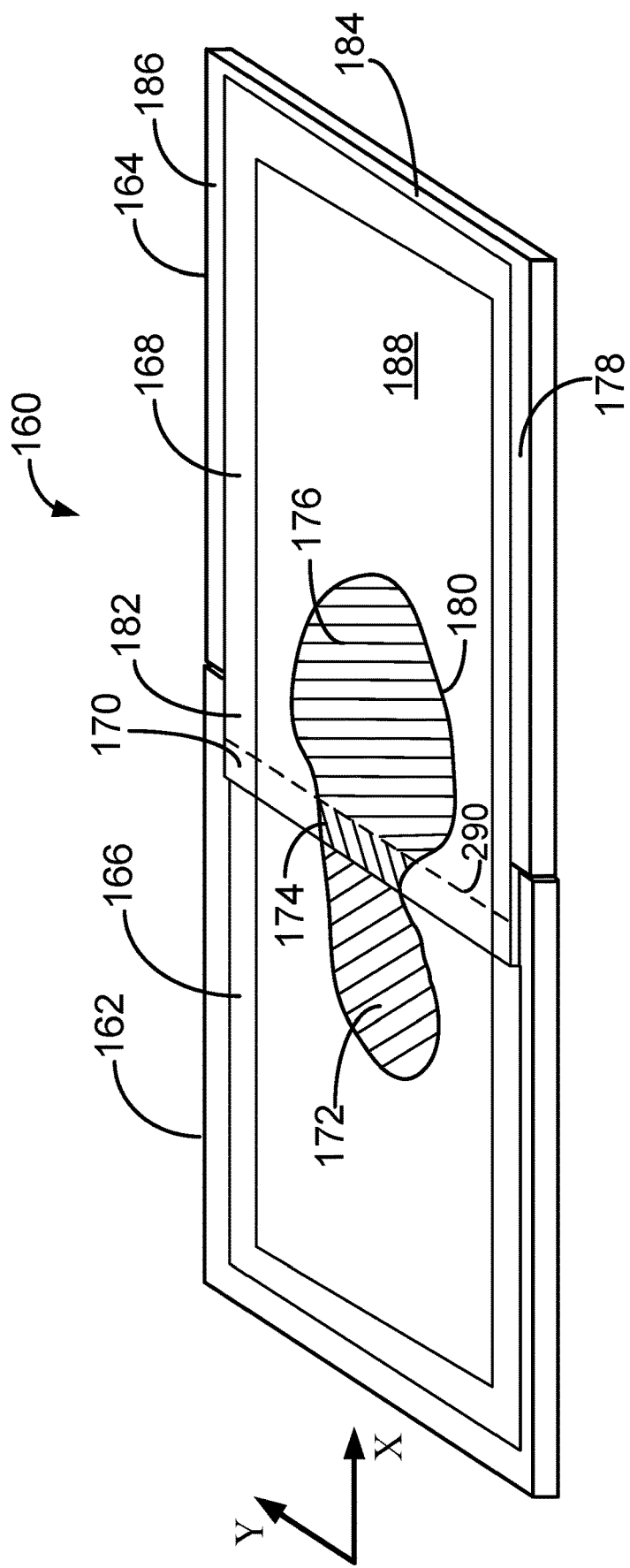

Referring to FIG. 7, a display system 160 includes a first display panel 162 and a second display panel 164. The first display panel 162 has a first active display region 166. The second display panel 168 has a second active display region 168 and a transparent or semi-transparent border region 170. The transparent or semi-transparent border region 170 overlaps the first active display region 166 such that some of the pixels of the first active display region 166 are covered by the transparent or semi-transparent border region 170.

When the display system 160 shows an image 188 that includes an object 180 that spans the first and second active display regions 166 and 168, a first portion 172 of the object 180 is shown by pixels in the first active display region 166 not covered by the border region 170, a second portion 174 of the object 180 is shown by pixels in the first active display region 166 that are covered by the border region 170, and a third portion 176 of the image 180 is shown by pixels in the second active display region 168.

The second active display region 168 has a portion 182 that extends over a portion of the frame of the first display panel 162. The second display panel 164 may be designed to extend the display area of a particular model of first display panel 162 in which the bezel width of the first display panel 162 is known, so the width of the portion 182 extending over the first display panel 162 is designed to be the same as the width of the bezel. This way, the edge of the second active display region 168 is aligned with the edge of the first active display region 166.

In some implementations, the driver circuits (e.g., column drivers and row drivers) of the second display panel 164 can be placed near borders or edges of the second active display region 168 that are covered by frame portions 178, 184, and 186. For example, if the transparent or semi-transparent border region 170 is on the left side of the second display panel 164, then the row drivers can be positioned near the right edge 184, and column drivers can be positioned near the upper edge 186 and/or the lower edge 178.

In some implementations, the second active display region 168 includes a substrate and pixel circuits formed on the substrate. The frame portion 184 protects the right edge, the frame portion 186 protects a portion of the upper edge, and the frame portion 178 protects a portion of the lower edge of the second active display region 168. In some implementations, to keep the portion 182 thin, the portion 182 is not protected by a frame portion. In some implementations, the edges of the portion 182 is protected by a thin flexible plastic material that wraps around the upper or lower edge of the portion 182.

Figure 8:
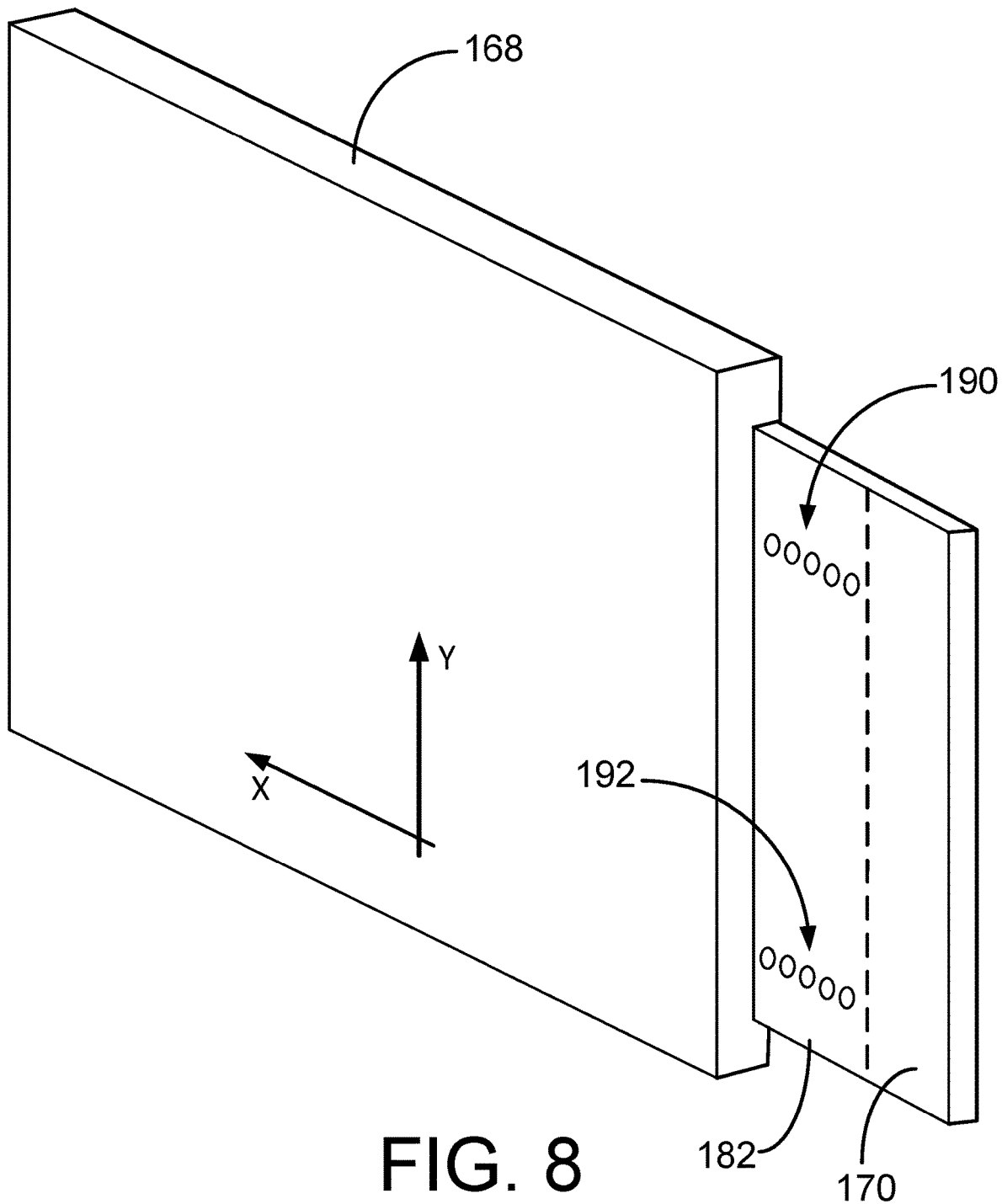
FIG. 8 is a diagram of a display panel.

Referring to FIG. 8, in some implementations, a sensor is provided on a backside of the portion 182 of the second display panel 168. The sensor is configured to sense a parameter that provides information about a position of the second display panel 168 relative to the position of the first display panel 166 and generate a sensor output signal. For example, the sensor can include one or more individual photo sensors or image sensors. In the example of FIG. 8, the sensor includes a first series of photo sensors or image sensors 190 and a second series of photo sensors or image sensors 192. The photo or image sensors 190 and 192 sense light emitted from one or more pixels of the first display panel 166 that are covered by the portion 182 of the second display panel 164. By using two series of photo sensors or image sensors 190 and 192, it is possible to determine the orientation of the second display panel 164 relative to the first display panel 162.

Figure 9:
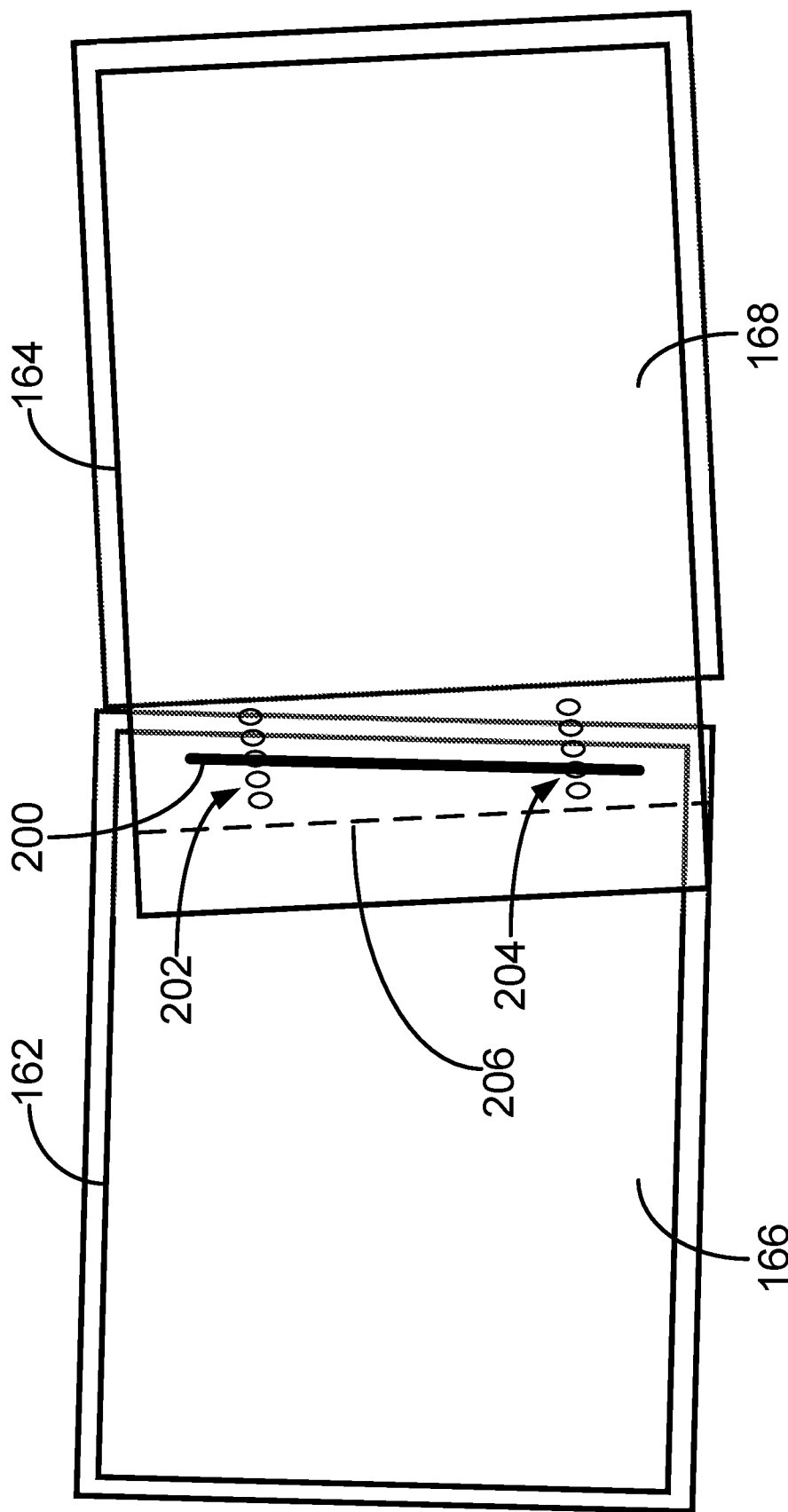
FIGS. 9-13 are diagrams of extendable display systems.

Referring to FIG. 9, the first display panel 162 may show a line 200 near a right edge of the active display region 166. The line 200 is sensed by a photo sensor 202 (of the series of photo sensors 190) and a photo sensor 204 (of the series of photo sensors 192). The first display panel 162 activates each pixel on the line 200 from top to bottom until the light from the pixel is sensed by the photo sensor 202. This indicates that the sensor 202 is facing the activated pixel. The first display panel 162 actives each pixel on the line 200 from bottom to top until the light from the pixel is sensed by the photo sensor 204. This indicates that the sensor 204 is facing the activated pixel.

Because the coordinates of the sensors 202 and 204 on the second display panel 164 are known, and the coordinates of the corresponding pixels on the first display panel 162 are also known, it is possible to accurately determine the relative positions (displacement in the x and y directions) and orientations of the first and second display panels 162, 164. This allows a graphics controller to determine what images to show on the first and second display panels 162, 164 such that the images shown on the first and second display panels 162, 164 correctly align at the border 206 between transparent or semi-transparent region 170 and the portion 182 of the second active display region 168.

The sensors 202 and 204 can be made of an image sensor having an array (or a series) of photo sensors and an array (or a series) of micro-lenses that focus light onto the photo sensors. There may be multiple rows of micro-lenses in which different rows have different focal lengths in order to focus light from the pixels of the first display panel 162 at different distances. Each of the sensors 202 and 204 can be a contact image sensors that includes an array of photo sensors and an array of lenses, such as a Selfoc lens array. The photo sensors can be formed directly on the back side of the substrate that supports the pixel circuits on the front side. The photo sensors can also be formed on a separate substrate that is bonded to the substrate that supports the pixel circuits.

The back side of the transparent or semi-transparent border region 170 can have an anti-reflective coating, or an anti-reflective multi-layer coating to increase transmissivity of light from the pixels of the first active display region 166 through the transparent or semi-transparent border region 170.

Figure 10:
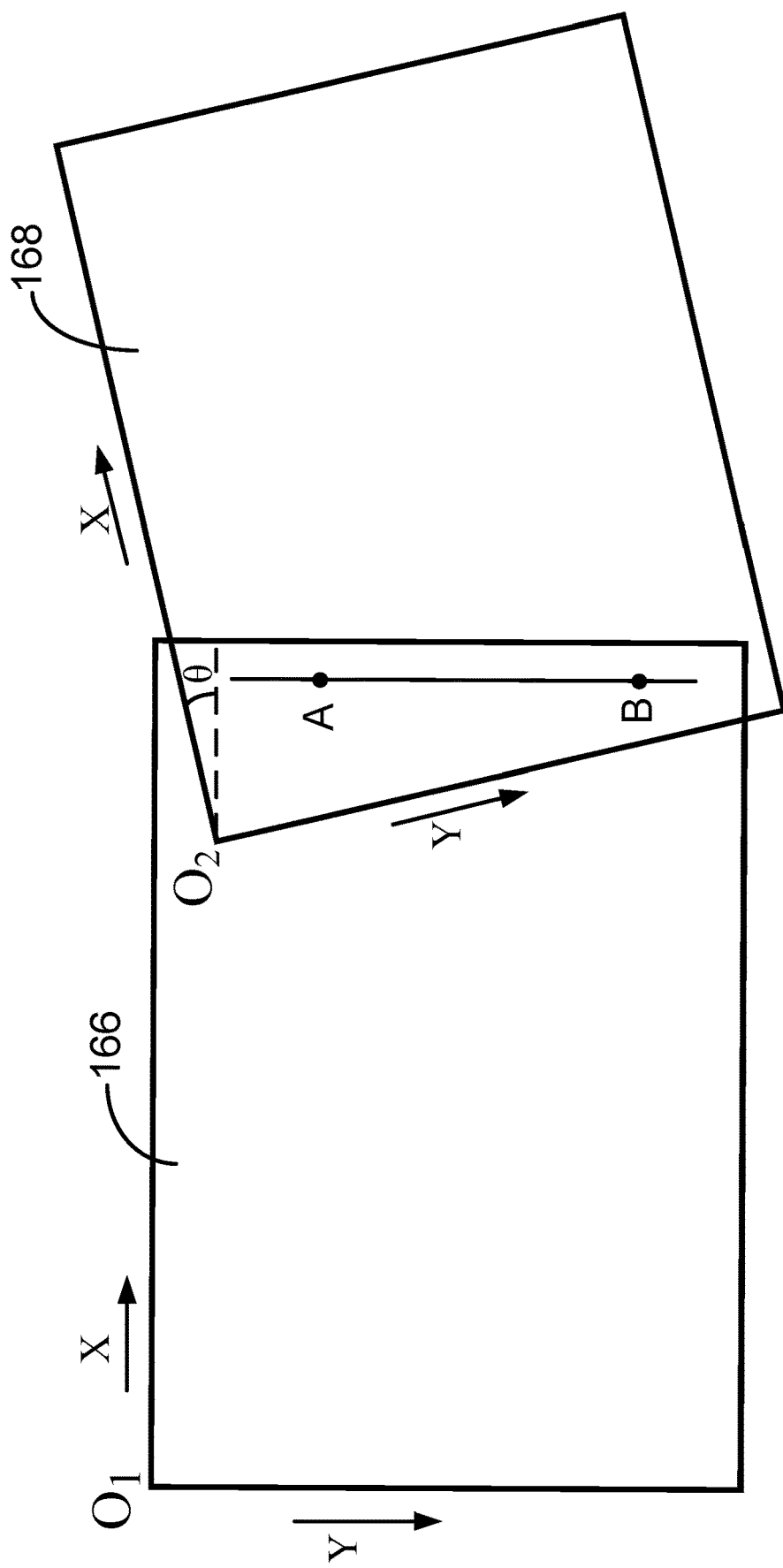

Referring to FIG. 10, in some examples, the rows of the first active display region 166 extends at an angle relative to the rows of the second active display region 168. Let's assume that a first sensor on the backside of the region 182 detected a pixel at position A on the line 200 shown on the first active display region 166. The first sensor corresponds to a pixel on the front side of the active display region 168 having coordinates (x12, y12) in the second display coordinate system. In the second display coordinate system, the upper left corner of the second active display region 168 is the origin O2 with coordinates (0, 0). The pixel at position A on the first active display region 166 has coordinates (x11, y11) in the first display coordinate system. In the first display coordinate system, the upper left corner of the first active display region 166 is the origin O1 with coordinates (0, 0). Here, we assume that the x and y pitches of the first and second active display regions 166 and 168 are the same, so that the x and y dimensions of a pixel on the second active display region 168 having coordinates (i1, i2) relative to the origin O2, will be the same as the x and y dimensions of a pixel on the first active display region 168 having coordinates (i1, i2) relative to the origin O1.

In this example, the pixel (x12, y12) on the second active display region 168 overlaps the pixel (x11, y11) on the first active display region 166. The coordinates (x12, y12) refer to the coordinates of the pixel on the front side of the active display region 168 in the second display system, and the coordinates (x11, y11) refer to the coordinates of the pixel of the first active display region 166 in the first display system.

Assume that a second sensor on the backside of the region 182 detected a pixel at position B on the line 200 shown on the first active display region 166. The second sensor corresponds to a pixel on the front side of the active display region 168 having coordinates ($x_{22}$, $y_{22}$) in the second display coordinate system. The pixel at position B on the first active display region 166 has coordinates ($x_{21}$, $y_{21}$) in the first display coordinate system. In this example, because the line 200 is a vertical line, $x_{11}=x_{21}$. The relative angle θ between the first and second active display regions 166, 168 can be calculated as follows.

$$\operatorname{Tan}(\theta) = (|x_{12} - x_{22}|)/(|y_{12} - y_{22}|), \quad (1)$$
$$\text{so } \theta = \arctan((|x_{12} - x_{22}|)/(|y_{12} - y_{22}|)),$$

$$\text{or } \theta = \arctan\left(\frac{|x_{12} - x_{22}|}{|y_{12} - y_{22}|}\right). \quad (2)$$

Assume that the coordinates of the origin $O_2$ of the second active display region 168 in the first display coordinate system is (Δx, Δy), then Δx and Δy can be calculated as follows.

$$\Delta x = x_{11} - y_{12}*\sin(\theta) - x_{12}*\cos(\theta), \quad (3)$$

$$\Delta y = y_{11} - y_{12}*\cos(\theta) + x_{12}*\sin(\theta). \quad (4)$$

If a pixel P1 on the first active display region 166 has coordinates ($x_{31}$, $y_{31}$), then the pixel P2 on the second active display region 168 that overlaps the pixel P1 will have coordinates ($x_{32}$, $y_{32}$) in which $$x_{32} = (x_{31} - \Delta x) * \cos(\theta) - (y_{31} - \Delta y) * \sin(\theta). \quad (5)$$

$$y_{32} = x_{32} * \tan(\theta) + (y_{31} - \Delta y)/\cos(\theta) = \quad (6)$$
$$(x_{31} - \Delta x) * \sin(\theta) - (y_{31} - \Delta y) * \sin(\theta) * \tan(\theta) + \frac{y_{31} - \Delta y}{\cos(\theta)}.$$

If a pixel P3 on the second active display region 168 has coordinates ($x_{42}$, $y_{42}$), then the pixel P4 on the first active display region 166 that is covered by the pixel P3 will have coordinates ($x_{41}$, $y_{41}$) in which $$x_{41} = x_{42}/\cos(\theta) + y_{42}*\sin(\theta) - x_{42}*\sin(\theta)*\tan(\theta) + \Delta x, \quad (7)$$

$$y_{41} = y_{42}*\cos(\theta) - x_{42}*\sin(\theta) + \Delta y. \quad (8)$$

A graphics controller module controls the first and second active display regions 166, 168 such that when the control module detects that the second display panel 164 overlaps the first display panel 164 in which the first active display region 166 is adjacent to the second active display region 168 or overlaps a portion of the second active display region 168, the first and second active display regions 168 show an image that spans a portion of the first active display region 166 behind the transparent or semi-transparent border region 170 and a portion of the second active display region 168 adjacent to the transparent or semi-transparent border region 170.

In some implementations, the positions of the smaller displays relative to one another can be determined by using a smartphone having a camera that takes pictures of the smaller displays. The smaller displays may take turns showing markings on the edges or corners of the displays. The smartphone may communicate with the display controller in order to determine the relative positions of the smaller displays. For example, suppose two displays partially overlap in which the right display (i.e., the display positioned on the right side) has a left border on top of a left display (i.e., the display positioned on the left side). The two displays take turns showing the rectangular borders of the active display areas. The right display shows a complete rectangular border, whereas the left display shows a partially obscured border. The images captured by the smartphone can be used to determine that the right display is above the left display. The display controller controls the left display to show a vertical line starting from the right border, gradually moving toward the left border. Initially, the vertical line is behind the right display and is not captured by the camera of the smartphone. When a portion of the vertical line is in the image captured by the camera, the smartphone informs the video controller, so that the video controller can determine which portion of the left display is covered by the right display. The images captured by the camera can also be used to determine the relative angles of the two displays.

The camera can be part of a head-mounted device, such as a head-mounted augmented reality system. The camera can also be part of a pair of eyeglasses. For example, the camera can be integrated into a portion of the eyeglasses frame. An advantage of using a camera mounted on the eyeglasses frame is that the images captured by the camera are similar to the images seen by the user's eyes. When the displays are calibrated by the camera such that a line spans continuously across the displays in the images captured by the camera, the images shown on the displays as seen by the user's eyes will align accurately across the displays. This is useful when the user is looking at the display panels 162, 164 at an angle that is different from the vertical direction. The portion 182 has a thickness such that when a first pixel on the top active display region (e.g., 168 in FIG. 10) is vertically aligned with a second pixel on the bottom active display region (e.g., 166 in FIG. 10), the first pixel may not overlap the second pixel when the user views the display panels 162, 164 at an angle.

When the camera integrated in the eyeglasses frame is used to calibrate the display panels 162, 164, the image shown on the second display panel 164 may be slightly shifted relative to the first display panel 162 depending on the user's viewing angle.

Figure 16:
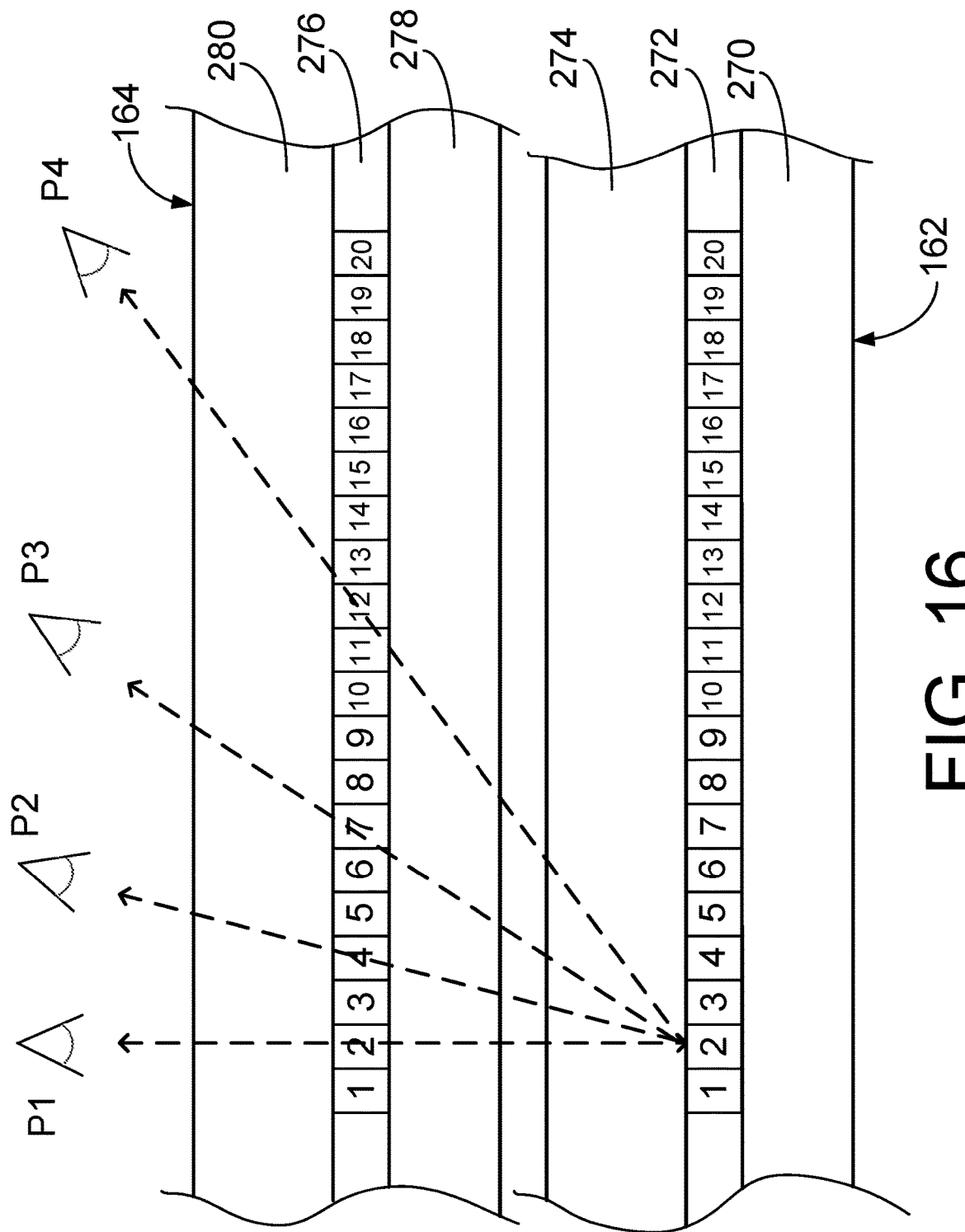
FIG. 16 is a cross-sectional diagram of a display.

For example, FIG. 16 shows a cross-sectional view of the first and second active display regions 166, 168, along a boundary 290 between the transparent or semi-transparent border region 170 and the portion 182 of the second active display region 168 (see FIG. 7). The portion 182 of the second active display region 168 overlaps a portion of the first active display region 166 covered by the border region 170.

The portion of the first active display region 166 includes a layer of pixel circuits 272, a layer 270 below the layer of pixel circuits 272, and a layer 274 above the layer of pixel circuits 272. The layer 270 can include, e.g., a substrate that supports the layer of pixel circuits 276. The layer 274 can include, e.g., a protective layer, a color filter layer, a polarization layer, or a combination of the above layers. Similarly, the portion 182 of the second active display region 168 can include a layer of pixel circuits 276, a layer 278 below the layer of pixel circuits 276, and a layer 280 above the layer of pixel circuits 276. The layer 278 can include, e.g., a substrate that supports the layer of pixel circuits 276. The layer 280 can include, e.g., a protective layer, a color filter layer, a polarization layer, or a combination of the above layers.

In FIG. 16, the pixels in the layer 272 are immediately to the left of the boundary 290 (see FIG. 7), and the pixels in the layer 276 are immediately to the right of the boundary 290. Consider the situations when the user views the pixels in the layers 272 and 276 along viewing directions that lie on a plane aligned with the boundary 290 and perpendicular to the surface of the active display regions 166, 168. When the user views the displays in a direction perpendicular to the surface of the active display regions, such as when the user's eye is at position P1, the pixel 2 in the layer 272 is aligned with the pixel 2 in the layer 276. In this example, in order for the pixel images shown by the pixels of the layer 276 to align with the pixel images shown by pixels of the layer 274, the pixels 1-20 of the layer 276 should show pixel images that are aligned with pixels 1-20 of the layer 272. Thus, if a line that is 10 pixels wide extends in the x-direction across the border 290 at pixels 1 to 10 of layer 272, then at the portion 182 the line should be shown by pixels 1-10 of layer 276.

For example, if the user views the displays in a direction at an angle relative to the perpendicular direction, such as when the user's eye is at position P2, the pixel 2 in the layer 272 is aligned with the pixel 4 in the layer 276. In this example, in order for the pixel images shown by the pixels of the layer 276 to align with the pixel images shown by pixels of the layer 274, the pixels 3-22 of the layer 276 should show pixel images that are aligned with pixels 1-20 of the layer 272. Thus, if a line that is 10 pixels wide extends in the x-direction across the border 290 at pixels 1 to 10 of layer 272, then at the portion 182 the line should be shown by pixels 3-13 of layer 276.

For example, if the user's eye is at position P3, the pixel 2 in the layer 272 is aligned with the pixel 7 in the layer 276. In this example, in order for the pixel images shown by the pixels of the layer 276 to align with the pixel images shown by pixels of the layer 274, the pixels 6-25 of the layer 276 should show pixel images that are aligned with pixels 1-20 of the layer 272. Thus, if a line that is 10 pixels wide extends in the x-direction across the border 290 at pixels 1 to 10 of layer 272, then at the portion 182 the line should be shown by pixels 6-15 of layer 276.

For example, if the user's eye is at position P4, the pixel 2 in the layer 272 is aligned with the pixel 12 in the layer 276. In this example, in order for the pixel images shown by the pixels of the layer 276 to align with the pixel images shown by pixels of the layer 274, the pixels 11-30 of the layer 276 should show pixel images that are aligned with pixels 1-20 of the layer 272. Thus, if a line that is 10 pixels wide extends in the x-direction across the border 290 at pixels 1 to 10 of layer 272, then at the portion 182 the line should be shown by pixels 11-20 of layer 276.

The images captured by the camera of the smartphone or smart eyeglasses can also be used to calibrate the brightness, contrast, and color across the multiple smaller displays so that the multiple displays have the same or similar brightness, contrast, and/or color. The images captured by the camera can be used to determine the amount of compensation required for the pixels covered by the transparent (or semi-transparent) border of another display. For example, the lower display may increase the brightness of the pixels covered by the transparent (or semi-transparent) border of the upper display until the image has a uniform brightness across the displays. For example, the lower display may adjust the color of the pixels covered by the transparent (or semi-transparent) border of the upper display until the image has a uniform color across the displays.

Figure 11:
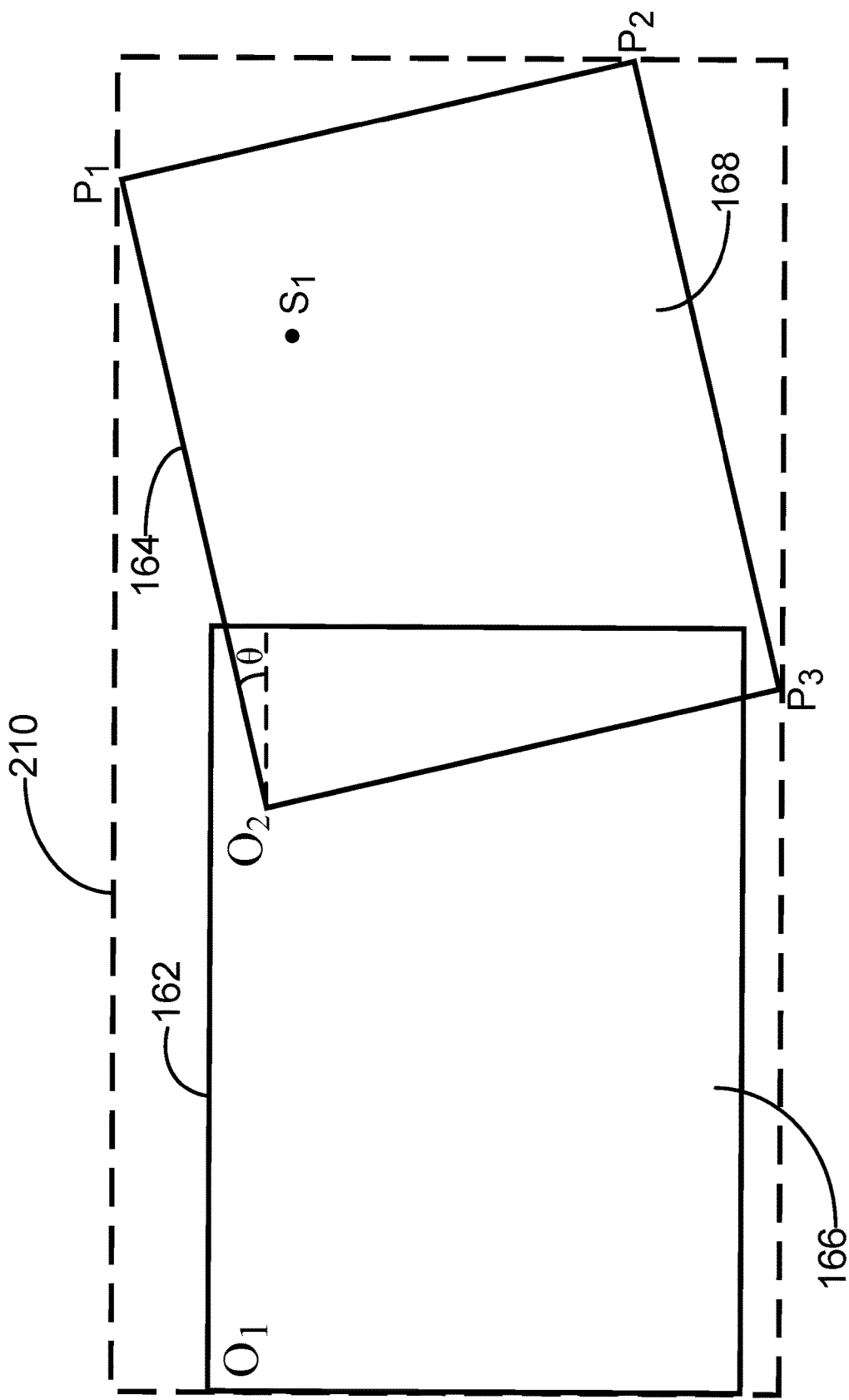

Referring to FIG. 11, in some implementations, the first display panel 162 is treated as the main display, and the graphics controller first determines an image 210 that would cover all of the pixels of both the first and second display panels 162, 164. The graphics controller determines the coordinates of the corners of the second display panel 164 using the first display coordinate. In the example of FIG. 11, the minimum x coordinate of the image is 0, the maximum x coordinate of the image is the x coordinate of the point P2, the minimum y coordinate of the image is the y coordinate of the point P1, and the maximum y coordinate of the image is the y coordinate of the point P3, all using the first display coordinate.

For example, suppose each of the first and second display panels has a resolution of 1920×1080 pixels. Suppose the origin O2 of the second display panel 164 overlaps pixel (1820, 20) on the first display panel 162, and the angle between the edges of the first and second display panels is 5°. Using equations (7) and (8), we can determine that point P1, corresponding to pixel (1920, 0) in the second display coordinate system, corresponds to (3732.69, −147.34) or (3733, −147) in the first display coordinate system. Point P2, corresponding to pixel (1920, 1080) in the second display coordinate system, corresponds to (3826.82, 928.55) or (3827, 929) in the first display coordinate system. Point P3, corresponding to pixel (0, 1080) in the second display coordinate system, corresponds to (1914.13, 1095.89) or (1914, 1096). The controller generates an image that spans from (0, −147) on the upper left corner to (3827, 1096) on the lower right corner.

Let's assume that the color and brightness values of each pixel for the image using the first display coordinate system is known. The first active display region 166 shows the portion of the image 210 that spans from (0, 0) on the upper left to (1920, 1080) on the lower right. The color and brightness of each pixel in the second active display region 168 can be determined as follows.

For each pixel S1 in the second active display region 164, the graphics controller determines the coordinates in the first display coordinate system using equations (7) and (8), looks up the color and brightness values for that pixel in the image 210, and assigns the color and brightness values to the pixel S1. Using equations (7) and (8), the coordinates may have decimal points. In some examples, we can round off the decimal points of the coordinates so that the pixel S1 maps to a pixel on the image 210. In some examples, if the pixel S1 maps to a point between centers of pixels on the image 210, the color and brightness of the pixel S1 can be determined based on a weighted average of the color and brightness values, respectively, of the pixel where the point falls on the pixels adjacent to the point.

Figure 12:
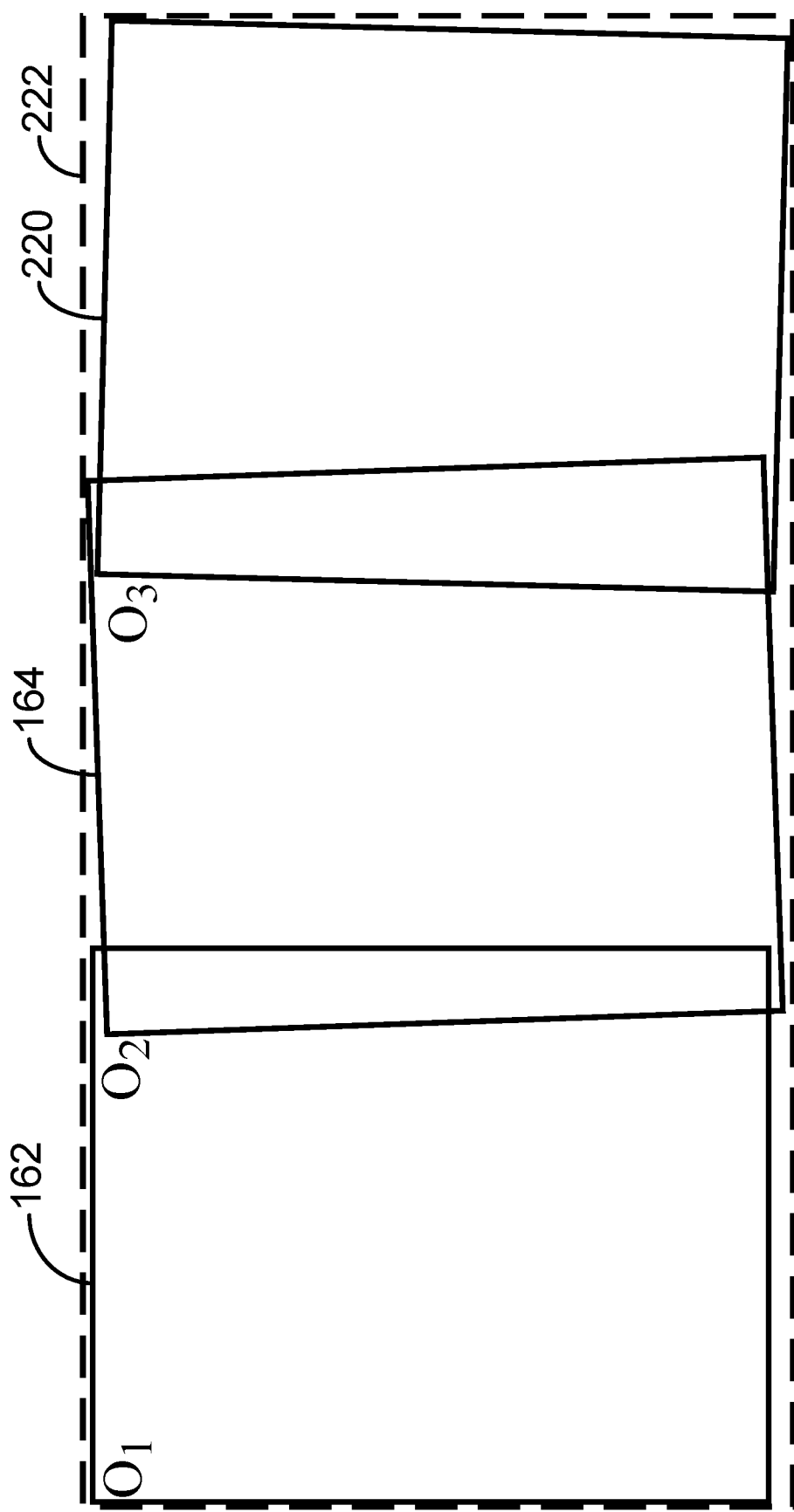

Referring to FIG. 12, when there are three display panels 162, 164, and 220, the graphics controller can determine the coordinates of each pixel on the third display panel 220 in the second display system, and then determine the coordinates of the pixel in the first display system. The graphics controller determines an image 222 that covers all three display panels. The color and brightness of each pixel in the first display coordinate system are known. The coordinates of each pixel in the second active display region in the first display coordinate system are calculated, and the color and brightness can be determined according to the method described above. Similarly, the coordinates of each pixel in the third active display region in the first display coordinate system are calculated, and the color and brightness can be determined according to the method described above.

Figure 13:
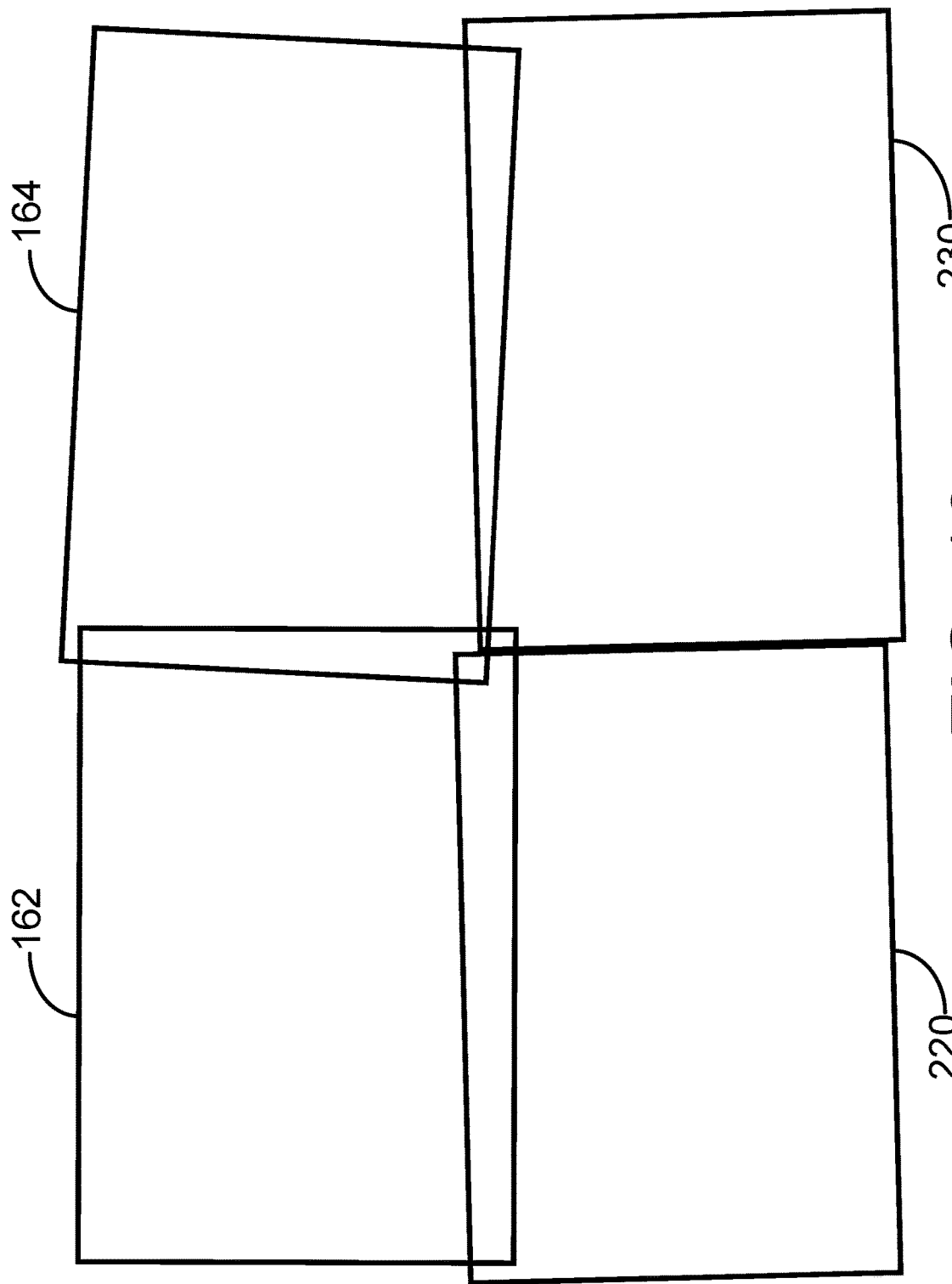

Referring to FIG. 13, when there are four display panels 162, 164, 220, and 230 that overlap at borders, the same method can be used to determine the color and brightness values of each pixels of the display panels 162, 164, 220, and 230. Additional display panels can be added to further expand the overall display area.

Figure 17:
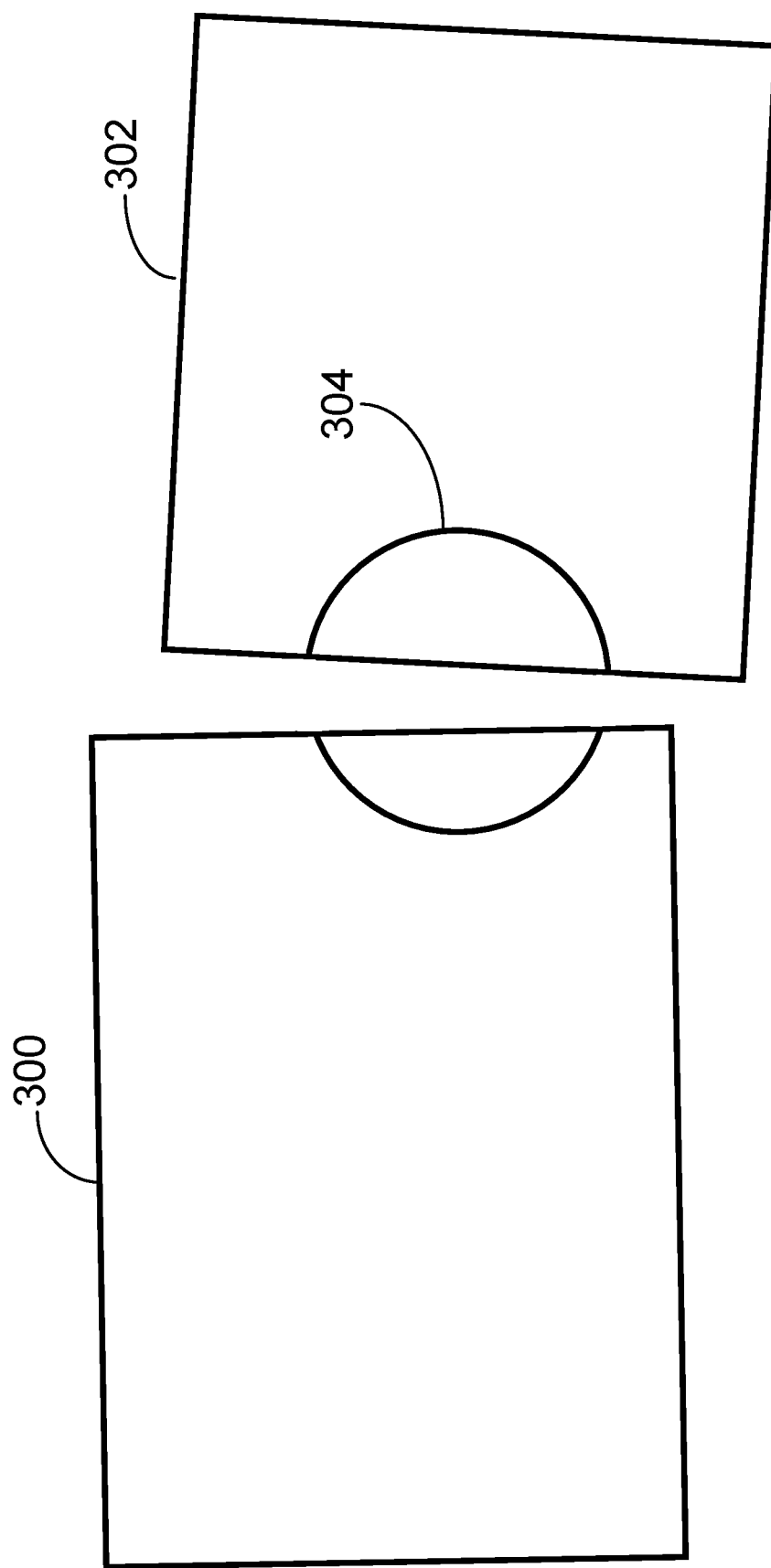
FIG. 17 is a diagram of a display system that includes two display panels.

If the image sensors at the backside of the display panels are used to determine the relative positions and orientations of the display panels, then the display panels need to partially overlap to enable the backside sensors to sense the light from the lower display panels. If an external camera is used to calibrate the alignment of the displays, then the active areas of the display panels do not need to overlap. For example, FIG. 17 shows a first active display region 300 and a second active display region 302 that collaboratively show an image of a circle 304 that extends across the first and second active display regions 300, 302. When the position of the second active display region 302 relative to the first active display region 300 changes, based on the feedback signals from the camera, the graphics controller dynamically adjusts the image shown on the second active display region 302 such that the circle 304 continues to be accurately shown across the first and second active display regions 300, 302.

Figure 18:
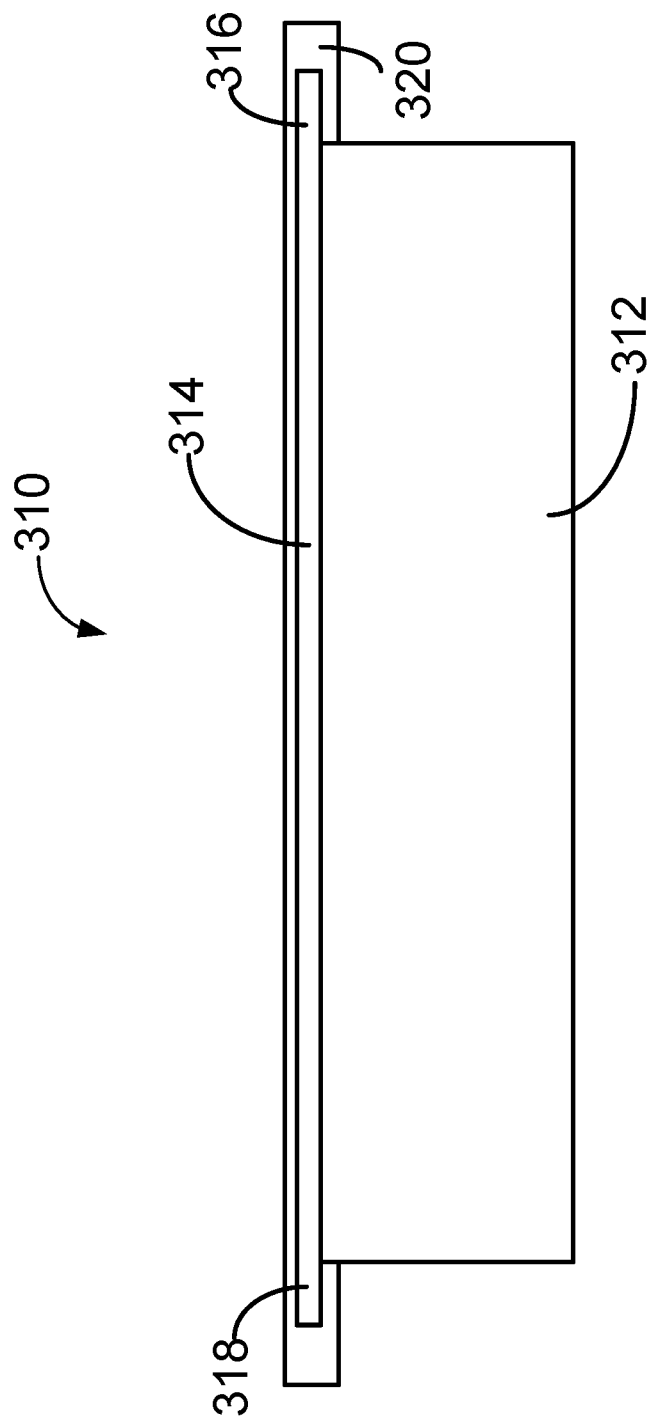
FIG. 18 is a cross-sectional diagram of a display.
Figure 19:
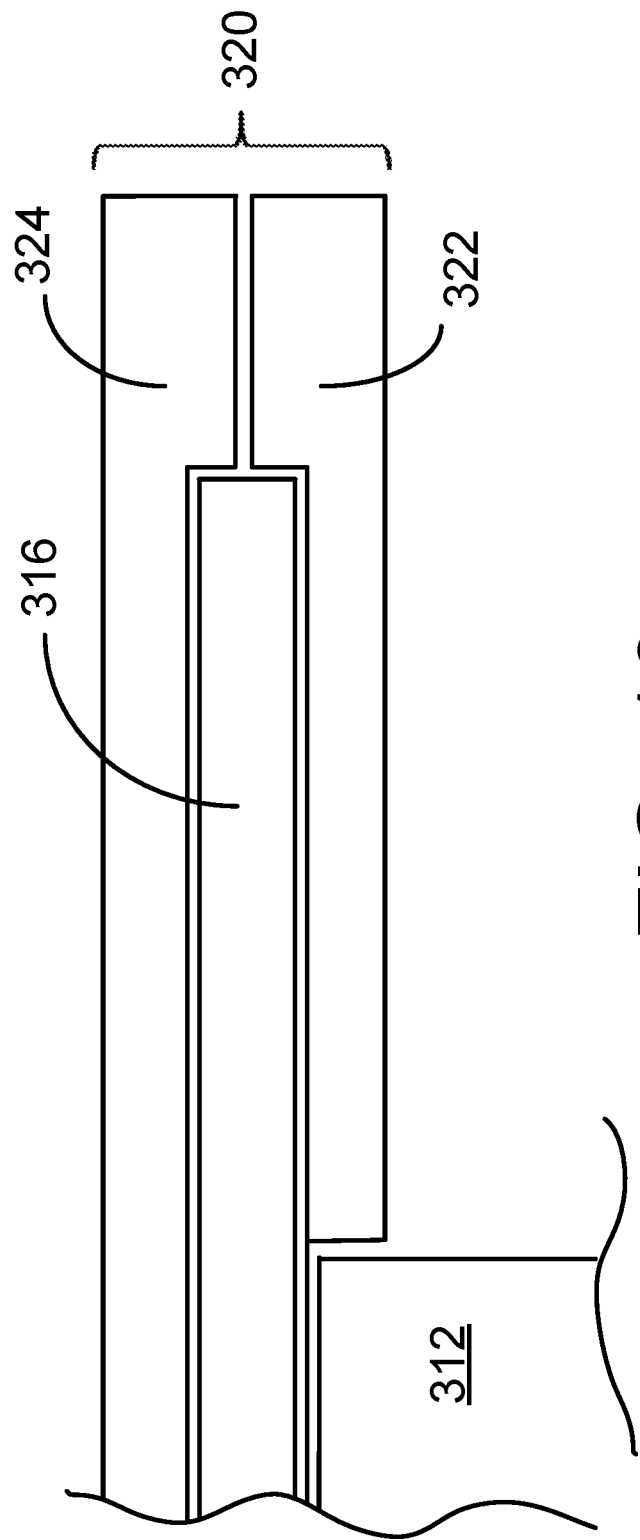
FIG. 19 is a cross-sectional diagram of a portion of the display shown in FIG. 18.

In some implementations, each display panel has transparent or semi-transparent borders on all edges, such as the top, bottom, left, and right edges. The transparent or semi-transparent borders are thin, whereas the middle portion of the display panel is thicker and houses the circuitry for driving the displays. FIG. 18 shows an exemplary display device 310 that includes a module 312 and a thin pixel layer 314. The module 312 includes circuitry for driving the pixels, battery, controller, and memory, etc. The thin pixel layer 314 has portions, e.g., 316, 318 that extend beyond the edges of the module 312, so that the portions 316 and 318 can overlap the active display regions of other displays. In some implementations, the thin pixel layer 314 is protected by a transparent or semi-transparent film 320. Referring to FIG. 19, in some implementations, the transparent or semi-transparent film 320 may be formed by an upper film 324 and a lower film 322 that are laminated or bonded together.

In some implementations, the display panels are OLED display panels that do not require backlight and thus can be made thin.

In some implementations, the pixel pitch (distance between pixels) for different display panels may be different. Equations (7) and (8) can be modified by using a scaling factor to take into account of the differences in pixel pitch.

An advantage of the display system described in this document is that the display panels do not have to be perfectly aligned, the system can determine the relative positions of the display panels and adjust the contents shown on the display panels accordingly. This is in contrast to the conventional display walls in which the content sent to each display panel is fixed, and the user has to ensure that the display panels are perfectly aligned in order for the image portions to be aligned properly. The display system described here dynamically adjusts displayed contents based on relative positions of the display panels.

Figure 14:
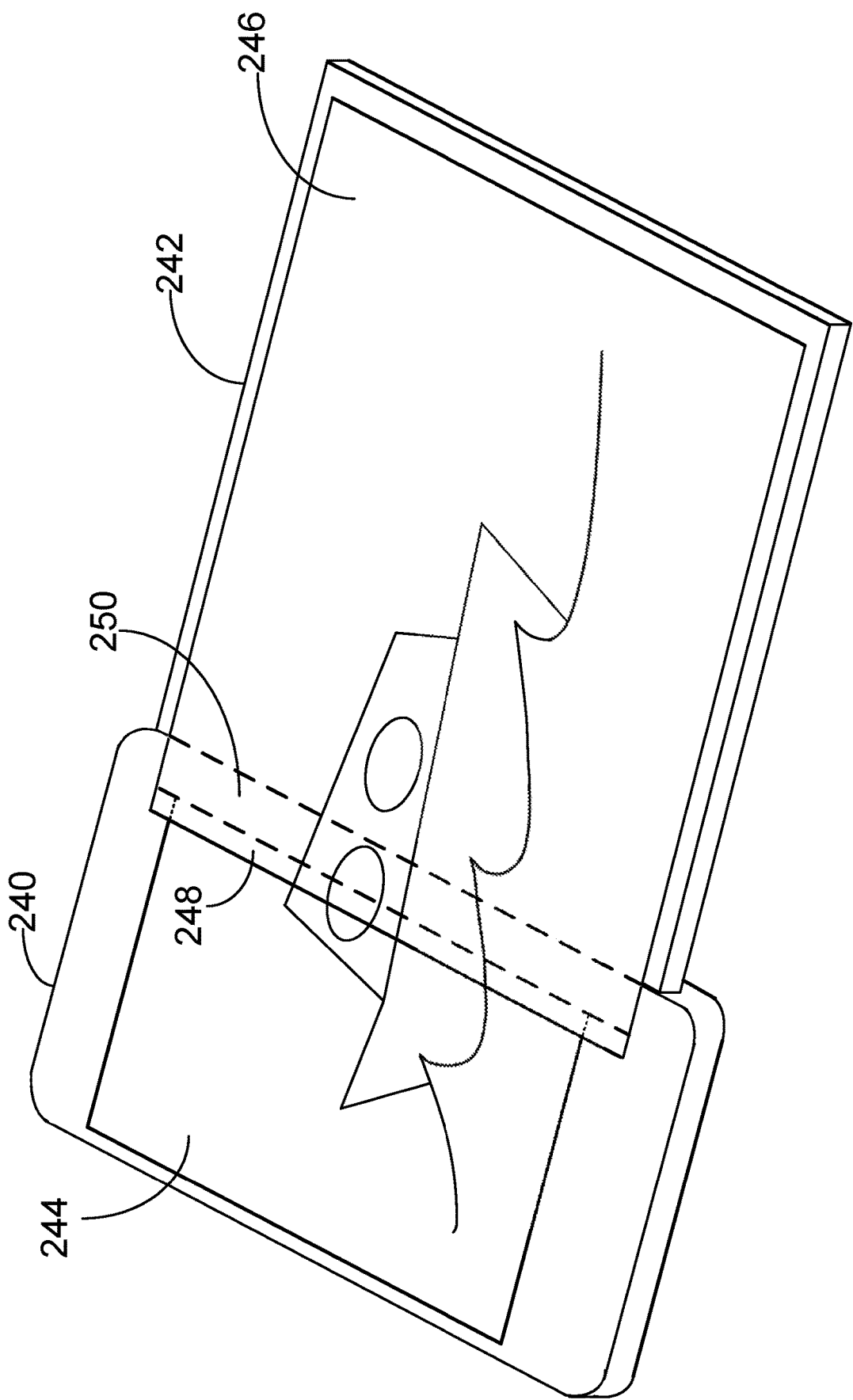
FIGS. 14 and 15 are diagrams of mobile phones and removable display panels.

An advantage of the display system described here is that the user can easily add more display panels to increase the display screen area, or remove display panels when the larger screen area is not needed. For example, referring to FIG. 14, a mobile phone 240 has an active display area 244. For ease of portability, the mobile phone 240 has a small size, so the active display area 244 necessarily has a small size. When the user sits down in front of a desk, the user may want to view content on a larger screen. The user can use a display panel 242 in which an active display area 246 has a portion 250 that either aligns with the edge of the active display area 244 or overlaps a portion of the active display area 244. A transparent or semi-transparent border region 248 overlaps a portion of the active display area 244. The active display area 244 and the active display area 246 effectively form a larger display that can show images that continuously span the active display areas 244 and 246.

In some examples, the display panel 242 displays images but is not responsive to touch inputs. This allows the display panel 242 to be made cheaper, thinner, and lighter. The user provides touch commands on the active display area 244 of the mobile phone 240. In some examples, the display panel 242 is a touch display panel that can accept touch inputs. The display panel 242 can also be made to be sensitive to different levels of pen pressure input.

Figure 15:
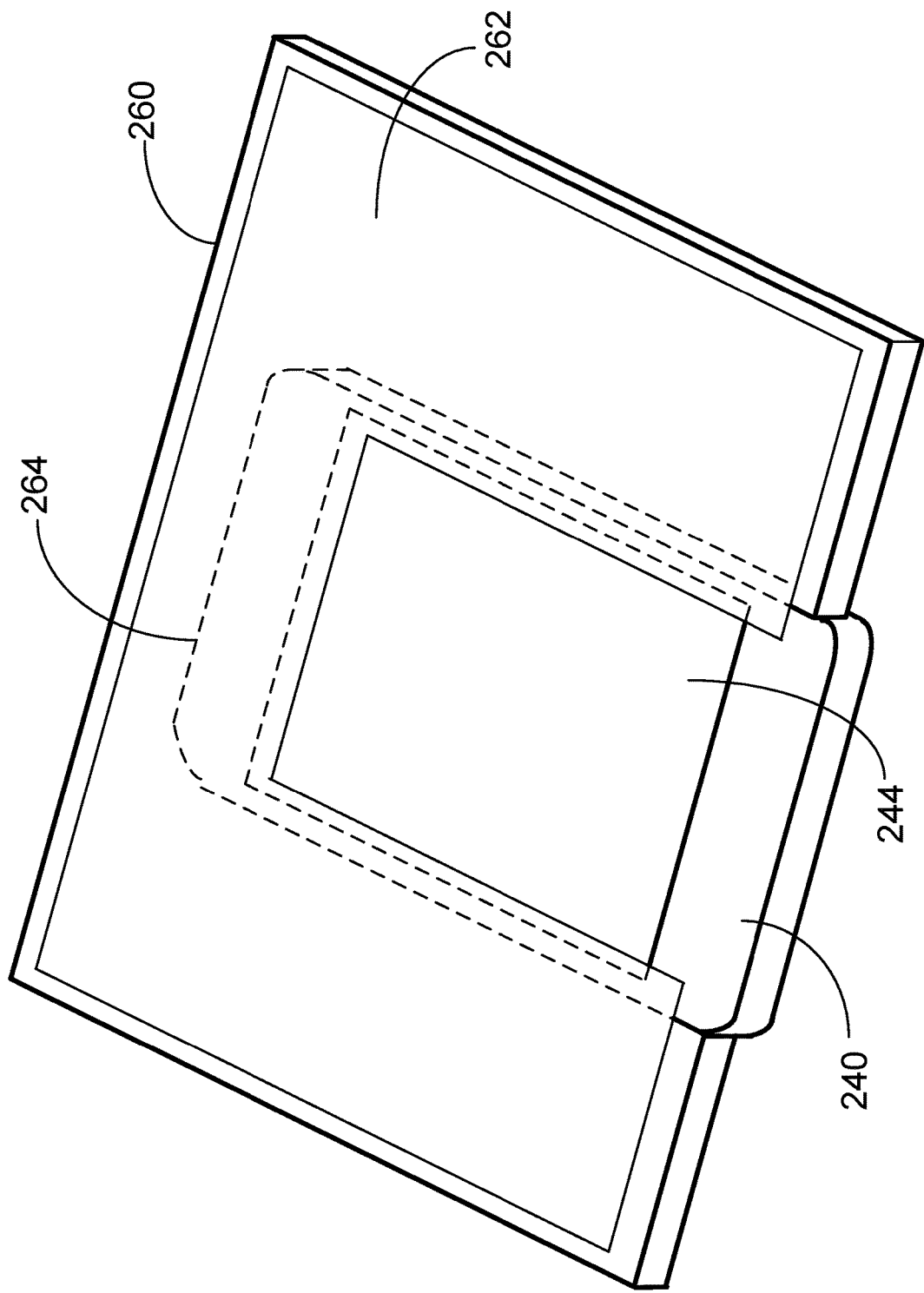

An active display area does not necessarily have to be rectangular in shape. For example, referring to FIG. 15, a display panel 260 has a U-shaped active display area 262 that overlaps portions of, or aligns with, the three edges of the active display area 244 of the mobile phone 240. The dashed lines 264 show the contours of the mobile phone 240.

In some implementations, the second display panel can be used to show sponsored content or advertisements while the first display panel show the main article without sponsored content or with reduced sponsored content. An advertisement is sometimes referred to as an "ad." The sponsored content can promote, e.g., consumer products or business services. The sponsored content can be associated with, e.g., people or ideas. The sponsored content can include, e.g., text, articles, blogs, logos, graphic images, photographs, or videos.

Because the second display panel is in the proximity of the first display panel, the reader of the main article will still see the sponsored content, but will be less distracted by the sponsored content compared to a conventional method of showing the ads embedded in the text of the main article, or showing the ads next to the main article such that only a small portion of the main article can be read at a time because a big portion of the screen space is used by the ads.

The system determines whether the second display is in proximity to the first display. If the system determines there is no second display in proximity to the first display, the system shows a content item, such as an article, and an advertisement on the first display. If the system determines that the second display is in proximity to the first display, such as overlapping the first display, the system shows at least a portion of the content item (e.g., the article) on the first display and shows the advertisement on the second display.

If the second display overlaps the first display, the content item can be shown across the first and second displays, and the ad can be shown on the second display. The system can detect a resolution of the second display and send information about the resolution of the second display to an ad server to enable the ad server to provide the advertisement based on the resolution of the second display. In some examples, the user may use a first web browser window to access article from the Internet. Upon determining that the second display is in proximity of the first display, the system opens a second web browser window on the second display to show the advertisement. The content item can include a video. The user plays the video, which the system shows on the first display, and the system shows the advertisement on the second display. The content item may be a long article that is several pages long, and the user needs to scroll down to see other portions of the article. The system can continue to show the advertisement on the second display as the content item is being scrolled down to show other pages on the first display.

In some implementations, advertisers can bid for ad slots positioned on the same display as the main content or on another display adjacent to the display on which the main content is shown. For example, a magazine web site can be configured such that if the user only uses one or more conventional displays, the main content and the advertisements are shown on the one or more conventional displays. If the user has a second display that overlaps a first display, or has a second display that has a particular key value or code, the web site can be configured to show the main content on the first display and the advertisement on the second display. By moving the advertisement to the second display, the user is not distracted by the ads while reading the main content, but can still see the ad and click on the ad if interested. The advertiser knows that the ad is being viewed by the user because the second display overlaps the first display or is in a vicinity of the first display.

When the ad is shown adjacent to the main content on the first display, the ad is typically smaller so that it doesn't block all of the main content. When the ad is shown on the second display, the ad can be as large as the second active display area. When the user scrolls down to read other pages of the main content, the second display can continue to show the ad. When the main content includes video, the second display can show ads that are relevant to the content of the video without interrupting the video. The user can pause the video and click on the ad if interested.

Because the ads shown on the second display can be larger, can stay on the display for a longer period of time, the likelihood of the ad being clicked on or otherwise acted upon by the user is higher than if a convention display is used. The magazine can charge more for the ad slot positioned on the second display. In some implementations, a system running an ad auction receives a plurality of bids for advertising positions that are associated with a keyword, in which the advertising positions include a first advertising position that is located on a first display and a second advertising position that is located on a second display in proximity to the first display. The system receives a query and one or more keywords associated with the query. The system performs an auction based at least in part on the query, the one or more keywords that are associated with the query, and the plurality of bids. Based on the plurality of bids and the auction, the system assigns the first advertising position to a first bidder and the second advertising position to a second bidder.

In some examples, the second advertising position can be located on a second display that overlaps the first display. The advertising positions can include a third advertising position that is located on a third display that is in proximity to the second display. The third display can overlap the second display. The advertising positions can include a third advertising position that is located on a third display that is in proximity to the first display, in which the second display is on a first side of the first display and the third display is on a second side of the first display. In some examples, the second display can be on a right side of the first display and the third display can be on a left side of the first display. In some examples, the second display can be on a right side of the first display and the third display can be on a top side of the first display. The third display can overlap the first display.

In some implementations, a magazine company can sell the second display that overlaps the first display, in which the second display has a unique key value stored in the display. When the user positions the second display to overlap the first display, the user can view content on the web site of the magazine company either free of ads or have the ads positioned on the second display. Upon visiting the magazine web site, the web server communicates with the user computer to determine whether there is a second display. Upon determining that there is a second display, the web server determines whether the second display has a key value that is associated with an account of a subscriber of the magazine. If the key value is associated with an authorized subscriber, the web server allows the user to view the content either free of ads or have the ads positioned on the second display. If the key value is not associated with an authorized subscriber, the second display functions as an extension of the first display. When the user views content on other web sites, the second display functions as an extension of the first display.

In some examples, a content provider can provide images or video having a resolution that is compatible with the larger display formed by the combination of smaller displays. For example, the content provider may have a server computer having a storage device that stores images with different content. The server may have several versions of each image with different resolution. For example, for each image, the server may have versions of each image with one or more of resolutions 640×480, 800×640, 1024×768, 1280×1024, 1600×1200, 2560×1600, 3840×2160, 5120×2880, and 7680×4320 pixels. When a user's computer communicates with the server computer to access an image, the user's computer provides information about the resolution of the larger display, and the server computer chooses a version of the image that has a resolution that matches the resolution of the larger display. The server computer sends the version of the image to the user's computer, and the user's computer shows the image on the larger display. The same principle applies to providing videos from the server computer to the user computer.

In some examples, the larger display may have a resolution that does not match the resolution of any version of the images stored at the server computer. The server computer can select a version of the image having a resolution that is slightly higher or lower than the resolution of the larger display. The server computer sends the version of the image to the user's computer, and the user's computer resizes the image to match the resolution of the larger display. The same principle applies to providing videos to users. The resizing of the images or videos can also be performed at the server computer.

When the larger display has an irregular shape, the server computer can (i) provide a version of the image having a horizontal resolution that matches, is slightly larger than, or is slightly smaller than the overall horizontal resolution of the larger display, (ii) provide a version of the image having a vertical resolution that matches, is slightly larger than, or slightly smaller than, the overall vertical resolution of the larger display, or (iii) provide a version of the image having horizontal and vertical resolutions that match, are both slightly larger than, or both slightly smaller than, the overall horizontal and vertical resolutions, respectively, of the larger display. The server computer sends the version of the image to the user's computer, and the user's computer shows the image on the larger display, or resizes the image if necessary to match the resolution of the larger display.

In some examples, the server computer may generate a version of the image in which the image has a resolution that is determined based on the resolution of the larger display connected to the user's computer. For example, the user's larger display may have the size of a window, and the server computer may provide images that simulate scenes that are seen through the window. The server computer may provide images that represent a scene as seen through an apartment window in, e.g., Boston or Paris. For example, a first user living in an apartment in Paris may have a high definition digital camera (having video capabilities) installed outside the window of the apartment, and stream the video from the camera to the server computer. The server computer may allow other users to subscribe to the video feed.

When a second user in Boston subscribes to the video feed, the server computer queries the second user's computer to obtain information about the resolution of the larger display of the second user. The server computer adjusts the video resolution (e.g., using interpolation, extrapolation, or other image processing methods) based on the resolution of the larger display associated with the second user, and sends the video to the second user's computer. The second user's computer shows the video on the larger display having the size of a window, so the second user can see what the first user sees outside the window of the apartment in Paris. In some examples, the first user can use multiple cameras to capture videos of the scene outside the Paris apartment window from different angles. The server computer combines the videos from the multiple cameras to form a single video having a higher resolution. The server computer then provides the higher resolution to the second user.

In some examples, audio is provided in combination with the video. In the example above, the first user may use a microphone to capture the sounds outside the Paris apartment window. Users who subscribe to the Paris apartment audio/video feed can see and hear the scenes and sounds of Paris.

The server computer may provide a platform to allow users to upload videos or stream live video. Users can upload or live stream video from different cities or scenic places. These videos have high resolutions, such as having thousands of pixels in the horizontal and/or vertical direction, so that when the images are shown on the larger display of the subscribers, the images represent realistic renderings of the scenes that the subscribers would see from actual windows.

In some examples, the first user uses a wide-angle camera, or multiple cameras pointed at different directions, to capture one or more videos of the scene outside of the Paris apartment window. One or more directional or omnidirectional microphones can be used to capture the sound outside the Paris apartment window. The second user (e.g., someone living in Boston) subscribes to the Paris video feed. The second user has a larger display formed by a combination of overlapping smaller displays, in which the larger display has the size of a window and may even be configured to look like a physical window.

For example, the larger display may be surrounded by a window frame. A 3D camera may be used to capture images of the second user, and software may be used to recognize the user's eyes in the captured images and determine the location of the user's eyes relative to the larger display. The second user's computer sends information about the resolution of the larger display, and the position of the second user's eyes relative to the second display to the server computer. The server computer generates a second video based on the video(s) provided by the first user in Paris, in which the second video takes into account of the position of the second user's eyes relative to the larger display. The second video represents what the second user would see if the second user were in the Paris apartment and the position of the second user's eyes relative to the window in the Paris apartment were the same as the position of the second user's eyes relative to the larger display in Boston. As the second user moves around in his/her apartment in Boston, the video of Paris shown on the larger display in the Boston apartment also changes. The server computer generates in real time videos of Paris based on the positions of the second user's eyes relative to the larger display in the Boston apartment. The larger display becomes a window to a different world.

The smaller displays can be 3D displays that show 3D images. The smaller displays form a larger display that shows a larger 3D image.

For example, the server computer can generate images and sounds that one would see and hear if he/she were living in a space colony on Mars. The larger display formed by multiple smaller displays can have a high resolution and show realistic images of scenes on Mars.

For example, the server computer can generate images and sounds that one would see and hear if he/she were living on Earth. This may be useful for people who live in a space colony on Mars. The larger display formed by multiple smaller displays can have a high resolution and show realistic images of scenes on Earth, so that people living on Mars can feel as if they were living on Earth.

For example, a larger display formed by multiple smaller displays can be installed in an inside cabin of a cruise ship. Camera can be installed on the outside of the cruise ship to capture images or videos of the scenes around the cruise ship. The larger display shows images or videos of the scenes outside of the cruise ship, so that the people in the cabin feel as if they were looking through a physical window.

For example, a 3D camera may be used to capture images outside of the cruise ship, and an eye-tracking device/software may be used to determine the location of the user's eyes relative to the larger display. The computer in the cabin sends information about the resolution of the larger display, and the position of the user's eyes relative to the larger display to the server computer of the cruise ship. The server computer generates a second video based on the video(s) provided by the cameras installed on the outside of the cruise ship, in which the second video takes into account of the position of the user's eyes relative to the larger display. The second video represents what the user would see if the user were in a cabin with window or balcony and the position of the user's eyes relative to the window or balcony were the same as the position of the user's eyes relative to the larger display. As the user moves around the cabin, the video of the outside scenes shown on the larger display in the cabin also changes. The server computer generates in real time videos of scenes outside the cruise ship based on the positions of the user's eyes relative to the larger display in the cabin. The larger display makes the inside cabin feels more like a cabin with a window or a balcony. In some implementations, the smaller displays can be 3D displays that show 3D images. The smaller displays can form a larger display that shows a larger 3D image of the scene outside of the cruise ship.

The server computer can generate images and sounds that one would see and hear if he/she were living in an underwater habitat in a tropic ocean. The larger display can show realistic images of underwater scenes of, e.g., whales, sharks, giant octopuses, sea turtles, and colorful fish swimming by.

The larger displays can be installed in simulators, such as flight simulators, and show images that simulate what one would see when flying an airplane. The larger displays can be installed in race car simulators and show images that simulate what one would see when driving a race car. The larger displays can be installed in submarine simulators and show images that simulate what one would see when diving in the ocean. The larger displays can be installed in space ship simulators and show images that simulate what one would see when flying in outer space or on distant moons and planets.

By forming a larger display using a combination of smaller displays, the larger display can show life-size images that simulate what one would see in real life, allowing simulations to be more realistic than viewing the images through smaller screens.

While it may be possible to manufacture a large display using a single substrate, such a large display is expensive because of the difficulty of fabricating a perfect display without any defective pixel. The large display made of a single substrate may be difficult to move around or put to storage. By contrast, using a larger display formed by a combination of smaller displays, e.g., overlapping smaller displays, the larger display can be disassembled and moved around easily. Storage of the smaller displays is also much easier compared to storing the large display made of a single substrate.

Using conventional methods, consumers can order displays having resolutions according to industry standards, such as 640×480 (VGA display), 800×640 (SVGA display), 1024×768 (XGA display), 1280×1024 (SXGA display), 1600×1200 (UXGA display), 2560×1600 (WQXGA display), 3840×2160 (4K display), 5120×2880 (5K display), and 7680×4320 (8K Ultra High Definition Display). The consumer can order displays having particular shapes (usually rectangle) defined by the manufactures.

In some implementations, by forming a larger display using a combination of smaller displays, e.g., overlapping smaller displays, a custom-made larger display can have an arbitrary pixel resolution as specified by a user. For example, a display manufacturing can manufacture displays having resolutions of 640×480, 800×640, 1024×768, 1280×1024, 1600×1200, 2560×1600, 3840×2160, 5120×2880, and 7680×4320 pixels. If a user orders a larger display having a resolution of 2000×1600, the manufacturing can overlap four 1600×1200 displays to form a larger display having a resolution of 2000×1600. If the user orders a larger display of a specific size, the manufacturing can overlap multiple displays to produce a display having the requested size. For example, the manufacturer may fabricate a 60-inch (diagonal size) display having a size of 38.4×21.6 inches. If the user orders a larger display having a size of 60 by 60 inches, the manufacturer can overlap six of the 60-inch displays (two displays in the horizontal direction and three displays in the vertical direction) form a larger display having dimensions of 60 by 60 inches.

A large number of smaller displays can in combination form a larger display of a high resolution. For example, tens, hundreds, thousands, or millions of smaller displays can in combination form a larger display having a resolution of thousands, millions, or billions of pixels. The large display can show still images or video in which the refresh rate depends on the bandwidth of data transmission between the computer and the smaller displays. Thus, for example, the walls, floors, and ceilings of a room can be completely covered by smaller displays that in combination form a larger display that can show images that extend continuously across the smaller displays as if shown on a single unit large display that covers the entire room. The large display can show images of other locations or worlds. This is useful to provide an experience to the user similar to virtual reality, without requiring the user to wear a head-mount display.

The façade of a building may be covered by tiles, in which each tile is a small display. When the builder installs the tile displays on the building walls, the builder does not need to keep track of the positions of the tiles. Sensors can automatically determine the relative positions of the tile displays, and the display controller can determine what image portion to shown on each tile display so that a large image can span continuously across the tile displays.

A display manufacturer may pre-fabricate smaller displays having, e.g., rectangular, triangular, circular, and oval shapes, and then overlap the smaller displays to form a larger display having an arbitrary shape as specified by a user.

The smaller display can be configured such that the backside of the transparent or semi-transparent border is made of a material has a refractive index that is the same or similar to the refractive index of the material of the top covering of the active display area. A liquid having a refractive index that matches the refractive index of the backside of the transparent or semi-transparent border of the upper display and the refractive index of the material of the top covering of the active display area of the lower display can be applied between the backside of the transparent or semi-transparent border of the upper display and the top covering of the active display area of the lower display. This may reduce the amount of light reflected between the back surface the transparent or semi-transparent border of the upper display and the top surface of the active display area of the lower display.

For custom-made displays, a large transparent or semi-transparent cover having a size that spans the entire larger display can cover the overlapping smaller displays. An index matching liquid can be applied between the top surface of the smaller displays and the large transparent or semi-transparent cover to enhance light transmission from the smaller displays through the large cover. A frame can be applied to the border of the larger display so that the larger display has the appearance of a single large display.

In some implementations, a first display can have a sensor at a border that can detect that a second display is about to overlap the border of the first display. The sensor can be, e.g., a 2D image sensor or a 3D image sensor. As the second display approaches the image sensor, the display controller can estimate the amount of overlap between the first and second displays based on the images captured by the image sensor. The estimated overlap can be used to initialize the process for accurately determining the overlap between the displays. For example, if the display controller estimates that 200 columns of pixels on the right side of the first display will be covered, then the display controller can scan a vertical line starting from the 150-th column from the right border, instead of from the 1st column from the right border. This allows the display controller to accurately determine the amount of overlap in a shorter amount of time, reducing the amount of time that the user has to wait before images can be properly displayed across the overlapping displays.

A larger display can be formed by overlapping smaller displays having different display characteristics. For example, a first display may have a faster refresh rate than a second display. When a computer shows video content on the two displays, the computer may take into account the different display characteristics of the two displays. For example, suppose two displays overlap, and the left display has a faster refresh rate and is more suitable for showing video. When the user launches a window to view a video, if the window can fit within the left display, the computer may initially position the window showing the video on the left display. If the window is larger than the left display but smaller than the larger display, the computer may initially position the window showing the video to cover the entire left display and a portion of the right display so as to utilize the left display as much as possible.

In some implementations, a larger display is formed by overlapping a first display that is a liquid crystal display and a second display that is an E-ink display. When the user launches a video program, the computer may initially show the video program on the first display. When the user launches a word processing program, the computer may initially show the word processing program on the second display.

A computer may show additional content as more displays are added to form a larger display. For example, suppose a teacher shows a history timeline using several displays. The teacher uses a computer to show the timeline of events from the year 1900 to the year 1945 on a first display. The teacher overlaps a second display on the right side of the first display. The computer shows a timeline of events from the year 1945 to the year 2000 on the second display. The teacher overlaps a third display on the right side of the second display. The computer shows a timeline of events from the year 2000 to the present day on the third display. For example, the teacher may add a fourth display on the top or bottom side of the second display to provide an expanded view of the events that happened from the year 1945 to the year 2000. The teacher may add a fifth display to the top or bottom side of the third display to provide an expanded view of the events that happened from the year 2000 to the present day. The teacher may also move the fourth display to the top or bottom side of the third display to provide the expanded view of the events that happened from the year 2000 to the present day. The overlapping displays allow content to be dynamically presented in a convenient manner.

The overlapping displays can provide a platform for multiple users to interact. For example, a first user and a second user can play the game of pong by controlling paddles shown on a first display. For example, a second display may overlap a right border of the first display, and a third user and a fourth user can control paddles shown on the second display. A ball can move between the first and second displays, allowing the four users to play the game of pong together. For example, a third display may overlap a right border of the second display, and a fifth user and a sixth user can control paddles shown on the third display. The ball can move among the first, second, and third displays, allowing the six users to play the game of pong together. Multiple balls can be used simultaneously to increase the complexity of the game.

A server computer may have a collection of images or video having different sizes, some having a width greater than the height, while some having a height greater than the width. A user may subscribe to a service for showing images or video on a large display without explicitly specifying which image to show. For example, the user may indicate a preference for showing images in mountainous scenes. Suppose the user's display has a resolution of 6000 by 1000 pixels. The server computer may have images of majestic mountains taken by professional photographers, some of the images are panoramic images having resolutions of 5000×1200 pixels, and some images have resolutions of 2000×1200 pixels. Based on the user's display resolution, the server computer determines that the images having resolutions of 5000×1200 pixels are more suitable for display on the user's display, and sends those images to the user.

As another example, the user may have a display that has a resolution of 1000 (horizontal) by 8000 (vertical) pixels. The server computer may have photos and images of art works, some having resolutions of 1000×2000 pixels, and some having resolutions of 1000×6000 pixels. Based on the user's display resolution, the server computer determines that the photos or images having resolutions of 1000×6000 pixels are more suitable for display on the user's display, and sends those photos or images to the user.

For example, the user may be the owner of a coffee shop that has a large display hung on a wall. The coffee shop owner subscribes to an imaging service that provides images to the large display. The images may change periodically, such as once every 10 minutes, once every hour, once per day, or once per week. The large display may show a collage of images, and some portions of the large display may show images that are updated more frequently than other portions of the display. The imaging service provider has a server computer that has access to a collection of images having various resolutions. The server computer first identifies a subset of images based on the coffee shop owner's preference, then selects images from among the subset based on the resolution and/or size of the large display.

The coffee shop owner may own several coffee shops in the country or around the world. Different coffee shops may have large displays of different sizes and/or shapes. The server computer may provide different images to the displays installed at various coffee shops based on various criteria, including the shapes and sizes of the displays and the locations of the coffee shops. For example, the server computer may provide images that are biased toward Japanese themes to coffee shops located in Japan, and provide images that are biased toward Italian themes to coffee shops located in Italy. The images may be selected based on, e.g., local weather and local holidays. The shop manager of each coffee shop may reconfigure the display(s) from time to time. For example, nine displays may be positioned side-by-side horizontally in a 9 by 1 matrix to form a wide panoramic display for a few months, then re-positioned in a 3 by 3 matrix for a few months. When the configuration of the large display changes, the information about the resolution of the large display is provided to the server computer, and the server computer provides images that are compatible with the resolution of the large display.

In some of the examples above, a server computer provides images to a larger display formed by overlapping smaller displays. The same principles for providing images to the larger display can also be applied to examples in which the larger display is formed by smaller displays that do not overlap, or formed by smaller displays in which some smaller displays overlap other displays and some smaller displays do not overlap other displays. One of the features of this invention is that one or more sensors are provided to detect the relative positions of the smaller displays so that a large image can be properly displayed across several smaller displays, regardless of whether the smaller displays overlap other displays or not. The sensors can be mounted on the displays (e.g., on the backside of the displays), or be external to the displays (e.g., camera on smart phones or smart eyeglasses). The user can move the positions of the smaller displays relative to other displays and the images shown on each individual smaller display are adjusted automatically so that a larger image is properly shown across the smaller displays.

When the smaller displays do not overlap or have gaps between the active display areas, the video controller determines the appropriate image to show on each smaller display based on the bezel sizes of the displays and the relative positions of the displays. For example, suppose there is a gap of x millimeters between the active areas of a first display and a second display. A large image can be shown across the active areas of the first and second displays taking into account of the x-millimeter gap. For example, suppose two displays are configured as a larger display, and each smaller display has a horizontal dimension of 20 inches. Suppose the two displays are used to show a life size pole that is 60 inches long and positioned horizontally. Suppose the two displays are positioned side by side horizontally. If the active display area of the right display overlaps the active display area of the left display by 1 inch, then the combination of the left and right displays show 19 inches of the life size pole. If there is a 0.5 inch gap between the active display areas of the left and right displays, then the combination of the left and right displays show 40.5 inches of the life size pole, in which the left display shows the first 20 inches of the pole, and the right display shows the portion of the pole from 20.5 inch to 40.5 inch. If there is a 3-inch gap between the active display areas of the left and right displays, then the combination of the left and right displays shows 43 inches of the life size pole, in which the left display shows the first 20 inches of the pole, and the right display shows the portion of the pole from 23 inch to 43 inch.

In the example above, the user can choose the left display to be the stationary display so that when there is a change in the relative position or orientation of the left and right displays, the image shown on the left display remains the same and the image shown on the right display is modified. The user can also choose the right display to be the stationary display so that when there is a change in the relative position or orientation of the left and right displays, the image shown on the right display remains the same and the image shown on the left display is modified. In some examples, the user can choose a reference point that is outside of the left and right displays, so that when there is a change in the position or orientation of the left or right display relative to the reference point, the image shown on the left or right display is modified accordingly.

A display can be designed such that the back side of the display is populated with sensors, such as image sensors. The sensors can be formed on the back side of the substrate supporting the pixels of the active display area on the front side. Conductive traces can be formed in vias or holes passing the substrate so that circuitry on the front side of the substrate can communicate with circuitry on the back side of the substrate. The sensors can also be formed on a separate substrate that is bonded to the substrate supporting the pixels of the active display area. Conductive traces can be formed in vias or holes passing the substrate so that circuitry on the front side of the substrate can communicate with circuitry on the back side of the substrate. When the display is placed on a surface, such as the surface of a desk or a wall, the sensors can detect the patterns on the surface. The front side active display area of the display shows the patterns detected by the backside sensors, allowing the display to blend in with the surrounding. This allows the display to camouflage itself.

The back side of the display can also have light emitting devices, such as light emitting diodes. The light emitting devices illuminate the surface that is covered by the display, and the sensors detect the patterns on the illuminated surface. The active display area on the front side shows the patterns detected by the sensors.

One application of such a display is to hide another object, such as a power cord. For example, a television may be hung on a wall. A hole may be drilled into the wall to allow a power cord from the television to be connected to a power line inside the wall. If the user does not wish to drill a hole in the wall, and runs the power cord along the wall to a power socket, a narrow strip of display can cover the power cord and show patterns that match the wall patterns. The sensors on the back side of the narrow strip of display may sense the patterns on the wall and the power cord. The user can configure the display to show only the patterns on the wall and not the pattern of the power cord, e.g., by copying the patterns on the wall to cover the pattern of the power cord, or replace the pattern of the power cord with simulated wall patterns that are generated based on the wall patterns sensed by some of the sensors.

A power cord may be configured such that the front side of the power cord includes an active display area, and the back side of the power cord includes sensors. The active display area shows the patterns detected by the sensors in order to camouflage the power cord. The back side of the power cord may also have light emitting devices to illuminate the surface covered by the power cord. The active display area, the sensors, and the light emitting devices may draw power from the power cord or from a power converter that draws power from the power cord.

For example, a display having transparent (or semi-transparent) borders can be used to camouflage an undesired pattern on a wall (e.g., a hole in the wall caused by removing a fixture or an ugly electric panel). Lighting devices on the back side of the display illuminate the surface of the wall, sensors on the back side of the display detect patterns on the surface of the wall (including desired and undesired patterns). The detected patterns are shown on the active display area on the front side of the display. Circuitry on the front side of the display communicates with circuitry on the back side of the display though signal lines that pass through the substrate supporting the pixels of the active display area. The user selects the undesired patterns to be camouflaged, and selects the desired patterns used to overwrite the undesired patterns. The undesired patterns are replaced by the desired patterns on the display. The display may interact with a computer or smartphone wirelessly to enable a user to control what patterns are shown on the display. A graphics software may process the copied patterns so that they blend in with the existing patterns.

A second display having one or more transparent (or semi-transparent) borders can be used to dynamically increase the active display area of a first display. For example, a user of a 24-inch display having 1920×1200 resolution may need to view two text documents side by side. The user may determine that when the display shows the two documents side-by-side, the text is too small to be viewed comfortably. The user may decide that enlarging the first document to have a width that is about 66% of the horizontal screen area results in the most comfortable text size. The remaining 34% of the horizontal screen area is too small to show the second document comfortably. By overlapping a second display having a transparent (or semi-transparent) border at the right side the first display, the effective active display area is extended on the right side of the first display. Assuming the second active display area has a horizontal dimension that is approximately 35% of the horizontal dimension of the first display, and the overlap between the first and second active display areas is about 3% of the horizontal dimension of the first display, the second display adds about 32% display area in the horizontal direction. The second document can be shown across the first and second displays and have a width approximately equal to 66% of the horizontal dimension of the first display. This way, both documents can be viewed side-by-side and the user can read the text of both documents comfortably. After the user finishes viewing the two documents, the user may decide that the 24-inch display is large enough to perform other tasks, and remove the second display.

In some situations, the user may wish to view more lines of text of a document at the same time. For example, when a document is shown on a first display with a text size that is comfortable to read, only 20 lines of text can be shown on the display because some of the vertical space is occupied with the menus and status bars of the word processing program. The user may wish to view 30 lines of text together. The user can overlap a second display having one or more transparent (or semi-transparent) borders on the top or bottom side of the first display so that the document can span vertically across the first and second displays. The width of the second display does not have to match the width of the first display. For example, the second display may have a width and a height that are 66% and 50% of the width and the height, respectively, of the first display. This is useful for extending the display areas of, e.g., laptop or tablet computers that typically have small displays to enable the devices to be portable.

In some examples, each of the first and second displays are connected to a computer through a video cable. When the user connects the second display to the computer, the computer receives sensor signals and determines the relative positions of the two displays. The operating system automatically determines the image to be shown on the second display so that the images can span properly across the first and second displays. For example, the operating system determines what image to show on the first and second displays so that a document can seamlessly span across the first and second displays.

In some examples, one or more additional displays can be used to extend one or more portions of the active display area of the first display in the vertical direction, and one or more additional displays can be used to extend one or more portions of the active display area of the first display in the horizontal direction.

In some examples, the first display is connected to a computer through a video cable, and the second display is linked to the computer through a wireless link. When the user positions the second display in the vicinity of the first display, sensors detect the presence of the second display and outputs a message on the first display asking whether the user wishes to combine the second display with the first display to form a larger display. If the user confirms that the two displays should be combined, the computer establishes a wireless connection with the second display, e.g., using Bluetooth, Wi-Fi, wireless HDMI, or time-reversal communication techniques. The computer receives sensor signals and determines the relative positions of the two displays. The operating system automatically determines the image to be shown on the second display so that the images can span properly across the first and second displays. For example, the operating system determines what image to show on the first and second displays so that the document can seamlessly span the first and second displays.

When the computer detects that the second display is removed from the vicinity of the first display, the computer provides a number of options to the user regarding how the second display is used. For example, one option is to use the second display as an independent display so that the first and second displays show content independent of each other. Another option is to turn off the second display. A third option is to show content on the second display in a way that depends on the content of the first display. For example, a document may be configured for use with two displays such that when certain pages of the document are shown on a first display, certain content (certain illustrations or images) is shown on the second display. For example, when the user reads the first chapter of a document on the first display, a drawing or image associated with the first chapter is shown on the second display. When the user reads the second chapter of the document on the first display, the second display automatically shows a drawing or image associated with the second chapter.

In some implementations, a larger display can be formed by multiple smaller displays in which each smaller display is a fully functional computer that includes one or more microprocessors, memory (e.g., dynamic random access memory or DRAM), one or more data storage devices (e.g., a hard drive or a flash drive), one or more communication modules (e.g., Wi-Fi, Bluetooth, or cellular), and a video controller. The smaller display can include a touch panel and can function similar to a tablet computer. Circuitry for the microprocessor, memory, storage device, communication module, and the video controller can be fabricated on the backside of the substrate that supports the pixels of the active display area. Circuitry on the backside of the substrate can communicate with circuitry on the front side of the substrate using signal lines that pass through vias or holes in the substrate. Circuitry for the microprocessor, memory, storage device, communication module, and the video controller can also be fabricated on one or more separate substrates that are bonded to the backside of the substrate that supports the pixels of the active display area. Circuitry on a first substrate bonded to a second substrate can communicate with circuitry on the second substrate through surface contacts between the first and second substrates. Each smaller display can have a thin and flat battery, or have a coil to receive power transmitted wirelessly from a power source.

In the example above, each smaller display functions as a tablet computer having transparent (or semi-transparent) borders. Multiple tablet computers can be combined so that the smaller displays of the tablet computers together form a larger display. One of the tablet computers functions as a leader, while the other tablet computers function as followers. The leader determines what image to show across the displays. In some implementations, the leader determines what image is shown on each of the followers, and sends image data to the followers. In some implementations, the leader determines the overall image, sends the overall image to the followers, and each follower determines which portion of the overall image to shown on its display. The leader can communicate with the followers using wireless links, such as Wi-Fi, Bluetooth, wireless HDMI, time-reversal communication techniques, or other wireless communication protocols.

In some implementations, the smaller displays each has a diagonal screen size of about 7, 10, 12, 14, 15, 17, 18, 24, 30, 40, or 60 inches. Multiple tablet computers can be combined to form a larger display. The larger display can have a horizontal, vertical, or diagonal dimension of, e.g., 30 inches, 60 inches, 100 inches, 10 feet, 100 feet, 1000 feet, or more.

When the smaller displays are combined to form a larger display, the image on the larger display does not necessarily have to refresh as the same rate as the smaller displays when the smaller displays operate independently. For example, each tablet computer may have a smaller display that refreshes at 60 Hz. When dozens of smaller displays are combined to form a larger display, it may take some time for the leader to transmit image data to all the followers, so the larger display may refresh the image at, e.g., 10 Hz or 1 Hz. In some examples, all the smaller displays update the images at the same time so that a refreshed image is shown properly across the larger display. However, it is also possible to update the images on the smaller displays in a non-synchronous manner.

In some implementations, when smaller displays are combined to form a larger display, different smaller displays may have different refresh rates. For example, the smaller displays near the center region of the larger display may refresh at a faster rate than the smaller displays near the peripheral regions. For example, more resources may be devoted to updating the image data for the smaller displays near the center region of the larger display. For example, the leader may communicate with the smaller displays near the center region of the larger display using a larger bandwidth, and communicate with the smaller displays near the peripheral regions of the larger display using a smaller bandwidth.

In some implementations, the user may determine which regions of the larger display is shown with a higher refresh rate. In some implementations, the operation system determines which portions of the larger display requires a higher refresh rate (e.g., when showing video) and which portions of the larger display can use a lower refresh rate (e.g., when showing static or slowly changing text or images).

In some implementations, when smaller displays are combined to form a larger display, different smaller displays may show images using different resolutions. For example, the smaller displays near the center region of the larger display may show images at a higher resolution, and the smaller displays near the peripheral regions of the larger display may show images at a lower resolution. For example, the smaller displays showing faster changing content may show images at a lower resolution, and the smaller displays showing slower changing content may show images at a higher resolution.

In some implementations, a first smaller display may communicate to a second adjacent smaller display using a wired connection. For example, the smaller displays may have contacts at the sides, and when two smaller display are place side-by-side, the contacts of the two smaller displays provide signal paths through which the two smaller displays can exchange data. The smaller displays may have magnets at the sides so that two smaller displays couple at predetermined relative positions. This helps the alignment of the contacts. The contacts can be used to transmit power from one smaller display to another smaller display.

In some implementations, each smaller display has one or more magnets on the backside of the display to help align the displays when one display overlaps another display.

Data can be transmitted through multiple displays using a relay fashion, for example, a first smaller display sends data to a second smaller display, which sends data to a third smaller display, which sends data to a fourth smaller display, and so forth.

In some implementations, a first smaller display can communicate with a second adjacent or overlapping smaller display using near field communication methods. For example, a first smaller display may have a communication module having a coil that generates a magnetic field modulated by a signal, in which the magnetic field is received by a similar coil in the communication module of an adjacent or overlapping second smaller display. The received magnetic field is used by the second smaller display to generate a signal representing the signal sent by the first smaller display. The second smaller display can send data to the first smaller display in a similar manner. In some implementations, each smaller display has coils near the left, right, top, and bottom borders so that the smaller display can communicate with another display positioned near the left, right, top, and bottom border, respectively, using near field communication methods.

In some implementations, power can be relayed from one smaller display to another smaller display wirelessly. For example, a first smaller display is connected to a wired power line. The first smaller display transmits power wirelessly using, e.g., inductive coupling (such as resonant inductive coupling), capacitive coupling, or magnetic resonance, to a second smaller display, which transmits power wirelessly to a third smaller display, which in turn transmits power wirelessly to a fourth smaller display, and so forth.

In some implementations, a first smaller display can communicate with a second adjacent or overlapping smaller display using optical communication methods. For example, each smaller display may have miniature light emitting devices and photo detectors at the back side of the display, and miniature photo detectors on the front side of the display. When a second smaller display overlaps a first smaller display, the light emitting devices at the back side of the second smaller display generate light modulated by a signal, in which the light is received by the photo detectors of the first smaller display. The received light is used by the first smaller display to generate a signal representing the signal sent by the second smaller display. The first smaller display can send data to the first smaller display by using one or more pixels to generate light modulated by a signal, in which the light is received by the photo detectors at the back side of the second smaller display. In some implementations, each smaller display has light emitting devices and photo detectors at the back side near the left, right, top, and bottom borders, and photo detectors at the front side near the left, right, top, and bottom borders, so that the smaller display can communicate with another smaller display positioned near the left, right, top, or bottom border, respectively, using optical communication methods. Each of the photo detectors at the front side can occupy an area that is a fraction of the area of a pixel.

In some implementations, each smaller display has integrated solar cells that can generate power from received external light.

In some implementations, a computer hosts a more powerful processor to process image data sent to the multiple smaller displays, and each smaller display has a video controller that controls the pixels to show an image according to the received image data. The video controller does not need to perform complex calculations and can be consume a smaller amount of power. The computer can be made larger with a larger battery or power supply, whereas the smaller displays can be made thin and light and easily portable. The computer can communicate with the smaller displays wirelessly using a communication method that focuses signals intended for particular displays toward those particular displays. For example, an antenna array at the computer can be used to direct a wireless signal toward one or more particular smaller displays. Time-reversal wireless communication techniques can be used for the uplink and downlink between the computer and the smaller displays.

In some implementations, the smaller displays have touch screens and the user can apply touch gestures to indicate how the smaller displays should interact with one another. For example, when an upper display overlaps a lower display, the user can use a first gesture, such as swiping two fingers from the upper display to the lower display, to indicate that the two displays should combine to form a larger display. The user can use a second gesture, such as drawing an "X" across the border of the upper display overlapping the lower display, to indicate that the two displays should operate independently and not combine to form a larger display.

In some implementations, the user can swipe in from a border of a smaller display to access a menu that provides various configuration options, such as selecting the smaller display to be a main display or a secondary display. The menu can also provide options to allow the user to select whether the smaller display should join in a larger display, or break away from the larger display.

In some implementations, suppose a document is shown across a first smaller display and a second smaller display, when the second smaller display breaks away from the first smaller display, the document is shown only on one of the displays and is removed from the other display. The user can select which display to show the document.

In some implementations, suppose a document is shown across a first smaller display and a second smaller display, when the second smaller display breaks away from the first smaller display, the document is shown on both displays. The two displays are linked such that when the user edits the document shown on the first display, the document shown on the second display is automatically updated. The user can scroll through the document on the first display and the second display independently. Thus, the first display can show one page of the document while the second display shows a different page of the document. The first and second displays can also both show the same page of the document. For example, the document can be a patent application, the first display can show the detailed description of the patent application and the second display can show the figures of the patent application. The reference numbers in the detailed description can be linked to the reference numbers in the figures, so that when the user modifies the reference numbers in the figures shown in the second display, the reference numbers in the detailed description shown in the first display are automatically updated.

In some implementations, a larger display can be formed by a combination of two or more smaller displays under the control of multiple operating systems. For example, a first tablet computer, a second tablet computer, a third tablet computer, and a fourth tablet computer each having a display with transparent (or semi-transparent) borders can combine to form a larger display, in which the first tablet computer runs a first operating system (e.g., Apple iOS or Mac OS X), the second tablet computer runs a second operating system (e.g., Microsoft Windows), the third tablet computer runs a third operating system (e.g., Android), and the fourth tablet computer runs a fourth operating system (e.g., Linux). The user selects one tablet computer as the main computer. The main tablet computer determines what image to show on the larger display, and sends image data to the other tablet computers to show portions of the image on the displays of the other tablet computers.

In some implementations, multiple smaller displays are combined to form a larger display, in which each smaller display is controlled wirelessly by a computer. For example, a first smaller display is controlled wirelessly by a first computer that runs a first operating system, e.g., Apple iOS or Mac OS X. The second smaller display is controlled wirelessly by a second computer that runs a second operating system, e.g., Microsoft Windows. The third smaller display is controlled wirelessly by a third computer that runs a third operating system, e.g., Android. The fourth smaller display is controlled wirelessly by a fourth computer that runs a fourth operating system, e.g., Linux. The user selects one computer as the main computer. The main computer determines what image to show on the larger display, and sends image data to the other computers to show portions of the image on the smaller displays controlled by the other computers. The main computer can send image data to the other computers using a wireless communication method, e.g., Wi-Fi, Bluetooth, or time-reversal techniques, or a wired communication method, e.g., Ethernet.

In some implementations, when the smaller displays are combined to form a larger display, the main computer determines a coordinate system for the larger display, the coordinates of the larger image in the coordinate system, and the coordinates of each smaller display on the coordinate system, and sends the information to the other computers. Each time a smaller display is moved relative to the other smaller displays, the main computer determines updated coordinates for the smaller display, and sends the updated coordinates to the computer that controls the smaller display. For each large image to be shown on the larger display, the main computer sends the image data and coordinate data for the large image to each of the other computers. Because each computer has information about the coordinates of the large image and the coordinates of the smaller display controlled by the computer in the coordinate system, the computer can determine which portion of the large image should be shown on the smaller display. The main computer sends a synchronization signal to the other computers so that all the computers can update the images shown on the smaller displays at the same time.

In some implementations, each smaller display has a graphics memory to store the image data to be shown on the smaller display. The smaller display has a video controller that controls the pixels of the display based on the image data stored in the graphics memory. When an image on the smaller display needs to be modified, the computer writes image data to the graphics memory of the smaller display. This is useful when the smaller display is showing images that are mostly static and only a small portion of the images change, such as when the user is processing text or still photographs. When only a small portion of the image changes, only a small amount of data in the graphics memory need to be updated, so the computer only needs to send a small amount of image data to the display.

In some implementations, a first smaller display is controlled by a first computer, and a second smaller display is controlled by a second computer. The first and second smaller displays are combined to form a larger display. The larger display shows a large desktop spanning the first and second smaller displays. A first window is provided to show a smaller desktop associated with the first computer, in which the smaller desktop shows icons for accessing files and programs accessible to the first computer. A second window is provided to show a smaller desktop associated with the second computer, in which the smaller desktop shows icons for accessing files and programs accessible to the second computer. The image content of the first window is generated by the first computer, and the image content of the second window is generated by the second computer. Assume that the first computer is the main computer, then the user interacts with first computer to provide keyboard and mouse pointer inputs. When the user interacts with items in the first window, the first computer functions the same way as if the computer is controlling just one display. For example, if the user clicks on an icon, the icon is selected and highlighted, and if the double-clicks on an icon representing a program, the program is executed and displayed in the first window.

When the user interacts with items in the second window (e.g., through keyboard and mouse inputs), the first computer sends the interactions to the second computer and the second computer functions the same way as if the user is interacting with the second computer. For example, if the user clicks on an icon in the second window, the icon is selected and highlighted, and if the double-clicks on an icon representing a program in the second window, the program is executed and displayed in the second window. The second computer generates the image content for the second window, and sends the image content to the first computer. The first computer generates the large image to be shown on the larger display, in which the large image incorporates the image content for the second window. After the large image is generated by the first computer, the first and second computers control the respective smaller displays to show portions of the large image using the techniques previously described.

Suppose the user wants to copy a file stored at the second computer and save the file to a directory at the first computer. The user enters a first command to copy a file of the second computer (e.g., in Windows system, by right-clicking an icon in the second window representing the file and selecting the "copy" command from a pop-up menu), the first computer receives the user command and sends the command to the second computer. The second computer generates a copy of the file. The user enters a second command to save the file to a directory of the first computer (e.g., by double-clicking an icon in the first window that represents the directory to open the directory and selecting the "save" command from the file menu). The first computer receives the second command and sends the second command to the second computer. The second computer sends the copy of the file to the first computer, and the first computer saves the copy of the file in the directory of the first computer selected by the user.

The user may open additional windows, in which each window is controlled by either the first computer or the second computer. For example, if the user executes a first program on the first computer, a third window may be shown for the first program. When the user interacts with the items in the third window, the first computer performs relevant functions based on the user interaction. The first computer generates the image content for the third window, and updates the large image incorporating the image content of the third window. If the user executes a second program on the second computer, a fourth window may be shown for the second program. When the user interacts with the items in the fourth window, the first computer sends the interactions to the second computer, and the second computer functions as if the user is interacting with the second computer. The second computer generates the image content for the fourth window, sends the image content to the first computer, and the first computer updates the large image incorporating the image content for the fourth window.

In some implementations, the region of the large desktop outside of the first and second windows represents a temporary desktop managed by the main computer (in this example, the first computer). When an icon is placed in the large desktop, the icon is linked to a resource in either the first computer or the second computer. For example, an icon for a program stored in the second computer can be placed on the large desktop. When the user double-clicks on the icon, the first computer sends the command to the second computer, and the second computer executes the program.

In some implementations, when a third smaller display controlled by a third computer is joined with the first and second smaller displays to form a larger display, a fifth window is provided to show a smaller desktop associated with the third computer. Accessing the items in the fifth window can be performed in a similar manner as accessing the items in the second window.

In some implementations, a large display may represent a central hub for various electronic devices owned by a user. For example, the large display may show a first window associated with a desktop computer, a second window associated with a first laptop computer using Windows operating system, a third window associated with a second laptop computer using Mac OS X operating system, a fourth window associated with a first mobile phone using iOS operating system, a fifth window associated with a second mobile phone using Android operating system, a sixth window associated with a tablet computer using iOS operating system, and a seventh window associated with a work station using Linux operating system. Combining multiple smaller displays to form a larger display, the display area can be easily expanded to accommodate the multiple windows associated with multiple devices. The large display with multiple windows associated with multiple devices allows the user to conveniently share resources among the devices, such as copying a file from one device to another device, or executing two programs from two devices and showing the programs side-by-side on the large display. In this example, the large display can be a single display (i.e., all the pixels are supported by a single substrate) or be formed from a combination of multiple smaller displays.

For example, the user may perform a computation-intensive image processing operation on a Linux workstation to generate a processed image, and execute a word processing program on a Windows laptop to prepare a report. The user can show the processed image in a first window associated with the Linux workstation and show the report in a second window associated with the Windows laptop, in which the first and second windows are both shown on the large display. The user can copy the processed image in the first window and paste it in the report shown in the second window. In response to the copy command, the Linux workstation generates a copy of the processed image. In response to the paste command, the Linux workstation sends the copy of the processed image to the Windows laptop, and the Windows laptop pastes the processed image into the report.

In some implementations, when a resource (such as a document or an image file) is transferred from one device using a first operating system to a second device using a second operating system, adjustments are made to the resource so that it can be processed by the second operating system.

In some implementations, a hub server is used as a bridge between the various devices and to control images shown on the large display. For example, the user may interact with the hub server, which communicates with a Linux workstation and a Windows laptop. When the user attempts to copy a processed image generated by an image processing program executing on the Linux workstation to a report generated by a word processing program executing on the Windows laptop, the Linux workstation makes a copy of the processed image and sends the copy of the processed image to the hub server, the hub server sends the processed image to the Windows laptop, and the Windows laptop pastes the processed image into the report. If the large display is formed by a combination of smaller displays, the hub server may control the smaller displays to show relative portions of the larger image shown on the large display.

In some implementations, a large display can be formed by a combination of multiple smaller displays, in which a first computer controls two or more of the smaller displays, and a second computer controls two or more of the smaller displays. The computer can be, e.g., a workstation, a desktop computer, a laptop computer, a tablet computer, or a smartphone.

A security procedure may be implemented when the large display is used as a hub for enabling the user to transfer resources from one computer to another computer. For example, if the user is interacting with the first computer to access resources of the second computer for the first time, the second computer may request confirmation that user intends to allow the first computer to access resources from the second computer. In some implementations, when a smaller display controlled by a device joins other smaller displays to form a larger display, the smaller display may show a message asking the user whether the user wishes to allow other devices to access resources on the device.

The determination of relative positions of displays and calculation of the coordinates of pixels described above can be implemented using software for execution on a computer. For instance, the software forms procedures in one or more computer programs that execute on one or more programmed or programmable computer systems (which may be of various architectures such as distributed, client/server, grid, or cloud) each including at least one processor, at least one data storage system (including volatile and non-volatile memory and/or storage elements), at least one input device or port, and at least one output device or port. The software may form one or more modules of a larger program, for example, that provides other services related to the generation of images to be shown on the displays. In the example described above in which the user living in Boston can view scenes from Paris on a large display formed by multiple small displays, the server computer providing the images for the large display can be a cloud server. In some examples, the cloud server determines the relative positions of the small displays, determines the image contents to be shown on each small display, and sends the image contents to the small displays through the network. In some examples, the cloud server determines the large image to be shown on the large display, and sends the large image to the display controller of the local user computer. The local user computer determines the relative positions of the small displays, and determines the portion of the large image to be shown on each small display.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described in this document. The inventive system may also be considered to be implemented as a computer-readable storage medium, configured with a computer program, where the storage medium so configured causes a computer system to operate in a specific and predefined manner to perform the functions described in this document.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the description, which is defined by the scope of the appended claims. Other embodiments are within the scope of the following claims.

What is claimed is:

1. An apparatus comprising:
   a first display panel having a first active display region;
   a second display panel having a second active display region and a transparent or semi-transparent border region; and
   a controller configured to control the first and second active display regions;
   wherein the second display panel overlaps the first display panel such that the transparent or semi-transparent border region covers a portion of the first active display region, and the first and second active display regions show an image that spans a portion of the first active display region behind the transparent or semi-transparent border region and a portion of the second active display region adjacent to the transparent or semi-transparent border region;
   wherein an upper edge of the first active display region is not aligned with an upper edge of the second active display region, the controller is configured to control the first and second active display regions to display a line that spans the first and second active display regions, in which a first portion of the line is shown by pixels in the first active display region not covered by the transparent or semi-transparent border region of the second display panel, a second portion of the line is shown by pixels in the first active display region covered by the transparent or semi-transparent border region, and a third portion of the line is shown by pixels in the second active display region;

wherein the control module is configured to control the first and second active display regions to display the first portion of the line, the second portion of the line, and the third portion of the line to form a continuous line that spans the first and second active display regions.

2. The apparatus of claim 1, comprising a support device that supports the first and second display panels at predetermined positions relative to each other.

3. The apparatus of claim 1 in which the first display panel comprises a display panel of at least one of a mobile phone, a tablet computer, a notebook computer, a desktop computer monitor, a television, a game controller, or an electronic book.

4. The apparatus of claim 1 in which a first portion of the image represents a first learning material, and a second portion of the image represents a second learning material related to the first learning material.

5. The apparatus of claim 4 in which at least one of
(i) the first learning material comprises mathematical exercises, and the second learning material comprises at least one article related to the mathematical exercises;
(ii) the first learning material comprises a timeline of events, and the second learning material comprises at least one article related to the events;
(iii) the first learning material comprises at least one mathematical formula, and the second learning material comprises at least one graph related to the at least one mathematical formula;
(iv) the first learning material comprises at least one of a foreign language article or a foreign language exercise, and the second learning material comprises at least one of a foreign language dictionary, a foreign language thesaurus, or a foreign language grammar guide; or
(v) the first learning material comprises at least one map of a geographical region, and the second learning material comprises at least one article related to the geographical region.

6. The apparatus of claim 1, comprising a ship that includes the first display panel, the second display panel, and a camera to capture images of an environment of the ship, in which the first and second display panels are configured to show at least portions of the images of the environment of the ship.

7. The apparatus of claim 1, comprising a sensor configured to determine the position of the second active display region relative to the first active display region.

8. The apparatus of claim 7 in which the sensor comprises one or more photosensors disposed on a back side of the second display panel to detect light emitted from one or more pixels of the first active display area, in which the apparatus is configured to determine a position of the second active display region relative to the first active display region based on output from the one or more photosensors.

9. A method comprising:
positioning a first display panel and a second display panel in which a portion of a second active display area of the second display panel overlaps a portion of first active display area of the first display panel, the first active display area comprising a plurality of pixels, and the second active display area comprising a plurality of pixels;

showing a first portion of an image of an object on the first active display area; and showing a second portion of the image of the object on the second active display area, in which the image of the object spans continuously across the first active display area and the second active display area;

wherein an upper edge of the first active display area is not aligned with an upper edge of the second display area, the method comprises controlling the first and second active display areas to display a line that spans the first and second active display areas, in which a first portion of the line is shown by pixels in the first active display area and a second portion of the line is shown by pixels in the second active display area, and controlling the first and second active display areas to display the first and second portions of the line to form a continuous line that spans the first and second active display areas.

10. The method of claim 9, comprising determining the second portion of the image of the object based on a position of the second active display area relative to the first active display area.

11. The method of claim 10, comprising determining the position of the second active display area relative to the first active display area using a sensor.

12. The method of claim 11 in which determining the position of the second active display area relative to the first active display area comprises using one or more photo sensors disposed on a back side of the second display panel to detect light emitted from one or more pixels of the first active display area.

13. The method of claim 12 comprising activating different pixels of the first active region at different times, each time activating one or more pixels, and using the one or more photo sensors to sense light from the one or more activated pixels.

14. The method of claim 13, comprising determining the relative positions of the first and second active display areas based on the position or positions of one or more pixels that are activated when the light sensor senses light from the activated one or more pixels or senses a change in color or brightness due to light from the activated one or more pixels.

15. The method of claim 12 in which positioning a first display panel and a second display panel comprises overlapping a left side of the second display panel on a right side of the first display panel, and
the method comprises sequentially activating a vertical line of pixels in the first active display area starting from the right border, and scan the vertical line toward the left side until the one or more photo detectors detect light from the activated line of pixels.

16. The method of claim 15, comprising determining the relative positions of the first and second active display areas based on the position of the activated line of pixels when the one or more photo detectors detect light from the activated line of pixels.

17. The method of claim 11 in which determining the position of the second active display area relative to the first active display area comprises using a camera facing the first and second active display areas to capture images of the pixels on the first and second active display areas.

18. The method of claim 17, comprising calibrating a brightness of the second active display area to correspond to the brightness of the first active display area, including taking an image that includes a first set of pixels in the first active display area and a second set of pixels in the second active display area, comparing the brightness of the first set of pixels with the brightness of the second set of pixels, and adjust the brightness of the second set of pixels to match the brightness of the first set of pixels.

19. The method of claim 17, comprising calibrating a color of the second active display area to correspond to the color of the first active display area, including taking an image that includes a first set of pixels in the first active display area and a second set of pixels in the second active display area, comparing the color of the first set of pixels with the color of the second set of pixels, and adjust the color of the second set of pixels to match the color of the first set of pixels.

20. The method of claim 10, comprising mapping coordinates of a pixel in the second active display area to coordinates in a coordinate system of the first display panel, determining characteristics of a pixel of the image that correspond to the coordinates in the first display coordinate system, and assigning the characteristics of the pixel of the image to the pixel in the second active display area.

21. The method of claim 20 in which the characteristics of a pixel comprise at least one of a color or brightness of the pixel.

22. The method of claim 9 in which showing a second portion of the image of the object on the second active display area comprises showing the second portion of the image of the object on at least one of liquid crystal cells, organic light emitting diodes, electronic ink pixels, plasma display pixels, electroluminescent display pixels, surface-conduction electron-emitter display pixels, field emission display pixels, interferometric modulators, or quantum dot display pixels.

23. The method of claim 9, comprising overlapping a transparent or semi-transparent border of the second display panel over the first active display area.

24. The method of claim 23, comprising controlling the portion of the first active display region that is behind the transparent or semi-transparent border region to adjust at least one of a brightness, contrast, hue, or color to compensate effects of the border region, such that the image appears more uniform across the portion of the first active display region that is not covered by the transparent or semi-transparent border region and the portion of the first active display region that is behind the transparent or semi-transparent border region.

25. The method of claim 24, comprising controlling the portion of the first active display region that is behind the transparent or semi-transparent border region to increase the brightness to compensate the reduction of brightness of light that pass the border region, such that the brightness of the image appears more uniform across the portion of the first active display region that is not covered by the transparent or semi-transparent border region and the portion of the first active display region that is behind the transparent or semi-transparent border region, than if the control module had not increased the brightness the portion of the first active display region that is behind the transparent or semi-transparent border region.

26. The method of claim 23 in which an upper edge of the first active display area is not aligned with an upper edge of the second display area, the method comprises controlling the first and second active display areas to display a line that spans the first and second active display areas, in which a first portion of the line is shown by pixels in the first active display area not covered by the transparent or semi-transparent border region of the second display panel, a second portion of the line is shown by pixels in the first active display area covered by the transparent or semi-transparent border region, and a third portion of the line is shown by pixels in the second active display area; and controlling the first and second active display regions to display the first portion of the line, the second portion of the line, and the third portion of the line to form a continuous line that spans the first and second active display regions.

27. The method of claim 26 in which the line comprises at least one of a border of a window shown across the first and second active display area, a feature of a face shown across the first and second active display areas, a feature of an object shown across the first and second active display areas, or a border of a geometric shape shown across the first and second active display areas.

28. The method of claim 9, comprising controlling the first and second active display regions such that for a portion of the image that is intended to have a uniform brightness, when the portion of the image is shown spanning across the first and second active display regions, the portion of the image has a uniform brightness across the first and second active display regions.

29. The method of claim 9 in which positioning a first display panel and a second display panel comprises positioning the second display on an upper side of the first display, and showing the image comprises showing an image that spans vertically across the first and second active display areas.

30. The method of claim 9, comprising powering the second display panel wirelessly.

31. The method of claim 30 in which powering the second display panel wirelessly comprises wirelessly transferring power from a power supply to the second display panel based on at least one of magnetic induction, magnetic resonance, resonant magnetic coupling, capacitive coupling, microwaves, ultrasound, or lasers.

32. The method of claim 30, comprising receiving power wirelessly at the second display panel using coils in the second display panel.

33. The method of claim 9, comprising powering the second display panel using solar cells or photovoltaic cells.

34. The method of claim 9 in which positioning the first and second display panels comprises positioning a portion of the second active display area above the first active display area.

35. The method of claim 9 in which positioning the first and second display panels comprises positioning a portion of the first active display area above the second active display area.

36. The method of claim 9, comprising positioning a third display panel in which a portion of a third active display area of the third display panel overlaps a portion of first active display area of the first display panel, the third active display area comprising a plurality of pixels, showing a first portion of a second image of a second object on the first active display area, and showing a second portion of the second image of the second object on the third active display area, in which the second image of the second object spans continuously across the first active display area and the third active display area.

37. The method of claim 9, comprising positioning a third display panel in which a portion of a third active display area of the third display panel overlaps a portion of the second active display area of the second display panel, the third active display area comprising a plurality of pixels,
  showing a first portion of a second image of a second object on the second active display area, and
  showing a second portion of the second image of the second object on the third active display area, in which the second image of the second object spans continuously across the second active display area and the third active display area.

38. The method of claim 9, comprising positioning a third display panel in which a portion of a third active display area of the third display panel overlaps a portion of first active display area of the first display panel, the third active display area comprising a plurality of pixels, and
  showing a third portion of the image of the object on the third active display area, in which the image of the object spans continuously across the third active display area, the first active display area, and the second active display area.

39. The method of claim 9, comprising positioning a third display panel in which a portion of a third active display area of the third display panel overlaps a portion of the second active display area of the second display panel, the third active display area comprising a plurality of pixels, and
  showing a third portion of the image of the object on the third active display area, in which the image of the object spans continuously across the first active display area, the second active display area, and the third active display area.

40. The method of claim 9, comprising positioning a third display panel in which a portion of a third active display area of the third display panel overlaps a portion of first active display area of the first display panel, the third active display area comprising a plurality of pixels, in which a portion of the third active display area is above a portion of the first active display area, and a portion of the second active display area is above another portion of the first active display area.

41. The method of claim 9, comprising positioning a third display panel in which a portion of a third active display area of the third display panel overlaps a portion of first active display area of the first display panel, the third active display area comprising a plurality of pixels, in which a portion of the third active display area is below a portion of the first active display area, and a portion of the second active display area is above another portion of the first active display area.

42. The method of claim 9, comprising positioning a third display panel in which a portion of a third active display area of the third display panel overlaps a portion of second active display area of the second display panel, the third active display area comprising a plurality of pixels, in which a portion of the third active display area is above a portion of the second active display area, and another portion of the second active display area is above a portion of the first active display area.

43. The method of claim 9, comprising positioning a third display panel in which a portion of a third active display area of the third display panel overlaps a portion of second active display area of the second display panel, the third active display area comprising a plurality of pixels, in which a portion of the third active display area is below a portion of the second active display area, and another portion of the second active display area is above a portion of the first active display area.

44. A method comprising:
  positioning a first display panel and a second display panel in which a portion of a second active display area of the second display panel overlaps a portion of first active display area of the first display panel, the first active display area comprising a plurality of pixels, and the second active display area comprising a plurality of pixels;
  showing a first portion of an image of an object on the first active display area; and
  showing a second portion of the image of the object on the second active display area, in which the image of the object spans continuously across the first active display area and the second active display area;
  wherein the first display panel comprises a first three-dimensional display, the second display panel comprises a second three-dimensional display,
  showing the image on the first and second active display areas comprises showing a first portion of a three-dimensional image on the first active display area, showing a second portion of the three-dimensional image on the second active display area, and the first and second active display areas together show a continuous three-dimensional image that spans the first and second active display areas.

45. The method of claim 9 in which positioning a first display panel and a second display panel comprises positioning the second display on a left side of the first display, and showing the image comprises showing an image that spans horizontally across the first and second active display areas.

46. The method of claim 44, comprising:
  determining the second portion of the image of the object based on a position of the second active display area relative to the first active display area; and
  determining the position of the second active display area relative to the first active display area using one or more photo sensors disposed on a back side of the second display panel to detect light emitted from one or more pixels of the first active display area.

47. The method of claim 46 comprising activating different pixels of the first active region at different times, each time activating one or more pixels, and using the one or more photo sensors to sense light from the one or more activated pixels.

48. The method of claim 47 comprising determining the relative positions of the first and second active display areas based on the position or positions of one or more pixels that are activated when the light sensor senses light from the activated one or more pixels or senses a change in color or brightness due to light from the activated one or more pixels.

49. The method of claim 46 in which positioning a first display panel and a second display panel comprises overlapping a left side of the second display panel on a right side of the first display panel, and
  the method comprises sequentially activating a vertical line of pixels in the first active display area starting from the right border, and scan the vertical line toward the left side until the one or more photo detectors detect light from the activated line of pixels.

50. The method of claim 48, comprising determining the relative positions of the first and second active display areas based on the position of the activated line of pixels when the one or more photo detectors detect light from the activated line of pixels.

51. An apparatus comprising:
- a first display panel having a first active display region;
- a second display panel having a second active display region and a transparent or semi-transparent border region;
- wherein the second display panel overlaps the first display panel such that the transparent or semi-transparent border region covers a portion of the first active display region, and the first and second active display regions show an image that spans a portion of the first active display region behind the transparent or semi-transparent border region and a portion of the second active display region adjacent to the transparent or semi-transparent border region;
- wherein the first display panel comprises a first support device that supports the first active display region,
- the second display panel comprises a second support device that supports the second active display region,
- a portion of the second active display region and the transparent or semi-transparent border region extend beyond the second support device,
- the portion of the second active display region and the transparent or semi-transparent border region that extend beyond the second support device overlap a portion of the first display panel, and
- the first support device is positioned near or adjacent to the second support device without overlapping the second support device.

* * * * *